United States Patent
Nguyen et al.

(10) Patent No.: US 11,365,273 B2
(45) Date of Patent: Jun. 21, 2022

(54) HIGH VISCOSITY INDEX COMB POLYMER VISCOSITY MODIFIERS AND METHODS OF MODIFYING LUBRICANT VISCOSITY USING SAME

(71) Applicant: Infineum International Limited, Abingdon (GB)

(72) Inventors: Nga Nguyen, Scotch Plains, NJ (US); Ronald Lewis, Glenmoore, PA (US); Jun Xu, Parlin, NJ (US); Ewan Galbraith, Brooklyn, NY (US)

(73) Assignee: Infineum International Limited, Oxford (GB)

( * ) Notice: Subject to any disclaimer, the term of this patent is extended or adjusted under 35 U.S.C. 154(b) by 0 days.

(21) Appl. No.: 17/109,623

(22) Filed: Dec. 2, 2020

(65) Prior Publication Data

US 2021/0179760 A1    Jun. 17, 2021

Related U.S. Application Data

(63) Continuation-in-part of application No. 16/715,772, filed on Dec. 16, 2019, now abandoned.

(51) Int. Cl.
| | |
|---|---|
| *C10M 169/04* | (2006.01) |
| *C10M 145/14* | (2006.01) |
| *C08F 279/02* | (2006.01) |
| *C08K 5/01* | (2006.01) |
| *C10N 20/02* | (2006.01) |

(52) U.S. Cl.
CPC .............. *C08F 279/02* (2013.01); *C08K 5/01* (2013.01); *C10M 2209/084* (2013.01); *C10N 2020/02* (2013.01)

(58) Field of Classification Search
CPC .. C08F 279/02; C08K 5/01; C10M 2209/084; C10M 169/047; C10M 145/14; C10N 2020/02
See application file for complete search history.

(56) References Cited

U.S. PATENT DOCUMENTS

| | | | |
|---|---|---|---|
| 2,719,125 A | 9/1955 | Roberts | |
| 2,719,126 A | 9/1955 | Fields et al. | |
| 2,760,933 A | 8/1956 | Fields et al. | |
| 2,836,564 A | 5/1958 | Roberts et al. | |
| 3,087,937 A | 4/1963 | Tesi et al. | |
| 3,254,025 A | 5/1966 | Le Suer | |
| 3,502,677 A | 3/1970 | Le Suer | |
| 3,663,561 A | 5/1972 | Blaha | |
| 4,259,194 A | 3/1981 | deVries | |
| 4,259,195 A | 3/1981 | King et al. | |
| 4,261,843 A | 4/1981 | King et al. | |
| 4,263,152 A | 4/1981 | King et al. | |
| 4,265,773 A | 5/1981 | deVries et al. | |
| 4,272,387 A | 6/1981 | King et al. | |
| 4,283,295 A | 8/1981 | deVries et al. | |
| 4,285,822 A | 8/1981 | deVries et al. | |
| 4,788,361 A | 11/1988 | Olson et al. | |
| 4,857,214 A | 8/1989 | Papay et al. | |
| 4,873,009 A | 10/1989 | Anderson | |
| 5,002,676 A | 3/1991 | Willis et al. | |
| 5,625,005 A | 4/1997 | Mallya et al. | |
| 5,840,663 A | 11/1998 | Nibert et al. | |
| 8,067,349 B2 | 11/2011 | Stoehr et al. | |
| 10,975,325 B2* | 4/2021 | Csihony | C10M 145/14 |
| 2009/0005277 A1 | 1/2009 | Watts et al. | |
| 2010/0190671 A1* | 7/2010 | Stoehr | C10M 143/12 508/469 |
| 2012/0053100 A1* | 3/2012 | Radano | C10M 169/041 508/474 |
| 2012/0302476 A1* | 11/2012 | Koschabek | C08F 220/1818 508/469 |
| 2013/0079265 A1* | 3/2013 | Eisenberg | C10M 149/00 508/500 |
| 2019/0071615 A1* | 3/2019 | Scholler | C08F 220/18 |
| 2019/0203148 A1* | 7/2019 | Scholler | C08F 290/048 |

FOREIGN PATENT DOCUMENTS

| | | |
|---|---|---|
| DE | 19631170 A1 | 2/1998 |
| EP | 0955320 A1 | 11/1999 |
| EP | 0699694 B1 | 1/2000 |
| EP | 0637332 B1 | 5/2003 |
| EP | 0744457 B1 | 9/2003 |
| EP | 0621293 B1 | 6/2004 |
| EP | 0979834 B1 | 7/2004 |
| EP | 0937769 B1 | 8/2004 |
| GB | 2270317 A | 3/1994 |
| WO | 9406897 A1 | 3/1994 |
| WO | 9630421 A1 | 10/1996 |
| WO | 9718247 A1 | 5/1997 |
| WO | 9747661 A1 | 12/1997 |
| WO | 9801478 A1 | 1/1998 |
| WO | 9840415 A1 | 9/1998 |
| WO | 9910387 A1 | 3/1999 |
| WO | 2004083169 A1 | 9/2004 |
| WO | 2011-088929 A1 | 7/2011 |
| WO | 2019-005680 A1 | 1/2019 |

(Continued)

OTHER PUBLICATIONS

Corresponding EP Application 20213727.9 European Search Report.

*Primary Examiner* — Ellen M McAvoy
(74) *Attorney, Agent, or Firm* — David M. Weisberg

(57) ABSTRACT

A comb copolymer viscosity modifier may be made by polymerization comprising at least, or consisting essentially of, the following monomers: (a) (optionally from 7.0 wt % to 18 wt %, by repeat units, of) a hydrogenated polybutadiene-based (alk)acrylate ester macromonomer; (b) (optionally from 33 wt % to 64 wt % or from 38 wt % to 58 wt %, by repeat units, of) a $C_3$-$C_8$ alkyl (alk)acrylate ester monomer; (c) (optionally up to 35.0 wt %, by repeat units, of) a $C_{12}$-$C_{24}$ alkyl (alk)acrylate ester monomer; and (d) (optionally from 3.0 wt % to 27 wt %, by repeat units, of) a $C_6$-$C_{20}$ aryl, aralkyl, or alkaryl (alk)acrylate ester monomer, such that a sum of repeat units due to (c) plus (d) constitute at least 21.0 wt % of repeat units of the comb copolymer viscosity modifier. Lubricant compositions comprising the comb copolymer viscosity modifier, as well as uses thereof and methods for modifying viscosity and dispersancy, are also contemplated.

17 Claims, No Drawings

(56) References Cited

FOREIGN PATENT DOCUMENTS

| WO | 2019-012031 | A1 | | 1/2019 |
|----|-------------|----|----|--------|
| WO | 2020-187954 | A1 | | 9/2020 |
| WO | 2020187954  |    | †  | 9/2020 |

\* cited by examiner
† cited by third party

HIGH VISCOSITY INDEX COMB POLYMER VISCOSITY MODIFIERS AND METHODS OF MODIFYING LUBRICANT VISCOSITY USING SAME

FIELD

This disclosure generally relates to polyalkyl(alk)acrylate comb copolymers useful in modifying viscosity of compositions such as lubricant compositions, e.g., for passenger car, heavy-duty diesel, and marine diesel engines, in functional fluids, such as manual/automatic transmission fluids. More specifically, certain polyalkyl(alk)acrylate comb copolymers may have specific repeat unit chemistries and contents, and lubricant compositions incorporating such copolymers may advantageously exhibit certain characteristics, such as kinematic viscosities, high-temperature high-shear viscosities, and optionally also soot dispersancy, that can meet increasingly demanding specifications.

BACKGROUND

Polyalkyl(alk)acrylates—generally synthesized by simple (free-radical) copolymerization of a mixture of different alkyl (alk)acrylates—may bring about, as additives to lubricating oil basestocks (though still depending on molecular weight and composition), a rise in viscosity index (VI) paired with, in comparison to other viscosity index improvers (VIIs), improved tow-temperature properties (R. M. Mortier, S. T. Orszulik (eds.), Chemistry and Technology of Lubricants, Blackie Academic & Professional, 1st ed., London 1993, 124-159 & 165-167). A fundamental hurdle for usability as a viscosity modifying additive is, trivially, its compatibility/solubility in the component(s) to be thickened, which, in the case of the polyacrylates, can depend on the presence of a sufficiently large number of alkyl side chains having typically 6-24 carbon atoms. The VI of polyalkyl (alk)acrylates can sometimes be raised by copolymerizing short-chain alkyl(meth)acrylates, for example methyl methacrylate or butyl methacrylate (cf. European publication nos. EP 0 637 332, EP 0 937 769, and EP 0 979 834, for instance). However, the shorter-chain comonomer component lowers the solubility at low temperatures, so that the proportion of methyl methacrylate typically can be restricted, for example, to about 25% by weight or less. The VIs of these comb-like polymers thus achievable are, depending on concentration, permanent shear stability index (PSSI) and base oil type, in the range between 150 and 250.

A further class of VIIs involves styrene-alkyl maleate copolymers obtained by polymer-analogous esterification of styrene-maleic anhydride copolymers with typically $C_6$-$C_{24}$ alcohols. The esterification can be driven up to a conversion of about 95% with addition of butanol. Complete conversion of the acid functionalities can be achieved by adding an amine to form amidic or imidic groups (see, e.g., U.S. Pat. No. 3,702,300 and European publication no. EP 0 969 077).

The viscosities of polymer solutions in mineral oils or synthetic oils can be dependent upon the molecular weight, to some degree. This also may have the consequence that temperature dependence of the viscosity decreases or the VI increases with rising molecular weight (cf. J. Bartz, Additive für Schmierstoffe [Additives for Lubricants], Expert-Verlag, Renningen-Malmsheim 1994, 197-252). In connection with the temperature increase, reference is also made to disentanglement of collapsed knots to give the extended worm-like molecule.

In parallel to molecular weight, the shear stability, however, can typically decrease as a result of chain breakage under high shear. As a result of this contrary effect, shear stable VIIs, as required for manual transmission oils, automatic transmission oils, hydraulic oils, motor oils, or the like, based on conventional polymer types such as poly (meth)acrylates may often be realizable only with addition amounts that are undesirably high. VIIs with a relatively low contribution to viscosity at relatively low temperatures, relatively moderate thickening in the VI range from about 20° C. to about 100° C., relatively high contribution to viscosity above about 100° C., and simultaneously good oil solubility/dispersibility within a broad temperature range may therefore be of particular interest.

In addition to linear comb-like polymers such as the poly(meth)acrylates, VIIs based on comb polymers are already described in the patent literature. For example, European publication no, EP 0 744 457 discloses comb polymers of relatively high order based purely on polyalkyl (meth)acrylates, in which the side arms themselves consist of oligomeric polyalkyl(meth)acrylate. In addition, the patent literature includes further patents regarding comb polymers in which the side chains are saturated/hydrogenated polyolefins and the backbone of short-chain monomers (such as alkyl(meth)acrylates or alkylstyrenes). For instance, European publication no. EP 0 621 293 discloses comb polymer side chains formed from hydrogenated polybutadiene. Similarly, European publication no. EP 0 699 694 discloses comb polymer side chains based on saturated monoolefins, such as polyisobutylene or atactic polypropylene.

Though not strictly comb copolymers, triblock copolymers have been disclosed for VII applications based on polyalkyl(meth)acrylates (see, e.g., P. Callais, S. Schmidt, N. Macy, SAE Technical Paper Series, No. 2004-01-3047) and also based on a polybutyl methacrylate core and hydrogenated polybutadiene/polyisoprene blocks (U.S. Pat. No. 5,002,676). Anionically prepared A-B-A block copolymers with a polystyrene core and, for example, hydrogenated polyisoprene arms even find commercial use as VIIs (U.S. Pat. No. 4,788,361).

In addition to the above-described application as VIIs, comb polymers with hydrogenated or saturated side chains are also known, though for different applications. For instance, German publication no. DE 196 31 170 discloses comb polymers for impact-resistant molding materials, the polymers being a sequence of polyisobutylene-containing macromonomers without additional short-chain backbone monomers. Also, European publication no. EP 0 955 320 discloses a way of attaching a functionalized polypropylene to a styrene-maleic anhydride backbone in a polymer-analogous reaction to form a soft highly insulating comb polymer gel; the molecular weights of the polypropylene used are relatively high, e.g., up to 300 000 g/mol. In one example from the chemistry of adhesives, comb polymers with hydrogenated polybutadiene or isoprene side chains are disclosed, with the polymer backbone also made from acrylic acid as well as alkyl(meth)acrylates (U.S. Pat. No. 5,625,005).

It would be additionally desirable for such comb copolymers to function, even if only secondarily, to improve dispersancy, especially for applications where contaminants such as sludge and/or soot may be problematic if allowed to deposit (drop out of suspension/solution) on engine/transmission parts. As such, the dispersancy properties could be balanced with the viscosity modification properties of such comb copolymers through polymer architecture design and/ or repeat unit inclusion/exclusion. Indeed, although conjugated and/or aromatic moieties present in repeat unit structures may benefit dispersancy, they can also tend to be a detriment toward at least certain viscometric properties. Nevertheless, by reducing/eliminating styrenics and yet still finding ways to incorporate conjugated/aromatic moieties, the viscometric detriments that can be associated with styrenics can be avoided while still enabling the added soot dispersancy, for example, from aromatics.

The copolymers detailed above are used commercially in many ways. Accordingly, most of these polymers exhibit a satisfactory property profile for their respective applications. However, of interest generally would be polymers having unique trade-offs or synergies regarding thickening action, viscosity index, shear stability, and dispersancy, such as to achieve a desired combination of viscosity and dispersancy capabilities with minimum use of additive in lubricant compositions over a wide temperature range and without little to no premature polymer degradation.

Furthermore, such comb copolymers could desirably be producible in a simple and inexpensive manner, especially utilizing commercially available components, for instance while simultaneously and advantageously exhibiting viscosity index-improving action and/or dispersancy (e.g., soot dispersancy) capability in lubricant components/compositions.

It is thus important to find and characterize suitable polyacrylate viscosity modifiers that can offer different advantages and/or trade-offs with respect to viscosity modification and/or dispersancy than conventional VIIs.

SUMMARY

Accordingly, the present disclosure provides a comb copolymer viscosity modifier made by polymerization comprising at least, or consisting essentially of, the following monomers: (a) a hydrogenated polybutadiene-based (alk)acrylate ester macromonomer (which repeat units may optionally comprise from 7.0 wt % to 18 wt % of the repeat units of the comb copolymer viscosity modifier); (b) a $C_3$-$C_8$ alkyl (alk)acrylate ester monomer (which repeat units may optionally comprise from 33 wt % to 64 wt % of the repeat units of the comb copolymer viscosity modifier); (c) a $C_{12}$-$C_{24}$ alkyl (alk)acrylate ester monomer (which repeat units may optionally comprise from 5.0 wt % to 35.0 wt %, or alternatively at least 11.0 wt %, of the repeat units of the comb copolymer viscosity modifier); and (d) a $C_8$-$C_{20}$ aryl, aralkyl, or alkaryl (alk)acrylate ester monomer (which repeat units may optionally comprise from 3.0 wt % to 27 wt %, or alternatively at least 10.0 wt %, of the repeat units of the comb copolymer viscosity modifier), such that a sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 21.0 wt % of repeat units of the comb copolymer viscosity modifier. In some embodiments, the $C_3$-$C_8$ alkyl (alk)acrylate ester monomer is a butyl acrylate and/or a butyl methacrylate, the $C_{12}$-$C_{24}$ alkyl (alk)acrylate ester monomer comprises a lauryl acrylate, a lauryl methacrylate, a myristyl acrylate, a myristyl methacrylate, a palmityl acrylate, a palmityl methacrylate, a heptadecanoyl acrylate, a heptadecanoyl methacrylate, or a combination thereof, and/or the $C_6$-$C_{20}$ aryl, aralkyl, or alkaryl (alk)acrylate ester monomer comprises a benzyl acrylate, a benzyl methacrylate, a naphthyl acrylate, a naphthyl methacrylate, a phenyl acrylate, a phenyl methacrylate, a toluyl acrylate, a toluyl methacrylate, a phenylethyl acrylate, a phenylethyl methacrylate, an anthracenyl acrylate, an anthracenyl methacrylate, a phenanthrenyl acrylate, a phenanthrenyl methacrylate, a fluorenyl acrylate, a fluorenyl methacrylate, an ethylfluorenyl acrylate, an ethylfluorenyl methacrylate, or a combination thereof. Additionally or alternatively, in some embodiments, the comb copolymer viscosity modifier: (i) is made by polymerization of monomers that comprise substantially no styrene nor styrenic monomers; and (ii) comprises substantially no styrene-based nor styrenic-based repeat units. In further additional or alternative embodiments, the comb copolymer viscosity modifier is made by polymerization comprising monomers (a), (b), (c), (d), and (e) at least one additional olefinic monomer, different from monomers (a), (b), (c), and (d), and which is not a $C_1$-$C_{18}$ alkyl-endcapped or $C_6$-$C_{20}$ aryl-, aralkyl-, or alkaryl-endcapped $C_2$-$C_6$ oxyalkyl or $C_2$-$C_6$ oligo(alkylene glycol)-based (alk)acrylate ester monomer nor a hydroxyalkyl or H-endcapped oligo(alkylene glycol)-based (alk)acrylate monomer.

The present disclosure also provides a lubricant composition comprising: (optionally from 75 mass % to 95 mass %, based on the total mass of the lubricant composition, of) a lubricating oil basestock (e.g., comprising a Group I, a Group II basestock, a Group III basestock, or a mixture thereof); at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and (optionally from 0.5 mass % to 8.0 mass %, based on the total mass of the lubricant composition, of) the comb copolymer viscosity modifier according to the present disclosure. In some embodiments, the lubricant composition may exhibit: a non-linear model apparent yield stress (APY) value of at most 0.35 Pa and/or a linear model soot rating of at least 25; and at least three of the following characteristics: a high-temperature high-shear viscosity at approximately 150° C. (HTHS150) of at least 2.55 cPs; a high-temperature high-shear viscosity at approximately 100° C. (HTHS100) of at most 5.60 cPs; a high-temperature high-shear viscosity at approximately 80° C. (HTHS80) of at most 8.30 cPs; a kinematic viscosity at approximately 100° C. (KV100) from 6.80 cSt to 9.00 cSt; a kinematic viscosity at approximately 40° C. (KV40) of at most 35.0 cSt; a kinematic viscosity at approximately 20° C. (KV20) of at most 79.5 cSt; and a viscosity index of at least 175. In additional or alternative embodiments, such as those in which the sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 23.0 wt % of repeat units of the comb copolymer viscosity modifier, the lubricant composition may exhibit at least four of the following characteristics: a high-temperature high-shear viscosity at approximately 150° C. (HTHS150) of at least 2.55 cPs; a high-temperature high-shear viscosity at approximately 100° C. (HTHS100) of at most 5.58 cPs; a high-temperature high-shear viscosity at approximately 80° C. (HTHS80) of at most 8.25 cPs; a kinematic viscosity at approximately 100° C. (KV100) from 6.90 cSt to 8.50 cSt; a kinematic viscosity at approximately 40° C. (KV40) of at most 34.5 cSt; a kinematic viscosity at approximately 20° C. (KV20) of at most 79.0 cSt; and a viscosity index of at least 180.

The present disclosure also provides a method of modifying a viscosity and a dispersancy of a lubricant composition comprising: forming a viscosity and dispersancy modified mixture by combining a viscosity modifying amount (optionally from 1.0 mass % to 7.0 mass %, based on the total mass of the viscosity modified mixture) of the comb copolymer viscosity modifier according to the present disclosure with one of the following lubricant composition components: (1) a lubricating oil basestock comprising at least 75% by weight of one or more basestocks comprising a Group I, Group II, and/or Group III basestock); (2) at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; or (3) a lubricant composition according to the present disclosure comprising both (1) and (2), wherein the viscosity and dispersancy modified mixture may exhibit: at least a 25% (optionally at least a 33%) improvement, relative to the lubricant composition components (1), (2), or (3) without the comb copolymer viscosity modifier, with regard to soot dispersancy; and at least a 5% (optionally at least a 10%) difference, relative to the lubricant composition components (1), (2), or (3) without the comb copolymer viscosity modifier, with regard to one or more (optionally three or more, or four or more) of HTHS150, HTHS100, HTHS80, KV100, KV40, KV20, and VI.

The present disclosure also provides a use of a comb copolymer viscosity modifier according to the present disclosure to modify a viscosity and a dispersancy of a lubricant composition according to the present disclosure, for instance using a method according to the present disclosure.

DETAILED DESCRIPTION

The present disclosure relates to viscosity modifying comb polymers and to methods of use and/or uses thereof to modify viscosity and/or dispersancy, e.g., of a lubricant component and/or a lubricant composition. The comb copolymer viscosity modifiers disclosed herein are polymers made from alkyl (alk)acrylate monomers.

The polymeric alkyl (alk)acrylate (co)polymers described herein are derived from polymerization (typically, but not limited to, free radical polymerization) of one or more alkyl (alk)acrylate monomers, dimers, trimers, oligomers, macromonomers, and/or the like (collectively abbreviated herein as "monomers," for brevity). Alkyl (alk)acrylate monomers typically have the following general chemical structure (I):

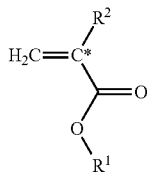

(I)

in which the C=C* double bond is an olefinic bond, $R^1$ represents the "alkyl" portion of the nomenclature on the oxygen side of the ester, and $R^2$ represents the parenthetical "alk" portion of the nomenclature. When $R^2$ is hydrogen, the monomer is an alkyl acrylate; when $R^2$ is an alkyl group, the monomer is an alkyl alkacrylate. When present, the nature of the "alk" nomenclature is based on the number of carbons in the $R^2$ alkyl group—e.g., one carbon (methyl) means a methacrylate, whereas two carbons (ethyl) means an ethacrylate, etc. Similarly, the nature of the "alkyl" nomenclature is based on the number of carbons in the $R^1$ alkyl group—e.g., one carbon (methyl) means a methyl (alk)acrylate, whereas two carbons (ethyl) means an ethyl (alk)acrylate, etc. Thus, for example, a lauryl methacrylate means that $R^1$ is a $C_{12}$ alkyl moiety and $R^2$ is a $C_1$ alkyl moiety.

In particular, the comb copolymer viscosity modifiers according to the present disclosure can be made by polymerization comprising, consisting essentially of, or consisting of at least the following monomers: (a) a polyalkylene-based (alk)acrylate ester macromonomer; (b) a $C_3$-$C_{10}$ (in particular a $C_3$-$C_8$) alkyl (alk)acrylate ester monomer; (c) a different $C_{10}$-$C_{30}$ (in particular a $C_{12}$-$C_{24}$) alkyl (alk)acrylate ester monomer; and (d) a $C_6$-$C_{20}$ aryl, aralkyl, or alkaryl (alk)acrylate ester monomer. In some embodiments, the comb copolymer viscosity modifier may further comprise (e) one or more other olefinic comonomers, different from monomers (a), (b), (c), and (d), and which is not a $C_1$-$C_{18}$ alkyl-endcapped or $C_6$-$C_{20}$ aryl-, aralkyl-, or alkaryl-endcapped $C_2$-$C_6$ oxyalkyl or $C_2$-$C_6$ oligo(alkylene glycol)-based (alk)acrylate ester monomer nor a hydroxyalkyl or H-endcapped oligo(alkylene glycol)-based (alk)acrylate monomer. For example, the $C_1$-$C_{18}$ alkyl-endcapped or $C_6$-$C_{20}$ aryl-, aralkyl-, or alkaryl-endcapped $C_2$-$C_6$ oxyalkyl or $C_2$-$C_6$ oligo(alkylene glycol)-based (alk)acrylate ester monomer and/or hydroxyalkyl or H-endcapped oligo(alkylene glycol)-based (alk)acrylate monomer can have the following structure (II):

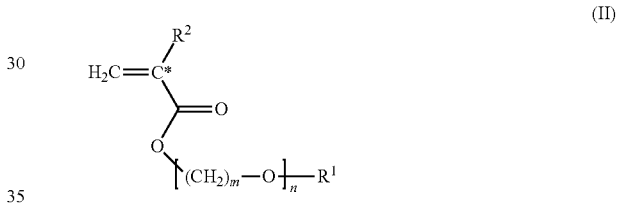

(II)

where $R^2$ represents hydrogen or $C_1$-$C_2$ alkyl (in particular, hydrogen or methyl); m is from 2 to 6 (in particular, from 2 to 4), such that —$(CH_2)_m$— that may represent a linear, branched, and/or cyclic alkyl group between oxygens; n is from 1 to 10 (in particular, from 1 to 6); and $R^1$ represents hydrogen, a $C_1$-$C_{18}$ linear, branched, and/or cyclic alkyl endcap, or a $C_6$-$C_{20}$ aryl, aralkyl, or alkaryl endcap (in particular, H, $C_1$-$C_7$ linear, branched, and/or cyclic alkyl or $C_6$-$C_{11}$ aryl, aralkyl, or alkaryl).

In some embodiments, the comb copolymer viscosity modifier may be made by polymerization of monomers that comprise substantially no styrene nor styrenic monomers and/or may comprise substantially no styrene-based nor styrenic-based repeat units. It is important to note that the polyalkylene-based (alk)acrylate ester macromonomer, (a), comprises repeat units as formed, which repeat units are considered repeat units of the comb copolymer viscosity modifier herein, even if such monomers are not called out specifically. Thus, when a comb copolymer comprises substantially no styrene-based nor styrenic-based repeat units herein, that includes the repeat units of the macromonomer, as well as the repeat units of the other comonomers. As used herein, "styrenic" monomers are defined as those monomers that have a styrene (vinyl benzene) core, i.e., containing 8 to 17 carbon atoms, an olefinic double bond, and a 6-membered, all-carbon aromatic moiety (including multi-ring systems including a phenyl ring) attached directly to one end of the olefinic double bond and whose ring hydrogens may be optionally substituted (e.g., a phenyl, naphthenyl, fluorenyl, anthracenyl, phenanthrenyl, biphenylenyl, or acenaphthylenyl moiety).

As used herein, the term "comb copolymer" is known per se and indicates the presence of relatively long side chains (as opposed to merely pendant moieties) being bonded to a polymeric main chain, frequently also called a polymer "backbone." In the present disclosure, the comb copolymer viscosity modifiers comprise at least one repeat unit derived from a polyalkylene-based macromonomer, whose repeat units are based almost entirely on polymerization or oligomerization of olefinic, non-aromatic, purely hydrocarbon monomers (i.e., neither containing, nor made from monomers containing, more than a contaminant level of heteroatoms, such as O, N, S, P, Si, halides, metals, etc.). Such monomers may include, but are not necessarily limited to, alkyl pendant mono-olefins (alkenes) such as ethylene, propylene, 1-butene, isobutylene, 1-pentene, 1-hexene, vinyl cyclohexene, and the like, and combinations thereof, and/or those non-aromatic monomers whose polymerized repeat unit still contains at least one unsaturation (typically alkadienes such as butadiene, isoprene, hexadienes, non-aromatic hexatrienes, norbornadiene, and the like, and combinations thereof). To the extent that any such monomers polymerized/oligomerized to form the macromonomer resulted in remaining unsaturations, it is preferable that such unsaturations would be treated, such as by hydrogenation, to remove said unsaturations. As used herein, the term "main chain" does not necessarily infer that its chain length is greater than that of the side chains it merely relates to the polymerization process that has linked the enumerated comonomers, including the macromonomer, together.

As used herein, the term "repeat unit" is widely known in the technical field and is typically linked (though not identical) to the monomer(s) from which a (co)polymer is made. For example, in free-radical polymerization, (olefinic) double bonds within a single monomer or macromonomer are opened up to enable formation of covalent bonds with neighboring monomers, thereby forming the polymer chain. Macromonomers are themselves made by a polymerization/oligomerization of monomers, though they are employed as a "single" (macro)monomer in polymerization of the comb copolymer viscosity modifiers described herein. Nonetheless, when the term "repeat unit" or "repeat units" is invoked, any polymerized monomer is referenced. However, just because a component could be made by polymerization, that does not mean it constitutes a "repeat unit." For example, in the case of a linear $C_{18}$ methacrylate ester, though the 18-carbon linear chain could theoretically have been made by oligomerization of 9 ethylene units, such component is more likely made by a non-polymerization route (such as involving isolation of stearyl alcohol or some similar natural product), and therefore is not considered to be a "macromonomer" for the purposes of this disclosure.

In particularly preferred embodiments, the polyalkylene-based (alk)acrylate ester macromonomer, (a), can comprise or be a hydrogenated alkadiene-based (alk)acrylate ester macromonomer, such as a hydrogenated polybutadiene-based (alk)acrylate ester macromonomer, Additionally, referring back to the general formula (I) above for acrylate monomers, the optional "alk" in the macromonomer can advantageously represent an $R^2$ of hydrogen (no "alk") or $C_1$-$C_2$ alkyl (in particular, hydrogen or methyl).

Regarding the amount of (a) polyalkylene-based (alk)acrylate ester macromonomer used to make the comb copolymer viscosity modifier, repeat units based on the polyalkylene-based (e.g., hydrogenated polybutadiene) (alk)acrylate ester macromonomer may comprise at least 5.0 wt % (e.g., at least 6.0 wt %, at least 7.0 wt %, at least 8.0 wt %, at least 9.0 wt %, at least 10 wt %, at least 11 wt %, at least 12 wt %, or at least 13 wt %) and/or up to 30 wt % (e.g., up to 28 wt %, up to 25 wt %, up to 22 wt %, up to 20 wt %, up to 18 or up to 15 wt %) of the repeat units of the comb copolymer viscosity modifier. For example, repeat units based on the polyalkylene-based (e.g., hydrogenated polybutadiene-based) (alk)acrylate ester macromonomer may comprise from 5.0 wt % to 30 wt %, from 5.0 wt % to 28 wt %, from 5.0 wt % to 25 wt %, from 5.0 wt % to 22 wt %, from 5.0 wt % to 20 w %, from 5.0 wt % to 18 wt %, from 5.0 wt % to 15 wt %, 6.0 wt % to 30 wt %, from 6.0 wt % to 28 wt %, from 6.0 wt % to 25 wt %, from 6.0 wt % to 22 wt %, from 6.0 wt % to 20 wt %, from 6.0 wt % to 18 wt %, from 6.0 wt % to 15 wt %, 7.0 wt % to 30 wt %, from 7.0 wt % to 28 wt %, from 7.0 wt % to 25 wt %, from 7.0 wt % to 22 wt %, from 7.0 wt % to 20 wt %, from 7.0 wt % to 18 wt %, from 7.0 wt % to 15 wt %, 8.0 wt % to 30 wt %, from 8.0 wt % to 28 wt %, from 8.0 wt % to 25 wt %, from 8.0 wt % to 22 wt %, from 8.0 wt % to 20 wt %, from 8.0 wt % to 18 wt %, from 8.0 wt % to 15 wt %, from 9.0 wt % to 30 wt %, from 9.0 wt % to 28 wt %, from 9.0 wt % to 25 wt %, from 9.0 wt % to 22 wt %, from 9.0 wt % to 20 wt %, from 9.0 wt % to 18 wt %, from 9.0 wt % to 15 wt %, from 10 wt % to 30 wt %, from 10 wt % to 28 wt %, from 10 wt % to 25 wt %, from 10 wt % to 22 wt %, from 10 wt % to 20 wt %, from 10 wt % to 18 wt %, from 10 wt % to 15 wt %, from 11 wt % to 30 wt %, from 11 wt % to 28 wt %, from 11 wt % to 25 wt %, from 11 wt % to 22 we/o, from 11 wt % to 20 wt %, from 11 wt % to 18 wt %, from 11 wt % to 15 wt %, from 12 wt % to 30 wt %, from 12 wt % to 28 wt %, from 10 wt % to 25 wt %, from 12 wt % to 22 wt %, from 12 wt % to 20 wt %, from 12 wt % to 18 wt %, from 12 wt % to 15 wt %, from 13 wt % to 30 wt %, from 13 wt % to 28 wt %, from 13 wt % to 25 wt %, from 13 wt % to 22 wt %, from 13 wt % to 20 wt %, from 13 wt % to 18 wt %, or from 13 wt % to 15 wt %, based on the total weight of repeat units of the comb copolymer viscosity modifier. In particular, repeat units based on the polyalkylene-based (e.g., hydrogenated polybutadiene-based) (alk)acrylate ester macromonomer may comprise from 5.0 wt % to 22 wt %, from 6.0 wt % to 20 wt %, from 7.0 wt % to 18 wt %, or from 9.0 wt % to 15 wt % of the repeat units of the comb copolymer viscosity modifier.

Macromonomers useful in accordance with the present disclosure may advantageously have one polymerizable double bond, which is typically terminal (or proximate to a terminal position). The polymerizable double bond may be present as a result of the preparation of the macromonomers (for example, a cationic polymerization of isobutylene can form a polyisobutylene (PIE) with a terminal double bond).

In one embodiment, the polyalkylene-based (alk)acrylate macromonomer can be made by reacting (alk)acrylic acid (or a salt thereof) with a polyalkylene-based macro-alcohol, such as Krasol® HLBH5000m (commercially available from Cray Valley of Exton, Pa.), a hydrogenated polybutadiene that has been mono-hydroxy-functionalized. Other macroalcohols based on hydrogenated polybutadienes can be obtained, e.g., according to British Publication No. GB 2270317. Some commercially available macromonomers may include, for example, Kraton Liquid L-1253™ and Kraton Liquid L-1203™ (from Kraton Polymers of Houston, Tex.), both made from hydrogenated polybutadienes that have been methacrylate-functionalized. Other polyolefin-based macromonomers and their preparations are also described, for example, in European Publication Nos. EP 0 621 293 and EP 0 699 694.

Regarding (b) the $C_3$-$C_{10}$/$C_3$-$C_8$ alkyl (alk)acrylate ester monomer and referring back to the general formula (I) above for acrylate monomers, the optional "alk" can advantageously represent an $R^2$ of hydrogen (no "alk") or $C_1$-$C_2$ alkyl. Thus, given the $C_3$-$C_8$ alkyl range for the acrylate ester moiety of $R^1$, this monomer can comprise or be one or more of n-propyl acrylate, n-propyl methacrylate, n-propyl ethacrylate, isopropyl acrylate, isopropyl methacrylate, isopropyl ethacrylate, n-butyl acrylate, n-butyl methacrylate, n-butyl ethacrylate, t-butyl acrylate, t-butyl methacrylate, t-butyl ethacrylate, 2-butyl acrylate, 2-butyl methacrylate, 2-butyl ethacrylate, n-pentyl acrylate, n-pentyl methacrylate, n-pentyl ethacrylate, 2-pentyl acrylate, 2-pentyl methacrylate, 2-pentyl ethacrylate, 3-pentyl acrylate, 3-pentyl methacrylate, 3-pentyl ethacrylate, cyclopentyl acrylate, cyclopentyl methacrylate, cyclopentyl ethacrylate, 2-methyl-1-butyl acrylate, 2-methyl-1-butyl methacrylate, 2-methyl-1-butyl ethacrylate, 2-methyl-2-butyl acrylate, 2-methyl-2-butyl methacrylate, 2-methyl-2-butyl ethacrylate, iso-amyl acrylate, iso-amyl methacrylate, iso-amyl ethacrylate, n-hexyl acrylate, n-hexyl methacrylate, n-hexyl ethacrylate, 2-hexyl acrylate, 2-hexyl methacrylate, 2-hexyl ethacrylate, 3-hexyl acrylate, 3-hexyl methacrylate, 3-hexyl ethacrylate, cyclohexyl acrylate, cyclohexyl methacrylate, cyclohexyl ethacrylate, cyclopentylmethyl acrylate, cyclopentylmethyl methacrylate, cyclopentylmethyl ethacrylate, 2-methyl-1-cyclopentyl acrylate, 2-methyl-1-cyclopentyl methacrylate, 2-methyl-1-cyclopentyl ethacrylate, 3-methyl-1-cyclopentyl acrylate, 3-methyl-1-cyclopentyl methacrylate, 3-methyl-1-cyclopentyl ethacrylate, 2-methyl-1-pentyl acrylate, 2-methyl-1-pentyl methacrylate, 2-methyl-1-pentyl ethacrylate, 2-methyl-2-pentyl acrylate, 2-methyl-2-pentyl methacrylate, 2-methyl-2-pentyl ethacrylate, 2-methyl-3-pentyl acrylate, 2-methyl-3-pentyl methacrylate, 2-methyl-3-pentyl ethacrylate, 3-methyl-1-pentyl acrylate, 3-methyl-1-pentyl methacrylate, 3-methyl-1-pentyl ethacrylate, 3-methyl-2-pentyl acrylate, 3-methyl-2-pentyl methacrylate, 3-methyl-2-pentyl ethacrylate, 3-methyl-3-pentyl acrylate, 3-methyl-3-pentyl methacrylate, 3-methyl-3-pentyl ethacrylate, 4-methyl-1-pentyl methacrylate, 4-methyl-1-pentyl ethacrylate, 4-methyl-2-pentyl acrylate, 4-methyl-2-pentyl methacrylate, 4-methyl-2-pentyl ethacrylate, 2-ethyl-1-butyl methacrylate, 2-ethyl-1-butyl ethacrylate, 2,2-dimethyl-1-butyl acrylate, 2,2-dimethyl-1-butyl methacrylate, 2,2-dimethyl-1-butyl ethacrylate, 2,3-dimethyl-1-butyl acrylate, 2,3-dimethyl-1-butyl methacrylate, 2,3-dimethyl-1-butyl ethacrylate, 3,3-dimethyl-1-butyl acrylate, 3,3-dimethyl-1-butyl methacrylate, 3,3-dimethyl-1-butyl ethacrylate, 2,3-dimethyl-2-butyl acrylate, 2,3-dimethyl-2-butyl methacrylate, 2,3-dimethyl-2-butyl ethacrylate, n-heptyl acrylate, n-heptyl methacrylate, n-heptyl ethacrylate, 2-heptyl acrylate, 2-heptyl methacrylate, 2-heptyl ethacrylate, 3-heptyl acrylate, 3-heptyl methacrylate, 3-heptyl ethacrylate, 4-heptyl acrylate, 4-heptyl methacrylate, 4-heptyl ethacrylate, cycloheptyl acrylate, cycloheptyl methacrylate, cycloheptyl ethacrylate, cyclohexylmethyl acrylate, cyclohexylmethyl methacrylate, cyclohexylmethyl ethacrylate, 1-methyl-1-cyclohexyl acrylate, 1-methyl-1-cyclohexyl methacrylate, 1-methyl-1-cyclohexyl ethacrylate, 2-methyl-1-cyclohexyl acrylate, 2-methyl-1-cyclohexyl methacrylate, 2-methyl-1-cyclohexyl ethacrylate, 3-methyl-1-cyclohexyl acrylate, 3-methyl-1-cyclohexyl methacrylate, 3-methyl-1-cyclohexyl ethacrylate, 4-methyl-1-cyclohexyl acrylate, 4-methyl-1-cyclohexyl methacrylate, 4-methyl-1-cyclohexyl ethacrylate, cyclopentylethyl acrylate, cyclopentylethyl methacrylate, cyclopentylethyl ethacrylate, 2-methyl-1-cyclopentylmethyl acrylate, 2-methyl-1-cyclopentylmethyl methacrylate, 2-methyl-1-cyclopentylmethyl ethacrylate, 3-methyl-1-cyclopentylmethyl acrylate, 3-methyl-1-cyclopentylmethyl methacrylate, 3-methyl-1-cyclopentylmethyl ethacrylate, 1,2-dimethyl-1-cyclopentyl acrylate, 1,2-dimethyl-1-cyclopentyl methacrylate, 1,2-dimethyl-1-cyclopentyl ethacrylate, 1,3-dimethyl-1-cyclopentyl acrylate, 1,3-dimethyl-1-cyclopentyl methacrylate, 1,3-dimethyl-1-cyclopentyl ethacrylate, 1,4-dimethyl-1-cyclopentyl acrylate, 1,4-dimethyl-1-cyclopentyl methacrylate, 1,4-dimethyl-1-cyclopentyl ethacrylate, 2,3-dimethyl-1-cyclopentyl acrylate, 2,3-dimethyl-1-cyclopentyl methacrylate, 2,3-dimethyl-1-cyclopentyl ethacrylate, 2,4-dimethyl-1-cyclopentyl acrylate, 2,4-dimethyl-1-cyclopentyl methacrylate, 2,4-dimethyl-1-cyclopentyl ethacrylate, 2,5-dimethyl-1-cyclopentyl acrylate, 2,5-dimethyl-1-cyclopentyl methacrylate, 2,5-dimethyl-1-cyclopentyl ethacrylate, 3,4-dimethyl-1-cyclopentyl acrylate, 3,4-dimethyl-1-cyclopentyl methacrylate, 3,4-dimethyl-1-cyanopentyl ethacrylate, 1-ethyl-1-cyclopentyl acrylate, 1-ethyl-1-cyclopentyl methacrylate, 1-ethyl-1-cyclopentyl ethacrylate, 2-ethyl-1-cyclopentyl acrylate, 2-ethyl-1-cyclopentyl methacrylate, 2-ethyl-1-cyclopentyl ethacrylate, 3-ethyl-1-cyclopentyl acrylate, 3-ethyl-1-cyclopentyl methacrylate, 3-ethyl-1-cyclopentyl ethacrylate, 1-bicyclo[2.2.1]heptanyl acrylate, 1-bicyclo[2.2.1]heptanyl methacrylate, 1-bicyclo[2.2.1]heptanyl ethacrylate, 2-bicyclo[2.2.1]heptanyl acrylate, 2-bicyclo[2.2.1]heptanyl methacrylate, 2-bicyclo[2.2.1]heptanyl ethacrylate, 7-bicyclo[2.2.1]heptanyl acrylate, 7-bicyclo[2.2.1]heptanyl methacrylate, 7-bicyclo[2.2.1]heptanyl ethacrylate, 1-bicyclo[3.1.1]heptanyl acrylate, 1-bicyclo[3.1.1]heptanyl methacrylate, 1-bicyclo[3.1.1]heptanyl ethacrylate, 2-bicyclo[3.1.1]heptanyl acrylate, 2-bicyclo[3.1.1]heptanyl methacrylate, 2-bicyclo[3.1.1]heptanyl ethacrylate, 3-bicyclo[3.1.1]heptanyl acrylate, 3-bicyclo[3.1.1]heptanyl methacrylate, 3-bicyclo[3.1.1]heptanyl ethacrylate, 6-bicyclo[3.1.1]heptanyl acrylate, 6-bicyclo[3.1.1]heptanyl methacrylate, 6-bicyclo[3.1.1]heptanyl ethacrylate, 2-methtyl-1-hexyl acrylate, 2-methtyl-1-hexyl methacrylate, 2-methtyl-1-hexyl ethacrylate, 2-methtyl-2-hexyl acrylate, 2-methtyl-2-hexyl methacrylate, 2-methtyl-2-hexyl ethacrylate, 2-methtyl-3-hexyl acrylate, 2-methtyl-3-hexyl methacrylate, 2-methtyl-3-hexyl ethacrylate, 3-methtyl-1-hexyl acrylate, 3-methtyl-1-hexyl methacrylate, 3-methtyl-1-hexyl ethacrylate, 3-methtyl-2-hexyl acrylate, 3-methtyl-2-hexyl methacrylate, 3-methtyl-2-hexyl ethacrylate, 3-methtyl-3-hexyl acrylate, 3-methtyl-3-hexyl methacrylate, 3-methtyl-3-hexyl ethacrylate, 4-methtyl-1-hexyl acrylate, 4-methtyl-1-hexyl methacrylate, 4-methyl-1-hexyl ethacrylate, 4-methtyl-2-hexyl acrylate, 4-methtyl-2-hexyl methacrylate, 4-methtyl-2-hexyl ethacrylate, 4-methtyl-3-hexyl acrylate, 4-methtyl-3-hexyl methacrylate, 4-methtyl-3-hexyl ethacrylate, 5-methtyl-1-hexyl acrylate, 5-methtyl-1-hexyl methacrylate, 5-methtyl-1-hexyl ethacrylate, 5-methtyl-2-hexyl acrylate, 5-methtyl-2-hexyl methacrylate, 5-methtyl-2-hexyl ethacrylate, 5-methtyl-3-hexyl acrylate, 5-methtyl-3-hexyl methacrylate, 5-methtyl-3-hexyl ethacrylate, 2,2-dimethtyl-1-pentyl acrylate, 2,2-dimethtyl-1-pentyl methacrylate, 2,2-dimethtyl-1-pentyl ethacrylate, 2,2-dimethtyl-3-pentyl acrylate, 2,2-dimethtyl-3-pentyl methacrylate, 2,2-dimethtyl-3-pentyl ethacrylate, 2,3-dimethtyl-1-pentyl acrylate, 2,3-dimethtyl-1-pentyl methacrylate, 2,3-dimethtyl-1-pentyl ethacrylate, 2,3-dimethtyl-2-pentyl acrylate, 2,3-dimethtyl-2-pentyl methacrylate, 2,3-dimethtyl-2-pentyl ethacrylate, 2,3-dimethtyl-3-pentyl acrylate, 2,3-dimethtyl-3-pentyl methacrylate, 2,3-dimethtyl-3-pentyl ethacrylate, 2,4-dimethtyl-1-pentyl acrylate, 2,4-dimethtyl-1-pentyl methacrylate, 2,4-dimethtyl-1-pentyl ethacrylate, 2,4-dimethtyl-2-pentyl acrylate, 2,4-dimethtyl-2-pentyl methacrylate, 2,4-dimethtyl-2-pentyl ethacrylate, 2,4-dimethtyl-3-pentyl acrylate, 2,4-dimethtyl-3-pentyl methacrylate, 2,4-dimethtyl-3-pentyl ethacrylate, 3,4-dimethtyl-1-pentyl acrylate, 3,4-dimethtyl-1-pentyl methacrylate, 3,4-dimethtyl-1-pentyl ethacrylate, 3,4-dimethtyl-2-pentyl acrylate, 3,4-dimethtyl-2-pentyl methacrylate, 3,4-dimethtyl-2-pentyl ethacrylate, 4,4-dimethtyl-1-pentyl acrylate, 4,4-dimethtyl-1-pentyl methacrylate, 4,4-dimethtyl-1-pentyl ethacrylate, 4,4-dimethtyl-2-pentyl acrylate, 4,4-dimethtyl-2-pentyl methacrylate, 4,4-dimethtyl-2-pentyl ethacrylate, 3-ethyl-3-pentyl acrylate, 3-ethyl-3-pentyl methacrylate, 3-ethyl-3-pentyl ethacrylate, 2,2,3-trimethyl-1-butyl acrylate, 2,2,3-trimethyl-1-butyl methacrylate, 2,2,3-trimethyl-1-butyl ethacrylate, 2,2,3-trimethyl-3-butyl acrylate, 2,2,3-trimethyl-3-butyl methacrylate, 2,2,3-trimethyl-3-butyl ethacrylate, 2,3,3-trimethyl-1-butyl acrylate, 2,3,3-trimethyl-1-butyl methacrylate, 2,3,3-trimethyl-1-butyl ethacrylate, 2,3,3-trimethyl-2-butyl acrylate, 2,3,3-trimethyl-2-butyl methacrylate, 2,3,3-trimethyl-2-butyl ethacrylate, n-octyl acrylate, n-octyl methacrylate, n-octyl ethacrylate, 2-octyl acrylate, 2-octyl methacrylate, 2-octyl ethacrylate, 3-octyl acrylate, 3-octyl methacrylate, 3-octyl ethacrylate, 4-octyl acrylate, 4-octyl methacrylate, 4-octyl ethacrylate, cycloheptylmethyl acrylate, cycloheptylmethyl methacrylate, cycloheptylmethyl ethacrylate, 1-bicyclo[2.2.2]octanyl acrylate, 1-bicyclo[2.2.2]octanyl methacrylate, 1-bicyclo[2.2.2]octanyl ethacrylate, 2-bicyclo[2.2.2]octanyl acrylate, 2-bicyclo[2.2.2]octanyl methacrylate, 2-bicyclo[2.2.2]octanyl ethacrylate, 1-bicyclo[3.2.1]octanyl acrylate, 1-bicyclo[3.2.1]octanyl methacrylate, 1-bicyclo[3.2.1]octanyl ethacrylate, 2-bicyclo[3.2.1]octanyl acrylate, 2-bicyclo[3.2.1]octanyl methacrylate, 2-bicyclo[3.2.1]octanyl ethacrylate, 3-bicyclo[3.2.1]octanyl acrylate, 3-bicyclo[3.2.1]octanyl methacrylate, 3-bicyclo[3.2.1]octanyl ethacrylate, 6-bicyclo[3.2.1]octanyl acrylate, 6-bicyclo[3.2.1]octanyl methacrylate, 6-bicyclo[3.2.1]octanyl ethacrylate, 8-bicyclo[3.2.1]octanyl acrylate, 8-bicyclo[3.2.1]octanyl methacrylate, 8-bicyclo[3.2.1]octanyl ethacrylate, 1-octahydropentalenyl acrylate, 1-octahydropentalenyl methacrylate, 1-octahydropentalenyl ethacrylate, 2-octahydropentalenyl acrylate, 2-octahydropentalenyl methacrylate, 2-octahydropentalenyl ethacrylate, 3a-octahydropentalenyl acrylate, 3a-octahydropentalenyl methacrylate, 3a-octahydropentalenyl ethacrylate, 1-methyl-1-cycloheptyl acrylate, 1-methyl-1-cycloheptyl methacrylate, 1-methyl-1-cycloheptyl ethacrylate, 2-methyl-1-cycloheptyl acrylate, 2-methyl-1-cycloheptyl methacrylate, 2-methyl-1-cycloheptyl ethacrylate, 3-methyl-1-cycloheptyl acrylate, 3-methyl-1-cycloheptyl methacrylate, 3-methyl-1-cycloheptyl ethacrylate, 4-methyl-1-cycloheptyl acrylate, 4-methyl-1-cycloheptyl methacrylate, 4-methyl-1-cycloheptyl ethacrylate, cyclohexylethyl acrylate, cyclohexylethyl methacrylate, cyclohexylethyl ethacrylate, 1-ethyl-1-cyclohexyl acrylate, 1-ethyl-1-cyclohexyl methacrylate, 1-ethyl-1-cyclohexyl ethacrylate, 2-ethyl-1-cyclohexyl acrylate, 2-ethyl-1-cyclohexyl methacrylate, 2-ethyl-1-cyclohexyl ethacrylate, 3-ethyl-1-cyclohexyl acrylate, 3-ethyl-1-cyclohexyl methacrylate, 3-ethyl-1-cyclohexyl ethacrylate, 4-ethyl-1-cyclohexyl acrylate, 4-ethyl-1-cyclohexyl methacrylate, 4-ethyl-1-cyclohexyl ethacrylate, 1,2-dimethyl-1-cyclohexyl acrylate, 1,2-dimethyl-1-cyclohexyl methacrylate, 1,2-dimethyl-1-cyclohexyl ethacrylate, 1,3-dimethyl-1-cyclohexyl acrylate, 1,3-dimethyl-1-cyclohexyl methacrylate, 1,3-dimethyl-1-cyclohexyl ethacrylate, 1,4-dimethyl-1-cyclohexyl acrylate, 1,4-dimethyl-1-cyclohexyl methacrylate, 1,4-dimethyl-1-cyclohexyl ethacrylate, 2,2-dimethyl-1-cyclohexyl acrylate, 2,2-dimethyl-1-cyclohexyl methacrylate, 2,2-dimethyl-1-cyclohexyl ethacrylate, 2,3-dimethyl-1-cyclohexyl acrylate, 2,3-dimethyl-1-cyclohexyl methacrylate, 2,3-dimethyl-1-cyclohexyl ethacrylate, 2,4-dimethyl-1-cyclohexyl acrylate, 2,4-dimethyl-1-cyclohexyl methacrylate, 2,4-dimethyl-1-cyclohexyl ethacrylate, 2,6-dimethyl-1-cyclohexyl acrylate, 2,6-dimethyl-1-cyclohexyl methacrylate, 2,6-dimethyl-1-cyclohexyl ethacrylate, 3,3-dimethyl-1-cyclohexyl acrylate, 3,3-dimethyl-1-cyclohexyl methacrylate, 3,3-dimethyl-1-cyclohexyl ethacrylate, 3,4-dimethyl-1-cyclohexyl acrylate, 3,4-dimethyl-1-cyclohexyl methacrylate, 3,4-dimethyl-1-cyclohexyl ethacrylate, 3,5-dimethyl-1-cyclohexyl acrylate, 3,5-dimethyl-1-cyclohexyl methacrylate, 3,5-dimethyl-1-cyclohexyl ethacrylate, 4,4-dimethyl-1-cyclohexyl acrylate, 4,4-dimethyl-1-cyclohexyl methacrylate, 4,4-dimethyl-1-cyclohexyl ethacrylate, 2-methyl-1-cyclohexylmethyl acrylate, 2-methyl-1-cyclohexylmethyl methacrylate, 2-methyl-1-cyclohexylmethyl ethacrylate, 3-methyl-1-cyclohexylmethyl acrylate, 3-methyl-1-cyclohexylmethyl methacrylate, 3-methyl-1-cyclohexylmethyl ethacrylate, 4-methyl-1-cyclohexylmethyl acrylate, 4-methyl-1-cyclohexylmethyl methacrylate, 4-methyl-1-cyclohexylmethyl ethacrylate, 2-cyclopentyl-1-propyl acrylate, 2-cyclopentyl-1-propyl methacrylate, 2-cyclopentyl-1-propyl ethacrylate, 2-cyclopentyl-2-propyl acrylate, 2-cyclopentyl-2-propyl methacrylate, 2-cyclopentyl-2-propyl ethacrylate, 3-cyclopentyl-1-propyl acrylate, 3-cyclopentyl-1-propyl methacrylate, 3-cyclopentyl-1-propyl ethacrylate, 1-propyl-1-cyclopentyl acrylate, 1-propyl-1-cyclopentyl methacrylate, 1-propyl-1-cyclopentyl ethacrylate, 2-propyl-1-cyclopentyl acrylate, 2-propyl-1-cyclopentyl methacrylate, 2-propyl-1-cyclopentyl ethacrylate, 3-propyl-1-cyclopentyl acrylate, 3-propyl-1-cyclopentyl methacrylate, 3-propyl-1-cyclopentyl ethacrylate, 4-propyl-1-cyclopentyl acrylate, 4-propyl-1-cyclopentyl methacrylate, 4-propyl-1-cyclopentyl ethacrylate, 2-methyl-1-cyclopentylethyl acrylate, 2-methyl-1-cyclopentylethyl methacrylate, 2-methyl-1-cyclopentylethyl ethacrylate, 3-methyl-1-cyclopentylethyl acrylate, 3-methyl-1-cyclopentylethyl methacrylate, 3-methyl-1-cyclopentylethyl ethacrylate, 4-methyl-1-cyclopentylethyl acrylate, 4-methyl-1-cyclopentylethyl methacrylate, 4-methyl-1-cyclopentylethyl ethacrylate, 2,2-dimethyl-1-cyclopentylmethyl acrylate, 2,2-dimethyl-1-cyclopentylmethyl methacrylate, 2,2-dimethyl-1-cyclopentylmethyl ethacrylate, 2,3-dimethyl-1-cyclopentylmethyl acrylate, 2,3-dimethyl-1-cyclopentylmethyl methacrylate, 2,3-dimethyl-1-cyclopentylmethyl ethacrylate, 2,4-dimethyl-1-cyclopentylmethyl acrylate, 2,4-dimethyl-1-cyclopentylmethyl methacrylate, 2,4-dimethyl-1-cyclopentylmethyl ethacrylate, 2,5-dimethyl-1-cyclopentylmethyl acrylate, 2,5-dimethyl-1-cyclopentylmethyl methacrylate, 2,5-dimethyl-1-cyclopentylmethyl ethacrylate, 2,6-dimethyl-1-cyclopentylmethyl acrylate, 2,6-dimethyl-1-cyclopentylmethyl methacrylate, 2,6-dimethyl-1-cyclopentylmethyl ethacrylate, 3,4-dimethyl-1-cyclopentylmethyl acrylate, 3,4-dimethyl-1-cyclopentylmethyl methacrylate, 3,4-dimethyl-1-cyclopentylmethyl ethacrylate, 3,5-dimethyl-1-cyclopentylmethyl acrylate, 3,5-dimethyl-1-cyclopentylmethyl methacrylate, 3,5-dimethyl-1-cyclopentylmethyl ethacrylate, 4,4-dimethyl-1-cyclopentylmethyl acrylate, 4,4-dimethyl-1-cyclopentylmethyl methacrylate, 4,4-dimethyl-1-cyclopentylmethyl ethacrylate, 2-ethyl-1-cyclopentylmethyl acrylate, 2-ethyl-1-cyclopentylmethyl methacrylate, 2-ethyl-1-cyclopentylmethyl ethacrylate, 3-ethyl-1-cyclopentylmethyl acrylate, 3-ethyl-1-cyclopentylmethyl methacrylate, 3-ethyl-1-cyclopentylmethyl ethacrylate, 4-ethyl-1-cyclopentylmethyl acrylate, 4-ethyl-1-cyclopentylmethyl methacrylate, 4-ethyl-1-cyclopentylmethyl ethacrylate, 2,2,3-trimethyl-1-cyclopentyl acrylate, 2,2,3-trimethyl-1-cyclopentyl methacrylate, 2,2,3-trimethyl-1-cyclopentyl ethacrylate, 2,2,4-trimethyl-1-cyclopentyl acrylate, 2,2,4-trimethyl-1-cyclopentyl methacrylate, 2,2,4-trimethyl-1-cyclopentyl ethacrylate, 2,2,5-trimethyl-1-cyclopentyl acrylate, 2,2,5-trimethyl-1-cyclopentyl methacrylate, 2,2,5-trimethyl-1-cyclopentyl ethacrylate, 2,2,6-trimethyl-1-cyclopentyl acrylate, 2,2,6-trimethyl-1-cyclopentyl methacrylate, 2,2,6-trimethyl-1-cyclopentyl ethacrylate, 2,3,3-trimethyl-1-cyclopentyl acrylate, 2,3,3-trimethyl-1-cyclopentyl methacrylate, 2,3,3-trimethyl-1-cyclopentyl ethacrylate, 2,3,4-trimethyl-1-cyclopentyl acrylate, 2,3,4-trimethyl-1-cyclopentyl methacrylate, 2,3,4-trimethyl-1-cyclopentyl ethacrylate, 2,3,5-trimethyl-1-cyclopentyl acrylate, 2,3,5-trimethyl-1-cyclopentyl methacrylate, 2,3,5-trimethyl-1-cyclopentyl ethacrylate, 2,3,6-trimethyl-1-cyclopentyl acrylate, 2,3,6-trimethyl-1-cyclopentyl methacrylate, 2,3,6-trimethyl-1-cyclopentyl ethacrylate, 2,4,4-trimethyl-1-cyclopentyl acrylate, 2,4,4-trimethyl-1-cyclopentyl methacrylate, 2,4,4-trimethyl-1-cyclopentyl ethacrylate, 2,4,5-trimethyl-1-cyclopentyl acrylate, 2,4,5-trimethyl-1-cyclopentyl methacrylate, 2,4,5-trimethyl-1-cyclopentyl ethacrylate, 2,4,6-trimethyl-1-cyclopentyl acrylate, 2,4,6-trimethyl-1-cyclopentyl methacrylate, 2,4,6-trimethyl-1-cyclopentyl ethacrylate, 3,3,4-trimethyl-1-cyclopentyl acrylate, 3,3,4-trimethyl-1-cyclopentyl methacrylate, 3,3,4-trimethyl-1-cyclopentyl ethacrylate, 3,3,5-trimethyl-1-cyclopentyl acrylate, 3,3,5-trimethyl-1-cyclopentyl methacrylate, 3,3,5-trimethyl-1-cyclopentyl ethacrylate, 3,4,4-trimethyl-1-cyclopentyl acrylate, 3,4,4-trimethyl-1-cyclopentyl methacrylate, 3,4,4-trimethyl-1-cyclopentyl ethacrylate, 3,4,5-trimethyl-1-cyclopentyl acrylate, 3,4,5-trimethyl-1-cyclopentyl methacrylate, 3,4,5-trimethyl-1-cyclopentyl ethacrylate, 2-methyl-2-ethyl-1-cyclopentyl acrylate, 2-methyl-2-ethyl-1-cyclopentyl methacrylate, 2-methyl-2-ethyl-1-cyclopentyl ethacrylate, 2-methyl-3-ethyl-1-cyclopentyl acrylate, 2-methyl-3-ethyl-1-cyclopentyl methacrylate, 2-methyl-3-ethyl-1-cyclopentyl ethacrylate, 2-methyl-4-ethyl-1-cyclopentyl acrylate, 2-methyl-4-ethyl-1-cyclopentyl methacrylate, 2-methyl-4-ethyl-1-cyclopentyl ethacrylate, 3-methyl-2-ethyl-1-cyclopentyl acrylate, 3-methyl-2-ethyl-1-cyclopentyl methacrylate, 3-methyl-2-ethyl-1-cyclopentyl ethacrylate, 3-methyl-3-ethyl-1-cyclopentyl acrylate, 3-methyl-3-ethyl-1-cyclopentyl methacrylate, 3-methyl-3-ethyl-1-cyclopentyl ethacrylate, 3-methyl-4-ethyl-1-cyclopentyl acrylate, 3-methyl-4-ethyl-1-cyclopentyl methacrylate, 3-methyl-4-ethyl-1-cyclopentyl ethacrylate, 4-methyl-2-ethyl-1-cyclopentyl acrylate, 4-methyl-2-ethyl-1-cyclopentyl methacrylate, 4-methyl-2-ethyl-1-cyclopentyl ethacrylate, 4-methyl-3-ethyl-1-cyclopentyl acrylate, 4-methyl-3-ethyl-1-cyclopentyl methacrylate, 4-methyl-3-ethyl-1-cyclopentyl ethacrylate, 2-methyl-1-heptyl acrylate, 2-methyl-1-heptyl methacrylate, 2-methyl-1-heptyl ethacrylate, 2-methyl-2-heptyl acrylate, 2-methyl-2-heptyl methacrylate, 2-methyl-2-heptyl ethacrylate, 2-methyl-3-heptyl acrylate, 2-methyl-3-heptyl methacrylate, 2-methyl-3-heptyl ethacrylate, 2-methyl-4-heptyl acrylate, 2-methyl-4-heptyl methacrylate, 2-methyl-4-heptyl ethacrylate, 3-methyl-1-heptyl acrylate, 3-methyl-1-heptyl methacrylate, 3-methyl-1-heptyl ethacrylate, 3-methyl-2-heptyl acrylate, 3-methyl-2-heptyl methacrylate, 3-methyl-2-heptyl ethacrylate, 3-methyl-3-heptyl acrylate, 3-methyl-3-heptyl methacrylate, 3-methyl-3-heptyl ethacrylate, 3-methyl-4-heptyl acrylate, 3-methyl-4-heptyl methacrylate, 3-methyl-4-heptyl ethacrylate, 4-methyl-1-heptyl acrylate, 4-methyl-1-heptyl methacrylate, 4-methyl-1-heptyl ethacrylate, 4-methyl-2-heptyl acrylate, 4-methyl-2-heptyl methacrylate, 4-methyl-2-heptyl ethacrylate, 4-methyl-3-heptyl acrylate, 4-methyl-3-heptyl methacrylate, 4-methyl-3-heptyl ethacrylate, 4-methyl-4-heptyl acrylate, 4-methyl-4-heptyl methacrylate, 4-methyl-4-heptyl ethacrylate, 5-methyl-1-heptyl acrylate, 5-methyl-1-heptyl methacrylate, 5-methyl-1-heptyl ethacrylate, 5-methyl-2-heptyl acrylate, 5-methyl-2-heptyl methacrylate, 5-methyl-2-heptyl ethacrylate, 5-methyl-3-heptyl acrylate, 5-methyl-3-heptyl methacrylate, 5-methyl-3-heptyl ethacrylate, 6-methyl-1-heptyl acrylate, 6-methyl-1-heptyl methacrylate, 6-methyl-1-heptyl ethacrylate, 6-methyl-2-heptyl acrylate, 6-methyl-2-heptyl methacrylate, 6-methyl-2-heptyl ethacrylate, 6-methyl-3-heptyl acrylate, 6-methyl-3-heptyl methacrylate, 6-methyl-3-heptyl ethacrylate, 2,2-dimethyl-1-hexyl acrylate, 2,2-dimethyl-1-hexyl methacrylate, 2,2-dimethyl-1-hexyl ethacrylate, 2,2-dimethyl-3-hexyl acrylate, 2,2-dimethyl-3-hexyl methacrylate, 2,2-dimethyl-3-hexyl ethacrylate, 2,3-dimethyl-1-hexyl acrylate, 2,3-dimethyl-1-hexyl methacrylate, 2,3-dimethyl-1-hexyl ethacrylate, 2,3-dimethyl-2-hexyl acrylate, 2,3-dimethyl-2-hexyl methacrylate, 2,3-dimethyl-2-hexyl ethacrylate, 2,3-dimethyl-3-hexyl acrylate, 2,3-dimethyl-3-hexyl methacrylate, 2,3-dimethyl-3-hexyl ethacrylate, 2,4-dimethyl-1-hexyl acrylate, 2,4-dimethyl-1-hexyl methacrylate, 2,4-dimethyl-1-hexyl ethacrylate, 2,4-dimethyl-2-hexyl acrylate, 2,4-dimethyl-2-hexyl methacrylate, 2,4-dimethyl-2-hexyl ethacrylate, 2,4-dimethyl-3-hexyl acrylate, 2,4-dimethyl-3-hexyl methacrylate, 2,4-dimethyl-3-hexyl ethacrylate, 2,5-dimethyl-1-hexyl acrylate, 2,5-dimethyl-1-hexyl methacrylate, 2,5-dimethyl-1-hexyl ethacrylate, 2,5-dimethyl-2-hexyl acrylate, 2,5-dimethyl-2-hexyl methacrylate, 2,5-dimethyl-2-hexyl ethacrylate, 2,5-dimethyl-3-hexyl acrylate, 2,5-dimethyl-3-hexyl methacrylate, 2,5-dimethyl-3-hexyl ethacrylate, 3,3-dimethyl-1-hexyl acrylate, 3,3-dimethyl-1-hexyl methacrylate, 3,3-dimethyl-1-hexyl ethacrylate, 3,3-dimethyl-2-hexyl acrylate, 2,3-dimethyl-2-hexyl methacrylate, 3,3-dimethyl-2-hexyl ethacrylate, 3,4-dimethyl-1-hexyl acrylate, 3,4-dimethyl-1-hexyl methacrylate, 3,4-dimethyl-1-hexyl ethacrylate, 3,4-dimethyl-2-hexyl acrylate, 3,4-dimethyl-2-hexyl methacrylate, 3,4-dimethyl-2-hexyl ethacrylate, 3,4-dimethyl-3-hexyl acrylate, 3,4-dimethyl-3-hexyl methacrylate, 3,4-dimethyl-3-hexyl ethacrylate, 3,5-dimethyl-1-hexyl acrylate, 3,5-dimethyl-1-hexyl methacrylate, 3,5-dimethyl-1-hexyl ethacrylate, 3,5-dimethyl-2-hexyl acrylate, 3,5-dimethyl-2-hexyl methacrylate, 3,5-dimethyl-2-hexyl ethacrylate, 3,5-dimethyl-2-hexyl acrylate, 3,5-dimethyl-2-hexyl methacrylate, 3,5-dimethyl-2-hexyl ethacrylate, 3,5-dimethyl-3-hexyl acrylate, 3,5-dimethyl-3-hexyl methacrylate, 3,5-dimethyl-3-hexyl ethacrylate, 2-ethyl-1-hexyl acrylate, 2-ethyl-1-hexyl methacrylate, 2-ethyl-1-hexyl ethacrylate, 2-ethyl-2-hexyl acrylate, 2-ethyl-2-hexyl methacrylate, 2-ethyl-2-hexyl ethacrylate, 2-ethyl-3-hexyl acrylate, 2-ethyl-3-hexyl methacrylate, 2-ethyl-3-hexyl ethacrylate, 3-ethyl-1-hexyl acrylate, 3-ethyl-1-hexyl methacrylate, 3-ethyl-1-hexyl ethacrylate, 3-ethyl-2-hexyl acrylate, 3-ethyl-2-hexyl methacrylate, 3-ethyl-2-hexyl ethacrylate, 3-ethyl-3-hexyl acrylate, 3-ethyl-3-hexyl methacrylate, 3-ethyl-3-hexyl ethacrylate, 2,2,3-trimethyl-1-pentyl acrylate, 2,2,3-trimethyl-1-pentyl methacrylate, 2,2,3-trimethyl-1-pentyl ethacrylate, 2,2,3-trimethyl-3-pentyl acrylate, 2,2,3-trimethyl-3-pentyl methacrylate, 2,2,3-trimethyl-3-pentyl ethacrylate, 2,3,3-trimethyl-1-pentyl acrylate, 2,3,3-trimethyl-1-pentyl methacrylate, 2,3,3-trimethyl-1-pentyl ethacrylate, 2,3,3-trimethyl-2-pentyl acrylate, 2,3,3-trimethyl-2-pentyl methacrylate, 2,3,3-trimethyl-2-pentyl ethacrylate, 2,3,4-trimethyl-1-pentyl acrylate, 2,3,4-trimethyl-1-pentyl methacrylate, 2,3,4-trimethyl-1-pentyl ethacrylate, 2,3,4-trimethyl-2-pentyl acrylate, 2,3,4-trimethyl-2-pentyl methacrylate, 2,3,4-trimethyl-2-pentyl ethacrylate, 2,3,4-trimethyl-3-pentyl acrylate, 2,3,4-trimethyl-3-pentyl methacrylate, 2,3,4-trimethyl-3-pentyl ethacrylate, 3,3,4-trimethyl-1-pentyl acrylate, 3,3,4-trimethyl-1-pentyl methacrylate, 3,3,4-trimethyl-1-pentyl ethacrylate, 3,3,4-trimethyl-2-pentyl acrylate, 3,3,4-trimethyl-2-pentyl methacrylate, 3,3,4-trimethyl-2-pentyl ethacrylate, 3,3,5-trimethyl-1-pentyl acrylate, 3,3,5-trimethyl-1-pentyl methacrylate, 3,3,5-trimethyl-1-pentyl ethacrylate, 3,3,5-trimethyl-2-pentyl acrylate, 3,3,5-trimethyl-2-pentyl methacrylate, 3,3,5-trimethyl-2-pentyl ethacrylate, 3,4,4-trimethyl-1-pentyl acrylate, 3,4,4-trimethyl-1-pentyl methacrylate, 3,4,4-trimethyl-1-pentyl ethacrylate, 3,4,4-trimethyl-2-pentyl acrylate, 3,4,4-trimethyl-2-pentyl methacrylate, 3,4,4-trimethyl-2-pentyl ethacrylate, 3,4,4-trimethyl-3-pentyl acrylate, 3,4,4-trimethyl-3-pentyl methacrylate, 3,4,4-trimethyl-3-pentyl ethacrylate, 3,4,5-trimethyl-1-pentyl acrylate, 3,4,5-trimethyl-1-pentyl methacrylate, 3,4,5-trimethyl-1-pentyl ethacrylate, 3,4,5-trimethyl-2-pentyl acrylate, 3,4,5-trimethyl-2-pentyl methacrylate, 3,4,5-trimethyl-2-pentyl ethacrylate, 3,4,5-trimethyl-3-pentyl acrylate, 3,4,5-trimethyl-3-pentyl methacrylate, 3,4,5-trimethyl-3-pentyl ethacrylate, 4,4,5-trimethyl-1-pentyl acrylate, 4,4,5-trimethyl-1-pentyl methacrylate, 4,4,5-trimethyl-1-pentyl ethacrylate, 4,4,5-trimethyl-2-pentyl acrylate, 4,4,5-trimethyl-2-pentyl methacrylate, 4,4,5-trimethyl-2-pentyl ethacrylate, 4,4,5-trimethyl-3-pentyl acrylate, 4,4,5-trimethyl-3-pentyl methacrylate, 4,4,5-trimethyl-3-pentyl ethacrylate, 4,5,5-trimethyl-1-pentyl acrylate, 4,5,5-trimethyl-1-pentyl methacrylate, 4,5,5-ethacrylate, 4,5,5-trimethyl-2-pentyl acrylate, 4,5,5-trimethyl-2-pentyl methacrylate, 4,5,5-trimethyl-2-pentyl ethacrylate, 4,5,5-trimethyl-3-pentyl acrylate, 4,5,5-trimethyl-3-pentyl methacrylate, 4,5,5-trimethyl-3-pentyl ethacrylate, 2-methyl-2-ethyl-1-pentyl acrylate, 2-methyl-2-ethyl-1-pentyl methacrylate, 2-methyl-2-ethyl-1-pentyl ethacrylate, 2-methyl-2-ethyl-3-pentyl acrylate, 2-methyl-2-ethyl-3-pentyl methacrylate, 2-methyl-2-ethyl-3-pentyl ethacrylate, 2-methyl-2-ethyl-4-pentyl acrylate, 2-methyl-2-ethyl-4-pentyl methacrylate, 2-methyl-2-ethyl-4-pentyl ethacrylate, 2-methyl-3-ethyl-1-pentyl acrylate, 2-methyl-3-ethyl-1-pentyl methacrylate, 2-methyl-3-ethyl-1-pentyl ethacrylate, 2-methyl-3-ethyl-2-pentyl acrylate, 2-methyl-3-ethyl-2-pentyl methacrylate, 2-methyl-3-ethyl-2-pentyl ethacrylate, 2-methyl-3-ethyl-3-pentyl acrylate, 2-methyl-3-ethyl-3-pentyl methacrylate, 2-methyl-3-ethyl-3-pentyl ethacrylate, 2-methyl-3-ethyl-4-pentyl acrylate, 2-methyl-3-ethyl-4-pentyl methacrylate, 2-methyl-3-ethyl-4-pentyl ethacrylate, 2-methyl-4-ethyl-1-pentyl acrylate, 2-methyl-4-ethyl-1-pentyl methacrylate, 2-methyl-4-ethyl-1-pentyl ethacrylate, 2-methyl-4-ethyl-2-pentyl acrylate, 2-methyl-4-ethyl-2-pentyl methacrylate, 2-methyl-4-ethyl-2-pentyl ethacrylate, 2-methyl-4-ethyl-3-pentyl acrylate, 2-methyl-4-ethyl-3-pentyl methacrylate, 2-methyl-4-ethyl-3-pentyl ethacrylate, 3-methyl-2-ethyl-1-pentyl acrylate, 3-methyl-2-ethyl-1-pentyl methacrylate, 3-methyl-2-ethyl-1-pentyl ethacrylate, 3-methyl-2-ethyl-2-pentyl acrylate, 3-methyl-2-ethyl-2-pentyl methacrylate, 3-methyl-2-ethyl-2-pentyl ethacrylate, 3-methyl-2-ethyl-3-pentyl acrylate, 3-methyl-2-ethyl-3-pentyl methacrylate, 3-methyl-2-ethyl-3-pentyl ethacrylate, 3-methyl-2-ethyl-4-pentyl acrylate, 3-methyl-2-ethyl-4-pentyl methacrylate, 3-methyl-2-ethyl-4-pentyl ethacrylate, 3-methyl-3-ethyl-1-pentyl acrylate, 3-methyl-3-ethyl-1-pentyl methacrylate, 3-methyl-3-ethyl-1-pentyl ethacrylate, 3-methyl-3-ethyl-2-pentyl acrylate, 3-methyl-3-ethyl-2-pentyl methacrylate, 3-methyl-3-ethyl-2-pentyl ethacrylate, 3-methyl-4-ethyl-1-pentyl acrylate, 3-methyl-4-ethyl-1-pentyl methacrylate, 3-methyl-4-ethyl-1-pentyl ethacrylate, 3-methyl-4-ethyl-2-pentyl acrylate, 3-methyl-4-ethyl-2-pentyl methacrylate, 3-methyl-4-ethyl-2-pentyl ethacrylate, 4-methyl-2-ethyl-1-pentyl acrylate, 4-methyl-2-ethyl-1-pentyl methacrylate, 4-methyl-2-ethyl-1-pentyl ethacrylate, 4-methyl-2-ethyl-2-pentyl acrylate, 4-methyl-2-ethyl-2-pentyl methacrylate, 4-methyl-2-ethyl-2-pentyl ethacrylate, 4-methyl-2-ethyl-1-pentyl acrylate, 4-methyl-3-ethyl-1-pentyl methacrylate, 4-methyl-2-ethyl-1-pentyl ethacrylate, 2-propyl-1-pentyl acrylate, 2-propyl-1-pentyl methacrylate, 2-propyl-1-pentyl ethacrylate, 2-propyl-2-pentyl acrylate, 2-propyl-2-pentyl methacrylate, 2-propyl-2-pentyl ethacrylate, 2-propyl-3-pentyl acrylate, 2-propyl-3-pentyl methacrylate, 2-propyl-3-pentyl ethacrylate, 3-propyl-1-pentyl acrylate, 3-propyl-1-pentyl methacrylate, 3-propyl-1-pentyl ethacrylate, 3-propyl-2-pentyl acrylate, 3-propyl-2-pentyl methacrylate, 3-propyl-2-pentyl ethacrylate, 3-propyl-3-pentyl acrylate, 3-propyl-3-pentyl methacrylate, 3-propyl-3-pentyl ethacrylate, or a combination or polymerization/oligomerization reaction product thereof. In particular, the $C_3$-$C_8$ alkyl (alk)acrylate ester monomer, (b), can comprise, consist essentially of, or be a butyl acrylate or a butyl methacrylate.

Regarding the amount of (b) the $C_3$-$C_{10}$/$C_3$-$C_8$ alkyl (alk)acrylate ester monomer used to make the comb copolymer viscosity modifier, repeat units based on the $C_3$-$C_{10}$/$C_3$-$C_8$ alkyl (alk)acrylate ester monomer may comprise from 30 wt % to 71 wt %, e.g., from 30 wt % to 68 wt %, from 30 wt % to 66 wt %, from 30 wt % to 64 wt %, from 30 wt % to 62 wt %, from 30 wt % to 60 wt %, from 30 wt % to 58 wt %, from 30 wt % to 56 wt %, from 30 wt % to 54 wt %, from 30 wt % to 52 wt from 30 wt % to 50 wt %, from 30 wt % to 48 wt %, from 33 wt % to 71 wt %, from 33 wt % to 68 wt %, from 33 wt % to 66 wt %, from 33 wt % to 64 wt %, from 33 wt % to 62 wt %, from 33 wt % to 60 wt %, from 33 wt % to 58 wt %, from 33 wt % to 56 wt %, from 33 wt % to 54 wt %, from 33 wt % to 52 wt %, from 33 wt % to 50 wt %, from 33 wt % to 48 wt %, from 35 wt % to 71 wt %, from 35 wt % to 68 wt %, from 35 wt % to 66 wt %, from 35 wt % to 64 wt %, from 35 wt % to 62 wt %, from 35 wt % to 60 wt %, from 35 wt % to 58 wt %, from 35 wt % to 56 wt %, from 35 wt % to 54 wt %, from 35 wt % to 52 wt %, from 35 wt % to 50 wt %, from 35 wt % to 48 wt %, from 38 wt % to 71 wt %, from 38 wt % to 68 wt %, from 38 wt % to 66 wt %, from 38 wt % to 64 wt %, from 38 wt % to 62 wt %, from 38 wt % to 60 wt %, from 38 wt % to 58 wt %, from 38 wt % to 56 wt %, from 38 wt % to 54 wt %, from 38 wt % to 52 wt %, from 38 wt % to 50 wt %, from 38 wt % to 48 wt %, from 40 wt % to 71 wt %, from 40 wt % to 68 wt %, from 40 wt % to 66 wt %, from 40 wt % to 64 wt %, from 40 wt % to 62 wt %, from 40 wt % to 60 wt %, from 40 wt % to 58 wt %, from 40 wt % to 56 wt %, from 40 wt % to 54 wt %, from 40 wt % to 52 wt %, from 40 wt % to 50 wt %, from 40 wt % to 48 wt %, from 45 wt % to 71 wt %, from 45 wt % to 68 wt %, from 45 wt % to 66 wt %, from 45 wt % to 64 wt %, from 45 wt % to 62 wt %, from 45 wt % to 60 wt %, from 45 wt % to 58 wt %, from 45 wt % to 56 wt %, from 45 wt % to 54 wt %, from 45 wt % to 52 wt %, from 45 wt % to 50 wt %, from 45 wt % to 48 wt %, from 50 wt % to 71 wt %, from 50 wt % to 68 wt %, from 50 wt % to 66 wt %, from 50 wt % to 64 wt %, from 50 wt % to 62 wt %, from 50 wt % to 60 wt %, from 50 wt % to 58 wt %, from 50 wt % to 56 wt %, from 50 wt % to 54 wt %, or from 50 wt % to 52 wt %, of the repeat units of the comb copolymer viscosity modifier. In particular, repeat units based on the $C_3$-$C_{10}$/$C_3$-$C_8$ alkyl (alk)acrylate ester monomer may comprise from 33 wt % to 64 wt %, from 35 wt % to 60 wt %, or from 38 wt % to 58 wt %, of the repeat units of the comb copolymer viscosity modifier.

Regarding (c) the $C_{10}$-$C_{30}$/$C_{12}$-$C_{24}$ alkyl (alk)acrylate ester monomer, and referring back to the general formula (I) above for acrylate monomers, the optional "alk" can advantageously represent an R of hydrogen (no "alk") or $C_1$-$C_2$ alkyl (in particular, hydrogen or methyl). Thus, given the particular $C_{12}$-$C_{24}$ alkyl range for the acrylate ester moiety of $R^1$, this monomer can comprise or be a linear, cyclic, or branched $C_{12}$ acrylate, a linear, cyclic, or branched $C_{12}$ methacrylate, a linear, cyclic, or branched $C_{14}$ acrylate, a linear, cyclic, or branched $C_{14}$ methacrylate, a linear, cyclic, or branched $C_{16}$ acrylate, a linear, cyclic, or branched $C_{16}$ methacrylate, a linear, cyclic, or branched $C_{17}$ acrylate, a linear, cyclic, or branched $C_{17}$ methacrylate, a linear, cyclic, or branched $C_{17}$ acrylate, a linear, cyclic, or branched $C_{18}$ methacrylate, or a combination or polymerization/oligomerization reaction product thereof. In particular, the $C_{12}$-$C_{24}$ alkyl (alk)acrylate ester monomer can comprise, consist essentially of, or be a lauryl acrylate, a lauryl methacrylate, a myristyl acrylate, a myristyl methacrylate, a palmityl acrylate, a palmityl methacrylate, a heptadecanoyl acrylate, a heptadecanoyl methacrylate, or a combination or polymerization/oligomerization reaction product thereof.

Regarding the amount of (c) the $C_{10}$-$C_{30}$/$C_{12}$-$C_{24}$ alkyl (alk)acrylate ester monomer used to make the comb copolymer viscosity modifier, repeat units based on the $C_{10}$-$C_{30}$/$C_{12}$-$C_{24}$ alkyl (alk)acrylate ester monomer can comprise at least 5.0 wt % (e.g., at least 10.0 wt %, at least 15.0 wt %, at least 20.0 wt %, at least 21.0 wt %, at least 21.5 wt %, at least 22.0 wt %, at least 22.5 wt %, at least 23.0 wt %, at least 23.5 wt %, at least 24.0 wt %, at least 24.5 wt %, or at least 25.0 wt %) and optionally but preferably also up to 35.0 wt % (e.g., up to 34.0 wt %, up to 33.0 wt %, up to 32.0 wt %, up to 31.0 wt %, up to 30.0 wt %, up to 29.0 wt %, up to 28.0 wt %, or up to 27.0 wt %) of repeat units of the comb copolymer viscosity modifier. In particular, repeat units based on the $C_{10}$-$C_{30}$/$C_{12}$-$C_{24}$ alkyl (alk)acrylate ester monomer may comprise at least 5.0 wt %, at least 10.0 wt %, at least 21.0 wt %, from 5.0 wt % to 35.0 wt %, from 21.0 wt % to 35.0 wt %, or from 23.0 wt % to 30.0 wt %, of the repeat units of the comb copolymer viscosity modifier.

Regarding (d) the $C_6$-$C_{20}$ aryl, aralkyl, or alkaryl (alk)acrylate ester monomer, and referring back to the general formula (I) above for acrylate monomers, the optional "alk" can advantageously represent an $R^2$ of hydrogen (no "alk") or $C_1$-$C_2$ alkyl (in particular, hydrogen or methyl). Thus, given the $C_6$-$C_{20}$ range for the acrylate ester moiety of $R^1$, this monomer can comprise or be a $C_6$ aryl, aralkyl, or alkaryl acrylate, a $C_6$ aryl, aralkyl, or alkaryl methacrylate, a $C_7$ aryl, aralkyl, or alkaryl acrylate, a $C_7$ aryl, aralkyl, or alkaryl methacrylate, a $C_8$ aryl, aralkyl, or alkaryl acrylate, a $C_8$ aryl, aralkyl, or alkaryl methacrylate, a $C_9$ aryl, aralkyl, or alkaryl acrylate, a $C_9$ aryl, aralkyl, or alkaryl methacrylate, a $C_{10}$ aryl, aralkyl, or alkaryl acrylate, a $C_{10}$ aryl, aralkyl, or alkaryl methacrylate, a $C_{11}$ aryl, aralkyl, or alkaryl acrylate, a $C_{11}$ aryl, aralkyl, or alkaryl methacrylate, a $C_{12}$ aryl, aralkyl, or alkaryl acrylate, a $C_{12}$ aryl, aralkyl, or alkaryl methacrylate, a $C_{13}$ aryl, aralkyl, or alkaryl acrylate, a $C_{13}$ aryl, aralkyl, or alkaryl methacrylate, a $C_{14}$ aryl, aralkyl, or alkaryl acrylate, a $C_{14}$ aryl, aralkyl, or alkaryl methacrylate, a $C_{15}$ aryl, aralkyl, or alkaryl acrylate, a $C_{15}$ aryl, aralkyl, or alkaryl methacrylate, a $C_{16}$ aryl, aralkyl, or alkaryl acrylate, a $C_{16}$ aryl, aralkyl, or alkaryl methacrylate, a $C_{17}$ aryl, aralkyl, or alkaryl acrylate, a $C_{17}$ aryl, aralkyl, or alkaryl methacrylate, a $C_{18}$ aryl, aralkyl, or alkaryl acrylate, a $C_{18}$ aryl, aralkyl, or alkaryl methacrylate, a $C_{19}$ aryl, aralkyl, or alkaryl acrylate, a $C_{19}$ aryl, aralkyl, or alkaryl methacrylate, a $C_{20}$ aryl, aralkyl, or alkaryl acrylate, a $C_{20}$ aryl, aralkyl, or alkaryl methacrylate, or a combination or polymerization/oligomerization reaction product thereof. In particular, the $C_6$-$C_{20}$ aryl, aralkyl, or alkaryl (alk)acrylate ester monomer can comprise, consist essentially of, or be a benzyl acrylate, a benzyl methacrylate, a naphthyl acrylate, a naphthyl methacrylate, a phenyl acrylate, a phenyl methacrylate, a toluyl acrylate, a toluyl methacrylate, a phenylethyl acrylate, a phenylethyl methacrylate, a nonylnaphthyl acrylate, a nonylnaphthyl methacrylate, an anthracenyl acrylate, an anthracenyl methacrylate, a phenanthrenyl acrylate, a phenanthrenyl methacrylate, a fluorenyl acrylate, a fluorenyl methacrylate, an ethylfluorenyl acrylate, an ethylfluorenyl methacrylate, or a combination or polymerization/oligomerization reaction product thereof.

Regarding the amount of (d) the $C_6$-$C_{20}$ aryl, aralkyl, or alkaryl (alk)acrylate ester monomer used to make the comb copolymer viscosity modifier, repeat units based on the $C_6$-$C_{20}$ aryl, aralkyl, or alkaryl (alk)acrylate ester monomer can comprise up to 28 wt % (e.g., up to 27 wt %, up to 26 wt %, up to 25 wt %, up to 24 wt %, up to 23 wt %, up to 22 wt %, up to 21 wt %, up to 20 wt %, up to 19 wt %, up to 18 wt %, up to 17 wt % or up to 16 wt %) and optionally but preferably also at least 3.0 wt % (e.g., at least 4.0 wt %, at least 5.0 wt %, at least 6.0 wt %, at least 7.0 wt %, at least 8.0 wt %, at least 9.0 wt %, at least 10.0 wt %, at least 11.0 wt %, or at least 12.0 wt %) of repeat units of the comb copolymer viscosity modifier. In particular, repeat units based on the $C_6$-$C_{20}$ aryl, aralkyl, or alkaryl (alk)acrylate ester monomer may comprise up to 28 wt %, up to 24 wt %, at least 11.0 wt %, from 3.0 wt % to 27 wt %, from 4.0 wt % to 25 wt %, or from 7.0 wt % to 24 wt %, of the repeat units of the comb copolymer viscosity modifier.

Regarding the combined amount of (c) the $C_{10}$-$C_{30}$/$C_{12}$-$C_{24}$ alkyl (alk)acrylate ester monomer and (d) the $C_6$-$C_{20}$ aryl, aralkyl, or alkaryl (alk)acrylate ester monomer used to make the comb copolymer viscosity modifier, repeat units based on a sum of the $C_{10}$-$C_{30}$/$C_{12}$-$C_{24}$ alkyl (alk)acrylate ester monomer repeat units plus the $C_6$-$C_{20}$ aryl, aralkyl, or alkaryl (alk)acrylate ester monomer repeat units may collectively comprise at least 21.0 wt % (e.g., at least 21.5 wt %, at least 22.0 wt %, at least 22.5 wt %, at least 23.0 wt %, at least 23.5 wt %, at least 24.0 wt %, at least 24.5 wt %, or at least 25.0 wt %) and optionally but preferably also up to 50.0 wt % (e.g., up to 34.0 wt %, up to 33.0 wt %, up to 32.0 wt %, up to 31.0 wt %, up to 30.0 wt %, up to 29.0 wt %, up to 28.0 wt %, or up to 27.0 wt %) of repeat units of the comb copolymer viscosity modifier. In particular, repeat units based on the sum of the $C_{10}$-$C_{30}$/$C_{12}$-$C_{24}$ alkyl (alk)acrylate ester monomer repeat units plus the $C_6$-$C_{20}$ aryl, aralkyl, or alkaryl (alk)acrylate ester monomer repeat units may collectively comprise at least 21.0 wt %, at least 23.0 wt %, from 21.0 wt % to 35.0 wt %, or from 23.0 wt % to 30.0 wt %, of the repeat units of the comb copolymer viscosity modifier. In alternative embodiments, the amount of (c) the $C_{12}$-$C_{24}$ alkyl (alk)acrylate ester monomer, alone, may comprise at least 21.0 wt % (e.g., at least 21.5 wt %, at least 22.0 wt %, at least 22.5 wt %, at least 23.0 wt %, at least 23.5 wt %, at least 24.0 wt %, at least 24.5 wt %, or at least 25.0 wt %) and optionally but preferably also up to 35.0 wt % (e.g., up to 34.0 wt %, up to 33.0 wt %, up to 32.0 wt %, up to 31.0 wt %, up to 30.0 wt %, up to 29.0 wt %, up to 28.0 wt %, or up to 27.0 wt %) of repeat units of the comb copolymer viscosity modifier (in particular, at least 21.0 wt %, at least 23.0 wt %, from 21.0 wt % to 35.0 wt %, or from 23.0 wt % to 30.0 wt %.

When one or more other olefinic comonomers (e) is present, such monomer(s) (e) may include or be, for instance, methyl acrylate, methyl methacrylate, ethyl acrylate, ethyl methacrylate, or a combination thereof. Although there is no specific limit on optional olefinic comonomer(s) (e), repeat units based on these olefins, when present, may comprise up to 7.0 wt % (e.g., up to 6.5 wt %; up to 6.0 wt % up to 5.5 wt %, up to 5.0 wt %, up to 4.5 wt % up to 4.0 wt %, up to 3.5 wt %, or up to 3.0 wt %) and further optionally at least 0.1 wt % (e.g., at least 0.2 wt %, at least 0.3 wt %, at least 0.5 wt %, at least 0.7 wt %, at least 0.9 wt %, at least 1.2 wt %, at least 1.5 wt %, or at least 1.8 wt %) of repeat units of the comb copolymer viscosity modifier. In particular, when present, other olefinic repeat units may comprise up to 7.0 wt %, up to 5.0 wt %, from 0.5 wt % to 7.0 wt %, or from 1.0 wt % to 5.0 wt %, of the repeat units of the comb copolymer viscosity modifier.

Because of the relatively large proportion of the combination of $C_{12}$-$C_{24}$ alkyl (alk)acrylate ester monomers and $C_6$-$C_{20}$ aryl, aralkyl, or alkaryl (alk)acrylate ester monomers, the comb copolymer viscosity modifiers according to the present disclosure may, in some embodiments, advantageously comprise less than 80 wt % of repeat units derived from monomers selected from the group consisting of: styrene/styrenic monomers having from 8 to 17 carbon atoms; alkyl (meth)acrylates having from 1 to 10 carbon atoms in the alcohol group; vinyl esters having from 1 to 11 carbon atoms in the acyl group; vinyl ethers having from 1 to 10 carbon atoms connected to the vinyl ether; (di)alkyl fumarates having from 1 to 10 carbon atoms in the ether group, (di)alkyl maleates having from 1 to 10 carbon atoms in the ester group, and mixtures thereof (cf. U.S. Pat. No. 8,067,349).

Comb copolymer viscosity modifiers according to the present disclosure may advantageously exhibit an intermediate weight average molecular weight by gel permeation chromatography (GPC; a.k.a. size exclusion chromatography or SEC). GPC specification and analysis conditions for determining molecular weight distributions are as follows: Waters Acquity APC with Waters RID and UV215 nm; software: Empower 3; columns (in series 3×4.6×150 mm): APC-XT 450 (~2.5µ), APC-XT200 (~2.5µ), and APC-XT45 (~1.7 µm); mobile phase and flow: >99.9% Fisher optima gold label HPLC grade uninhibited THF; flow rate: ~0.25 mL/min with ~35 min retention time; oven temperature: ~35° C.; sample concentration: ~1 mg (solid polymer)/mL; sample preparation: substantially complete dissolution overnight (~8-20 hours), followed by filtration through ~0.45 min PTFE filter; injection volume: ~10 µL; polystyrene calibration curve. As such, the weight average molecular weight by GPC of the comb copolymer viscosity modifiers according to the present disclosure may be less than or equal to 625,000 g/mol (e.g., less than or equal to 610,000 g/mol, less than or equal to 600,000 g/mol, less than or equal to 590,000 g/mol, less than or equal to 580,000 g/mol, from 100,000 g/mol to 625,000 g/mol, from 100,000 g/mol to 610,000 g/mol, from 100,000 g/mol to 600,000 g/mol, from 100,000 g/mol to 590,000 g/mol, from 100,000 g/mol to 580,000 g/mol, from 150,000 g/mol to 625,000 g/mol, from 150,000 g/mol to 610,000 g/mol, from 150,000 g/mol to 600,000 g/mol, from 150,000 g/mol to 590,000 g/mol, from 150,000 g/mol to 580,000 g/mol, from 200,000 g/mol to 625,000 g/mol, from 200,000 g/mol to 610,000 g/mol, from 200,000 g/mol to 600,000 g/mol, from 200,000 g/mol to 590,000 g/mol, from 200,000 g/mol to 580,000 g/mol, from 225,000 g/mol to 625,000 g/mol, from 225,000 g/mol to 610,000 g/mol, from 225,000 g/mol to 600,000 g/mol, from 225,000 g/mol to 590,000 g/mol, from 225,000 g/mol to 580,000 g/mol, from 250,000 g/mol to 625,000 g/mol, from 250,000 g/mol to 610,000 g/mol, from 250,000 g/mol to 600,000 g/mol, from 250,000 g/mol to 590,000 g/mol, from 250,000 g/mol to 580,000 g/mol, from 275,000 g/mol to 625,000 g/mol, from 275,000 g/mol to 610,000 g/mol, from 275,000 g/mol to 600,000 g/mol, from 275,000 g/mol to 590,000 g/mol, from 275,000 g/mol to 580,000 g/mol, from 300,000 g/mol to 625,000 g/mol, from 300,000 g/mol to 610,000 g/mol, from 300,000 g/mol to 600,000 g/mol, from 300,000 g/mol to 590,000 g/mol, or from 300,000 g/mol to 580,000 g/mol; in particular, less than or equal to 625,000 g/mol, less than or equal to 600,000 g/mol, from 100,000 g/mol to 610,000 g/mol, or from 200,000 g/mol to 600,000 g/mol), based on polystyrene standards.

Comb copolymer viscosity modifiers according to the present disclosure may advantageously exhibit a relatively high oil solubility or dispersibility. As used herein, the term "oil-soluble" means that a composition comprising at least 0.1 wt %, preferably at least 0.5 wt %, of a comb copolymer viscosity modifier and at least 85 wt % (preferably the remainder) of a lubricating oil basestock may be combined relatively simply without stable macroscopic phase formation. Oil solubility and/or dispersibility may depend on the nature of the basestock, as well as the polymer chemistry (e.g., proportion of lipophilic side chains), inter alia.

For instance, these comb copolymers can be synthesized using free-radical polymerization techniques, and also using related processes for controlled free-radical polymerization, such as ATRP (Atom Transfer Radical Polymerization) and/or RAFT (Reversible Addition Fragmentation Chain Transfer). Customary free-radical polymerization is explained, inter alia, in Ullmanns's Encyclopedia of Industrial Chemistry, Sixth Edition. In general, a polymerization initiator and a chain transfer agent may be used for this purpose.

Examples of useful free-radical polymerization initiators may include, but are not necessarily limited to, one or more of azo initiators (such as AIBN and 1,1-azo-biscyclohexanecarbonitrile, which are well known), peroxy compounds such as methyl ethyl ketone peroxide, acetylacetone peroxide, dilauryl peroxide, tert-butyl per-2-ethyl-hexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis-(tert-butylperoxy)cyclohexane, 1,1-bis(tert-butyl-peroxy)-3,3,5-trimethylcyclohexane, cumyl hydro-peroxide, tert-butyl hydroperoxide, bis(4-tert-butyl-cyclohexyl)peroxydicarbonate, and mixtures thereof, as well as mixtures of the aforementioned compounds with other compounds that can, individually or collectively, likewise form free radicals effective in initiation. Suitable chain transfer agents may include oil-soluble/oil-dispersible mercaptans (e.g., n-dodecyl mercaptan or 2-mercaptoethanol) and/or terpenes (e.g., terpinolene).

ATRP processes are known in the art. It is assumed that ATRP processes involve a "living" free-radical polymerization, without any intention of restricting the description of the polymerization mechanism. In such processes, a transition metal compound may be reacted with a compound which has a transferable atom group. This may enable transfer of the transferable atom group to the transition metal compound, which can oxidize the metal. This reaction may form a radical that can be used to initiate the ethylenic groups (olefins), However, the transfer of the atom group to the transition metal compound can be reversible, so that the atom group may be transferred back to the growing polymer chain, which enables formation of a controlled polymerization system. The structure of the polymer, the molecular weight, and the molecular weight distribution can be controlled correspondingly.

ATRP reactions are described, for example, by J-S. Wang, et al., J. Am. Chem. Soc., vol. 117, p. 5614-5615 (1995), by Matyjaszewski, Macromolecules, vol. 28, p. 7901-7910 (1995). In addition, PCT Publication Nos. WO 96/30421, WO 97/47661, WO 97/18247, WO 98/40415, and WO 99/10387 disclose ATRP variants.

RAFT processes are described in detail, e.g., in PCT Publication Nos. WO 98/01478 and WO 2004/083169.

Such polymerizations may be carried out at standard pressures, reduced pressures, or elevated pressures. The polymerization temperature may also vary over a wide range. However, the polymerization may typically be conducted at temperatures from about −20° C. to about 200° C., e.g., from about 50° C. to about 150° C. or from about 80° C. to about 130° C.

Such polymerizations may be carried out with or without solvent. The term "solvent" is to be understood here in a broad sense. The solvent, when present, may be selected according to the polarity of the monomers used (e.g., SN100 oil, SN150 oil, relatively light gas oils, and/or aromatic hydrocarbons such as toluene and/or xylene).

In order to be effective at modifying viscosity, the comb copolymer viscosity modifier can be combined with a composition (or one or more components thereof) in a viscosity modifying amount, e.g., to form a viscosity modified mixture. In particular, the comb copolymer viscosity modifier may be combined with a lubricating oil basestock (e.g., comprising a Group I, Group II, and/or Group III basestock) and/or a lubricant additive (e.g., such as via a concentrated lubricant additive package comprising a minor amount of a lubricating oil basestock and one or more of an antioxidant, a corrosion inhibitor, an anti-wear additive, a friction modifier, a dispersant, a detergent, a defoaming agent, an extreme pressure additive, a pour point depressant, and a seal-swelling control agent; or merely an admixture or combination of one or more of the enumerated additives).

For example, the viscosity modifying amount of the comb copolymer viscosity modifier (as distinct from any viscosity modifier concentrate, which may contain additional diluent but no additional active ingredient) may be from 0.2 mass % to 8.0 mass %, e.g., from 0.2 mass % to 7.0 mass %, from 0.2 mass % to 6.0 mass %, from 0.2 mass % to 5.0 mass %, from 0.2 mass % to 4.0 mass %, from 0.2 mass % to 3.5 mass %, from 0.2 mass % to 3.0 mass %, from 0.2 mass % to 2.5 mass %, from 0.2 mass % to 2.0 mass %, from 0.4 mass % to 8.0 mass %, from 0.4 mass % to 7.0 mass %, from 0.4 mass % to 6.0 mass %, from 0.4 mass % to 5.0 mass %, from 0.4 mass % to 4.0 mass %, from 0.4 mass % to 3.5 mass %, from 0.4 mass % to 3.0 mass %, from 0.4 mass % to 2.5 mass %, from 0.4 mass % to 2.0 mass %, from 0.5 mass % to 8.0 mass %, from 0.5 mass % to 7.0 mass %, from 0.5 mass % to 6.0 mass %, from 0.5 mass % to 5.0 mass %, from 0.5 mass % to 4.0 mass %, from 0.5 mass % to 3.5 mass %, from 0.5 mass % to 3.0 mass %, from 0.5 mass % to 2.5 mass %, from 0.5 mass % to 2.0 mass %, from 0.6 mass % to 8.0 mass %, from 0.6 mass % to 7.0 mass %, from 0.6 mass % to 6.0 mass %, from 0.6 mass % to 5.0 mass %, from 0.6 mass % to 4.0 mass %, from 0.6 mass % to 3.5 mass %, from 0.6 mass % to 3.0 mass %, from 0.6 mass % to 2.5 mass %, from 0.6 mass % to 20 mass %, from 0.8 mass % to 8.0 mass %, from 0.8 mass % to 7.0 mass %, from 0.8 mass % to 6.0 mass %, from 0.8 mass % to 5.0 mass %, from 0.8 mass % to 4.0 mass %, from 0.8 mass % to 3.5 mass %, from 0.8 mass % to 3.0 mass %, from 0.8 mass % to 2.5 mass %, from 0.8 mass % to 2.0 mass %, from 1.0 mass % to 8.0 mass %, from 1.0 mass % to 7.0 mass %, from 1.0 mass % to 6.0 mass %, from 1.0 mass % to 5.0 mass %, from 1.0 mass % to 4.0 mass %, from 1.0 mass % to 3.5 mass %, from 1.0 mass % to 3.0 mass %, from 1.0 mass % to 2.5 mass %, from 1.0 mass % to 2.0 mass %, from 1.2 mass % to 8.0 mass %, from 1.2 mass % to 7.0 mass %, from 1.2 mass % to 6.0 mass %, from 1.2 mass % to 5.0 mass %, from 1.2 mass % to 4.0 mass %, from 1.2 mass % to 3.5 mass %, from 1.2 mass % to 3.0 mass %, from 1.2 mass % to 2.5 mass %, from 1.2 mass % to 2.0 mass %, from 1.4 mass % to 8.0 mass %, from 1.4 mass % to 7.0 mass %, from 1.4 mass % to 6.0 mass %, from 1.4 mass % to 5.0 mass %, from 1.4 mass % to 4.0 mass %, from 1.4 mass % to 3.5 mass %, from 1.4 mass % to 3.0 mass %, from 1.4 mass % to 2.5 mass %, from 1.4 mass % to 2.0 mass %, from 1.5 mass % to 8.0 mass %, from 1.5 mass % to 7.0 mass %, from 1.5 mass % to 6.0 mass %, from 1.5 mass % to 5.0 mass %, from 1.5 mass % to 4.0 mass %, from 1.5 mass % to 3.5 mass %, from 1.5 mass % to 3.0 mass %, from 1.5 mass % to 2.5 mass %, or from 1.5 mass % to 2.0 mass %, based on the total mass of the lubricant composition (or components) thereof). In particular, the viscosity modifying amount of the comb copolymer viscosity modifier may be from 0.5 mass % to 8.0 mass % or from 1.0 mass % to 7.0 mass %.

The lubricating oil basestock may be any suitable lubricating oil basestock known in the art. Both natural and synthetic lubricating oil basestocks may be suitable. Natural lubricating oils may include animal oils, vegetable oils (e.g., castor oil and lard oil), petroleum oils, mineral oils, oils derived from coal or shale, and combinations thereof. One particular natural lubricating oil includes or is mineral oil.

Suitable mineral oils may include all common mineral oil basestocks, including oils that are naphthenic or paraffinic in chemical structure. Suitable oils may be refined by conventional methodology using acid, alkali, and clay, or other agents such as aluminum chloride, or they may be extracted oils produced, for example, by solvent extraction with solvents such as phenol, sulfur dioxide, furfural, dichloro-diethyl ether, etc., or combinations thereof. They may be hydrotreated or hydrofined, dewaxed by chilling or catalytic dewaxing processes, hydrocracked, or some combination thereof. Suitable mineral oils may be produced from natural crude sources or may be composed of isomerized wax materials, or residues of other refining processes.

Synthetic lubricating oils may include hydrocarbon oils and halo-substituted hydrocarbon oils such as oligomerized, polymerized, and copolymerized olefins (e.g., polybutylenes, polypropylenes, propylene, isobutylene copolymers, chlorinated polylactenes, poly(1-hexenes), poly(1-octenes), poly-(1-decenes), etc., and mixtures thereof); alkylbenzenes (e.g., dodecyl-benzenes, tetradecylbenzenes, dinonyl-benzenes, di(2-ethylhexyl)benzene, etc.); polyphenyls (e.g., biphenyls, terphenyls, alkylated polyphenyls, etc.); alkylated diphenyl ethers, alkylated diphenyl sulfides, as well as their derivatives, analogs, and homologs thereof, and the like; and combinations and/or reaction products thereof.

In some embodiments, oils from this class of synthetic oils may comprise or be polyalphaolefins (PAO), including hydrogenated oligomers of an alpha-olefin, particularly oligomers of 1-decene, such as those produced by free radical processes, Ziegler catalysis, or cationic processes. They may, for example, be oligomers of branched or straight chain alpha-olefins having from 2 to 16 carbon atoms, specific non-limiting examples including polypropenes, polyisobutenes, poly-1-butenes, poly-1-hexenes, poly-1-octenes, poly-1-decene, poly-1-dodecene, and mixtures and/or copolymers thereof.

Synthetic lubricating oils may additionally or alternatively include alkylene oxide polymers, interpolymers, copolymers, and derivatives thereof, in which any (most) terminal hydroxyl groups have been modified by esterification, etherification, etc. This class of synthetic oils may be exemplified by: polyoxyalkylene polymers prepared by polymerization of ethylene oxide or propylene oxide; the alkyl and aryl ethers of these polyoxyalkylene polymers (e.g., methyl-polyisopropylene glycol ether having an average Mn of ~1000 Daltons, diphenyl ether of polypropylene glycol having an average Mn from about 1000 to about 1500 Daltons); and mono- and poly-carboxylic esters thereof (e.g., acetic acid ester(s), mixed $C_3$-$C_8$ fatty acid esters, $C_{12}$ oxo acid diester(s) of tetraethylene glycol, or the like, or combinations thereof).

Another suitable class of synthetic lubricating oils may comprise the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoethers, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, a complex ester formed by reacting one mole of sebacic acid with two moles of tetraethylene glycol and two moles of 2-ethyl-hexanoic acid, and the like, and combinations thereof. A preferred type of oil from this class of synthetic oils may include adipates of $C_4$ to $C_{12}$ alcohols.

Esters useful as synthetic lubricating oils may additionally or alternatively include those made from $C_5$-$C_{12}$ monocarboxylic acids, polyols, and/or polyol ethers, e.g., such as neopentyl glycol, trimethylolpropane pentaerythritol, dipentaerythritol, tripentaerythritol, and the like, as well as combinations thereof.

The lubricating oils may be derived from unrefined oils, refined oils, re-refined oils, or mixtures thereof. Unrefined oils are obtained directly from a natural source or synthetic source (e.g., coal, shale, or tar sands bitumen) without further purification or treatment. Examples of unrefined oils may include a shale oil obtained directly from a retorting operation, a petroleum oil obtained directly from distillation, or an ester oil obtained directly from an esterification process, each or a combination of which may then be used without further treatment. Refined oils are similar to the unrefined oils, except that refined oils have typically been treated in one or more purification steps to change chemical structure and/or to improve one or more properties. Suitable purification techniques may include distillation, hydrotreating, dewaxing, solvent extraction, acid or base extraction, filtration, and percolation, all of which are known to those skilled in the art. Re-refined oils may be obtained by treating used and/or refined oils in processes similar to those used to obtain refined oils in the first place. Such re-refined oils may be known as reclaimed or reprocessed oils and may often additionally be processed by techniques for removal of spent additives and oil breakdown products.

Another additional or alternative class of suitable lubricating oils may include those basestocks produced from oligomerization of natural gas feed stocks or isomerization of waxes. These basestocks can be referred to in any number of ways but commonly they are known as Gas-to-Liquid (GTL) or Fischer-Tropsch basestocks.

The lubricating oil basestock according to the present disclosure may be a blend of one or more of the oils/basestocks described herein, whether of a similar or different type, and a blend of natural and synthetic lubricating oils (i.e., partially synthetic) is expressly contemplated for this disclosure.

Lubricating oils can be classified as set out in the American Petroleum Institute (API) publication "Engine Oil Licensing and Certification System", Industry Services Department, Fourteenth Edition, December 1996, Addendum 1, December 1998, in which oils are categorized as follows:

a) Group I basestocks contain less than 90 percent saturates and/or greater than 0.03 percent sulfur and have a viscosity index greater than or equal to 80 and less than 120;

b) Group H basestocks contain greater than or equal to 90 percent saturates and less than or equal to 0.03 percent sulfur and have a viscosity index greater than or equal to 80 and less than 120;

c) Group III basestocks contain greater than or equal to 90 percent saturates and less than or equal to 0.03 percent sulfur and have a viscosity index greater than or equal to 120;

d) Group IV basestocks are polyalphaolefins (PAO); and, e) Group V basestocks include all other basestock oils not included in Groups I, II, III, or IV.

In particular, the lubricating oil may comprise or be a mineral oil or a mixture of mineral oils, in particular mineral oils of Group I, Group II and/or Group III (of the API classification). For example, a lubricating oil basestock (e.g., Group I, Group II and/or Group III) may comprise from 55 mass % to 98 mass %, e.g., from 55 mass % to 95 mass %, from 55 mass % to 90 mass %, from 55 mass % to 85 mass %, from 60 mass % to 98 mass %, from 60 mass % to 95 mass %, from 60 mass % to 90 mass %, from 60 mass % to 85 mass %, from 65 mass % to 98 mass %, from 65 mass % to 95 mass %, from 65 mass % to 90 mass %, from 65 mass % to 85 mass %, from 70 mass % to 98 mass %, from 70 mass % to 95 mass %, from 70 mass % to 90 mass %, from 70 mass % to 85 mass %, from 75 mass % to 98 mass %, from 75 mass % to 95 mass %, from 75 mass % to 90 mass %, from 75 mass % to 85 mass %, from 80 mass % to 98 mass %, from 80 mass % to 95 mass %, from 80 mass % to 90 mass %, or from 80 mass % to 85 mass %, of the total mass of the lubricant composition (which comprises the lubricating oil basestock component and any lubricant additives, in this case as well as a viscosity modifier).

The lubricant additive may include one or more additive components and may be present in a (concentrated) lubricant additive package. Although (concentrated) additive packages typically include some minor amount of lubricating oil basestock or the like to compatibilize additives with the remainder of the lubricant composition, the term "additive" here only refers to the lubricant additives in the lubricant composition, while the term "lubricating oil basestock" refers to all the basestocks both from the additive package and as majority phase lubricant component. Additionally or alternatively, two or more additives may be added together as an additive package, while one or more other components may be added separately to the lubricating oil basestock and/or to the admixture for forming the lubricant composition.

In particular, the lubricant additive may comprise, consist essentially of, or be one or more of an antioxidant, a corrosion inhibitor, an anti-wear additive, a friction modifier, a dispersant, a detergent, a defoaming agent, an extreme pressure additive, a pour point depressant, optionally a dye and/or a dye stabilizer, and a seal-swelling control agent.

Anti-wear additives, as the name suggests, may be used to reduce wear in lubricated components, e.g., motorized drivetrain components such as crankcases and/or transmissions. Some anti-wear components may alternatively provide antioxidant function, as well as anti-wear function.

It is known in the art that compounds contain phosphorus can provide wear protection to highly-loaded contacting metal surfaces. Without being bound by theory, this has been suggested to be the result of the formation of a phosphite 'glass' on a lubricated metal surface.

A phosphorus-containing anti-wear component may comprise one or more, in particular two or more or three or more, compounds of structures (I):

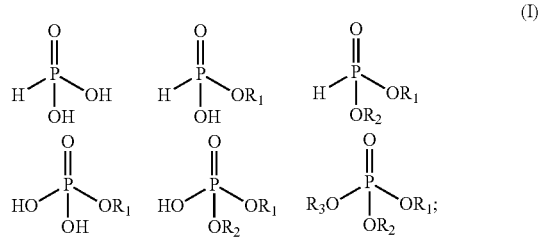

where groups $R_1$, $R_2$, and $R_3$ may each independently comprise or be alkyl groups having 1 to 18 carbon atoms and/or alkyl groups having 1 to 18 carbon atoms where the alkyl chain is interrupted by a thioether linkage, with the proviso that at least some of groups $R_1$, $R_2$, and $R_3$ may comprise or be alkyl groups having 1 to 18 carbon atoms where the alkyl chain is interrupted by a thioether linkage. The mixture may comprise three or more, four or more, or five or more compounds of the structures (I).

In some embodiments, groups $R_1$, $R_2$, and $R_3$ may each independently comprise or be alkyl groups having 4 to 10 carbon atoms and/or alkyl groups having 4 to 10 carbon atoms where the alkyl chain is interrupted by a thioether linkage, with the proviso that at least some of groups $R_1$, $R_2$, and $R_3$ may comprise or be alkyl groups having 4 to 10 carbon atoms where the alkyl chain is interrupted by a thioether linkage.

When groups $R_1$, $R_2$, and $R_3$ comprise alkyl groups (in which the alkyl chain is not interrupted by a thioether linkage), examples may include but are not limited to methyl, ethyl, propyl, and butyl, in particular including or being butyl.

When groups $R_1$, $R_2$, and $R_3$ comprise alkyl groups where the alkyl chain is interrupted by a thioether linkage, examples include groups of the structure —R'—S—R" where R' may be —$(CH_2)_n$—, in which n may be an integer from 2 to 4, and where R" may be —$(CH_2)_m$—$CH_3$, in which m may be an integer from 1 to 17, such as from 3 to 9.

In particular, with respect to the compounds of structures (I), at least 10% (e.g., at least 20%, at least 30%, or at least 40%) by mass of all structure (I) compounds comprise those in which at least one of $R_1$, $R_2$, and $R_3$ comprises or is an alkyl group where the alkyl chain is interrupted by a thioether linkage, particularly having the structure —R'—S—R", where R' may be —$(CH_2)_n$—, in which n may be an integer from 2 to 4, and where R" may be —$(CH_2)_m$—$CH_3$, in which m may be an integer from 1 to 17, such as from 3 to 9.

Another class of phosphorus-containing anti-wear additives may include one or more zinc dihydrocarbyl dithiophosphate compounds. Such compounds are known in the art and often referred to as ZDDP. They may be prepared in accordance with known techniques, such as by first forming a dihydrocarbyl dithiophosphoric acid (DDPA), usually by reaction of one or more alcohols or a phenol with $P_2S_5$, and then neutralizing the formed DDPA with a zinc compound. For example, a dithiophosphoric acid may be made by reacting mixtures of primary and secondary alcohols. Alternatively, dithiophosphoric acids can be prepared where the hydrocarbyl groups are entirely secondary in character or the hydrocarbyl groups are entirely primary in character, To make the zinc salt, any basic or neutral zinc compound may be used, but oxides, hydroxides, and carbonates are typically employed. Commercial additives may frequently contain an excess of zinc, due to the use of an excess of the basic zinc compound in the neutralization reaction.

Advantageous zinc dihydrocarbyl dithiophosphates may comprise or be oil-soluble or oil-dispersible salts of dihydrocarbyl dithiophosphoric acids, such as represented by the following formula:

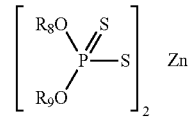

wherein $R_8$ and $R_9$ may be the same or different hydrocarbyl radicals containing from 1 to 18 (e.g., from 2 to 12 or from 2 to 8) carbon atoms, examples of which hydrocarbyl radicals may include one or more of alkyl, alkenyl, aryl, arylalkyl, alkaryl, and cycloaliphatic radicals. Exemplary hydrocarbyl radicals may comprise or be, but are not necessarily limited to, ethyl, n-propyl, isopropyl, n-butyl, isobutyl, sec-butyl, amyl, n-hexyl, isohexyl, n-octyl, decyl, dodecyl, octadecyl, 2-ethylhexyl, phenyl, benzyl, butylphenyl, cyclohexyl, methylcyclopentyl, propenyl, butenyl, and combinations thereof. In order to obtain and/or maintain oil solubility and/or dispersibility, the total number of carbon atoms on each dihydrocarbyl dithiophosphoric acid ligand (i.e., a single $R_8$ and $R_9$ pair) may generally be at least about 5. In particular, the zinc dihydrocarbyl dithiophosphate can therefore comprise or be a zinc dialkyl dithiophosphate.

A non-phosphorus-containing anti-wear component, which is typically present in admixture with the phosphorus-containing anti-wear compound(s) of structures (I), may comprise one or more, in particular two or more, compounds of structures (II):

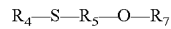

where groups $R_4$ and $R_7$ may each independently comprise or be alkyl groups having 1 to 12 carbon atoms, and where $R_5$ and $R_6$ may each independently comprise or be alkyl linkages having 2 to 12 carbon atoms. In particular, $R_4$ and $R_7$ may each independently comprise or be —$(CH_2)_m$—$CH_3$, where m is an integer from 1 to 17, such as from 3 to 9, and $R_5$ and $R_6$ may each independently comprise or be —$(CH_2)_n$—, where n is an integer from 2 to 4. The mixture may comprise three or more compounds of structures (II).

In particular, a mass ratio of compounds of structure (I) to compounds of structure (II) may be from 2:1 to 1:2, from 3:2 to 2:3, or from 4:3 to 3:4.

Examples of ashless dispersants may include polyisobutenyl succinimides, polyisobutenyl succinamides, mixed ester/amides of polyisobutenyl-substituted succinic acid, hydroxyesters of polyisobutenyl-substituted succinic acid, and Mannich condensation products of hydrocarbyl-substituted phenols, formaldehyde, and polyamines, as well as reaction products and mixtures thereof.

Basic nitrogen-containing ashless dispersants are well-known lubricating oil additives and methods for their preparation are extensively described in the patent literature. Exemplary dispersants may include the polyisobutenyl succinimides and succinamides in which the polyisobutenyl-substituent is a long-chain of greater than 36 carbons, greater than 40 carbon atoms. These materials can be readily made by reacting a polyisobutenyl-substituted dicarboxylic acid material with a molecule containing amine functionality. Examples of suitable amines may include polyamines such as polyalkylene polyamines, hydroxy-substituted polyamines, polyoxyalkylene polyamines, and combinations thereof. The amine functionality may be provided by polyalkylene polyamines such as tetraethylene pentamine and pentaethylene hexamine. Mixtures where the average number of nitrogen atoms per polyamine molecule is greater than 7 are also available. These are commonly called heavy polyamines or H-PAMs and may be commercially available under trade names such as HPA™ and HPA-X™ from DowChemical, E-100™ from Huntsman Chemical, et at. Examples of hydroxy-substituted polyamines may include N-hydroxyalkyl-alkylene polyamines such as N-(2-hydroxyethyl)ethylene diamine, N-(2-hydroxyethyl)piperazine, and/or N-hydroxyalkylated alkylene diamines of the type described, for example, in U.S. Pat. No. 4,873,009. Examples of polyoxyalkylene polyamines may include polyoxyethylene and polyoxypropylene diamines and triamines having an average Mn from about 200 to about 2500 Daltons. Products of this type may be commercially available under the tradename Jeffamine™.

As is known in the art, reaction of the amine with the polyisobutenyl-substituted dicarboxylic acid material (suitably an alkenyl succinic anhydride or maleic anhydride) can be conveniently achieved by heating the reactants together, e.g., in an oil solution. Reaction temperatures of ~100° C. to ~250° C. and reaction times from ~1 to ~10 hours may be typical. Reaction ratios can vary considerably, but generally from about 0.1 to about 1.0 equivalents of dicarboxylic acid unit content may be used per reactive equivalent of the amine-containing reactant.

In particular, the ashless dispersant may include a polyisobutenyl succinimide formed from polyisobutenyl succinic anhydride and a polyalkylene polyamine such as tetraethylene pentamine or H-PAM. The polyisobutenyl group may be derived from polyisobutene and may exhibit a number average molecular weight (Mn) from about 750 to about 5000 Daltons, e.g., from about 900 to about 2500 Daltons. As is known in the art, dispersants may be post treated (e.g., with a borating/boronating agent and/or with an inorganic acid of phosphorus). Suitable examples may be found, for instance, in U.S. Pat. Nos. 3,254,025, 3,502,677, and 4,857,214.

Detergents, such as calcium-containing detergents, are sufficiently oil-soluble or oil-dispersible such as to remain dissolved or dispersed in an oil in order to be transported by the oil to their intended site of action. Calcium-containing detergents are known in the art and include neutral and overbased calcium salts with acidic substances such as salicylic acids, sulfonic acids, carboxylic acids, alkyl phenols, sulfurized alkyl phenols and mixtures of these substances.

Neutral calcium-containing detergents are those detergents that contain stoichiometrically equivalent amounts of calcium in relation to the amount of (Lewis) acidic moieties present in the detergent. Thus, in general, neutral detergents can typically have a relatively low basicity, when compared to their overbased counterparts.

The term "overbased," for example in connection with calcium detergents, is used to designate the fact that the calcium component is present in stoichiometrically larger amounts than the corresponding (Lewis) acid component. The commonly employed methods for preparing the overbased salts involve heating a mineral oil solution of an acid with a stoichiometric excess of a neutralizing agent at an appropriate temperature (in this case, a calcium neutralizing agent, such as an oxide, hydroxide, carbonate, bicarbonate, sulfide, or combination thereof, at a temperature of about 50° C.) and filtering the resultant product. The use of a "promoter" in the neutralization step to aid the incorporation of a large excess of salt/base (in this case, calcium) likewise is known. Examples of compounds useful as a promoter may include, but are not necessarily limited to, phenolic substances such as phenol, naphthol, alkyl phenol, thiophenol, sulfurized alkylphenol, and condensation products of formaldehyde with a phenolic substance; alcohols such as methanol, 2-propanol, octanol, Cellosolve™ alcohol, Carbitol™ alcohol, ethylene glycol, stearyl alcohol, and cyclohexyl alcohol; amines such as aniline, phenylene diamine, phenothiazine, phenyl-beta-naphthylamine, and dodecylamine; and combinations thereof. A particularly effective method for preparing the basic salts comprises mixing an acidic substance with an excess of calcium neutralizing agent and at least one alcohol promoter, and carbonating the mixture at an elevated temperature, such as from 60 to 200° C.

Examples of calcium-containing detergents useful in lubricant compositions of the present disclosure may include, but are not necessarily limited to, neutral and/or overbased salts of such substances as calcium phenates; sulfurized calcium phenates (e.g., wherein each aromatic group has one or more aliphatic groups to impart hydrocarbon solubility); calcium sulfonates (e.g., wherein each sulfonic acid moiety is attached to an aromatic nucleus, which in turn usually contains one or more aliphatic substituents to impart hydrocarbon solubility); calcium salicylates (e.g., wherein the aromatic moiety is usually substituted by one or more aliphatic substituents to impart hydrocarbon solubility); calcium salts of hydrolyzed phosphosulfurized olefins (e.g., having 10 to 2000 carbon atoms) and/or of hydrolyzed phosphosulfurized alcohols and/or aliphatic-substituted phenolic compounds (e.g., having 10 to 2000 carbon atoms); calcium salts of aliphatic carboxylic acids and/or aliphatic substituted cycloaliphatic carboxylic acids; and combinations and/or reaction products thereof; as well as many other similar calcium salts of oil-soluble organic acids. Mixtures of neutral and/or overbased salts of two or more different acids can be used, if desired (e.g., one or more overbased calcium phenates with one or more overbased calcium sulfonates).

Methods for the production of oil-soluble neutral and overbased calcium detergents are well known to those skilled in the art and are extensively reported in the patent literature. Calcium-containing detergents may optionally be post-treated, e.g., borated. Methods for preparing borated detergents are well known to those skilled in the art and are extensively reported in the patent literature.

Antioxidants are sometimes referred to as oxidation inhibitors and may increase the resistance (or decrease the susceptibility) of the lubricant composition to oxidation. They may work by combining with and modifying oxidative agents, such as peroxides and other free radical-forming compounds, to render them harmless, e.g., by decomposing them or by rendering inert a catalyst or facilitator of oxidation. Oxidative deterioration can be evidenced by sludge in the fluid with increased use, by varnish-like deposits on metal surfaces, and sometimes by viscosity increase.

Examples of suitable antioxidants may include, but are not limited to, copper-containing antioxidants, sulfur-containing antioxidants, aromatic amine-containing and/or amide-containing antioxidants, hindered phenolic antioxidants, dithiophosphates and derivatives, and the like, as well as combinations and certain reaction products thereof. Some anti-oxidants may be ashless (i.e., may contain few, if any, metal atoms other than trace or contaminants).

Corrosion inhibitors may be used to reduce the corrosion of metals and are often alternatively referred to as metal deactivators or metal passivators. Some corrosion inhibitors may alternatively be characterized as antioxidants.

Suitable corrosion inhibitors may include nitrogen and/or sulfur containing heterocyclic compounds such as triazoles (e.g., benzotriazoles), substituted thiadiazoles, imidazoles, thiazoles, tetrazoles, hydroxyquinolines, oxazolines, imidazolines, thiophenes, indoles, indazoles, quinolines, benzoxazines, dithiols, oxazoles, oxatriazoles, pyridines, piperazines, triazines and derivatives of any one or more thereof. A particular corrosion inhibitor is a benzotriazole represented by the structure:

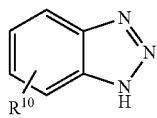

wherein $R^{10}$ is absent or is a $C_1$ to $C_{20}$ hydrocarbyl or substituted hydrocarbyl group which may be linear or branched, saturated or unsaturated. It may contain ring structures that are alkyl or aromatic in nature and/or contain heteroatoms such as N, O, or S. Examples of suitable compounds may include benzotriazole, alkyl-substituted benzotriazoles (e.g., tolyltriazole, ethylbenzotriazole, hexylbenzotriazole, octylbenzotriazole, etc.), aryl substituted benzotriazole, alkaryl- or aralkyl-substituted benzotriazoles, and the like, as well as combinations thereof. For instance, the triazole may comprise or be a benzotriazole and/or an alkylbenzotriazole in which the alkyl group contains from 1 to about 20 carbon atoms or from 1 to about 8 carbon atoms. A preferred corrosion inhibitor may comprise or be benzotriazole and/or tolyltriazole.

Additionally or alternatively, the corrosion inhibitor may include a substituted thiadiazoles represented by the structure:

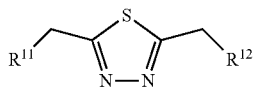

wherein $R^{11}$ and $R^{12}$ are independently hydrogen or a hydrocarbon group, which group may be aliphatic or aromatic, including cyclic, alicyclic, aralkyl, aryl and alkaryl. These substituted thiadiazoles are derived from the 2,5-dimercapto-1,3,4-thiadiazole (DMTD) molecule. Many derivatives of DMTD have been described in the art, and any such compounds can be included in the transmission fluid used in the present disclosure. For example, U.S. Pat. Nos. 2,719,125, 2,719,126, and 3,087,937 describe the preparation of various 2,5-bis-(hydrocarbon dithio)-1,3,4-thiadiazoles.

Further additionally or alternatively, the corrosion inhibitor may include one or more other derivatives of DMTD, such as a carboxylic ester in which $R^9$ and $R^{10}$ may be joined to the sulfide sulfur atom through a carbonyl group. Preparation of these thioester containing DMTD derivatives is described, for example, in U.S. Pat. No. 2,760,933. DMTD derivatives produced by condensation of DMTD with alpha-halogenated aliphatic monocarboxylic carboxylic acids having at least 10 carbon atoms are described, for example, in U.S. Pat. No. 2,836,564. This process produces DMTD derivatives wherein $R^{11}$ and $R^{12}$ are HOOC—CH($R^{13}$)— ($R^{13}$ being a hydrocarbyl group). DMTD derivatives further produced by amidation or esterification of these terminal carboxylic acid groups may also be useful.

The preparation of 2-hydrocarbyldithio-5-mercapto-1,3,4-thiadiazoles is described, for example, in U.S. Pat. No. 3,663,561.

A particular class of DMTD derivatives may include mixtures of a 2-hydrocarbyldithio-5-mercapto-1,3,4-thiadiazole and a 2,5-bis-hydrocarbyldithio-1,3,4-thiadiazole. Such mixtures may be sold under the tradename HiTEC® 4313 and are commercially available from Afton Chemical.

Friction modifiers may include derivatives of polyethylene polyamines and/or ethoxylated long chain amines. The derivatives of polyethylene polyamines may advantageously include succinimides of a defined structure or may be simple amides.

Suitable succinimides derived from polyethylene polyamines may include those of the following structure:

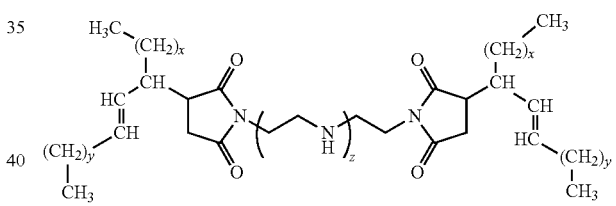

wherein x+y may be from 8 to 15 and z may be 0 or an integer from 1 to 5, in particular wherein x+y may be from 11 to 15 (e.g., 13) and z may be from 1 to 3. Preparation of such friction modifiers is described, for example, in U.S. Pat. No. 5,840,663.

The above succinimides may be post-reacted with acetic anhydride to form friction modifiers exemplified by the following structure (in which z=1):

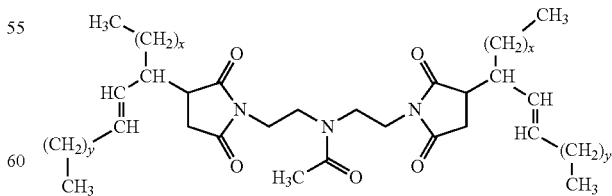

Preparation of this friction modifier, e.g., can be found in U.S. Patent Application Publication No. 2009/0005277. Post reaction with other reagents, e.g., borating agents, is also known in the art.

An example of an alternative simple amide may have the following structure:

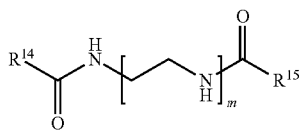

wherein $R^{14}$ and $R^{15}$ may be the same or different alkyl groups. For example, $R^{14}$ and $R^{15}$ may be $C_{14}$ to $C_{20}$ alkyl groups, which may be linear or branched, and m can be an integer from 1 to 5. In particular, $R^{14}$ and $R^{15}$ may both be derived from iso-stearic acid, and m may be 4.

Suitable ethoxylated amine friction modifiers may include or be reaction products of primary amines and/or diamines with ethylene oxide. The reaction with ethylene oxide may be suitably carried out using a stoichiometry such that substantially all primary and secondary amines may be converted to tertiary amines. Such amines may have the exemplary structures:

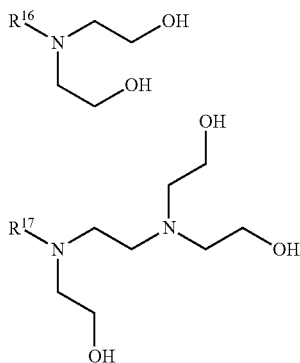

wherein $R^{16}$ and $R^{17}$ may be alkyl groups, or alkyl groups containing sulfur or oxygen linkages, containing from about 10 to 20 carbon atoms. Exemplary ethoxylated amine friction modifiers may include materials in which $R^{16}$ and/or $R^{17}$ may contain from 16 to 20 carbon atoms, e.g., from 16 to 18 carbon atoms. Materials of this type may be commercially available and sold under the tradenames of Ethomeen™ and Ethoduomeen® by Akzo Nobel. Suitable materials from Akzo Nobel may include Ethomeen® T/12 and Ethoduomeen® T/13, inter alia.

Another alternative type of friction modifier includes an oil-soluble or oil-dispersible molybdenum-containing compound, such as an oil-soluble or oil-dispersible organo-molybdenum compound. Non-limiting examples of such oil-soluble or oil-dispersible organo-molybdenum compound may include, but are not necessarily limited to, molybdenum dithiocarbamates, molybdenum dithiophosphates, molybdenum dithiophosphinates, molybdenum xanthates, molybdenum thioxanthates, molybdenum sulfides, and the like, and mixtures thereof, in particular one or more of molybdenum dialkyldithiocarbamates, molybdenum dialkyldithiophosphates, molybdenum alkyl xanthates, and molybdenum alkylthioxanthates. Representative molybdenum alkyl xanthate and molybdenum alkylthioxanthate compounds may be expressed using the formulae of $Mo(R_{18}OCS_2)_4$ and $Mo(R_{18}SCS_2)_4$, respectively, wherein each $R_{18}$ may independently be an organo group selected from the group consisting of alkyl, aryl, aralkyl, and alkoxyalkyl, generally having from 1 to 30 carbon atoms or from 2 to 12 carbon atoms, in particular each being an alkyl group having from 2 to 12 carbon atoms.

In certain embodiments, the oil-soluble or oil-dispersible organo-molybdenum compound may comprise a molybdenum dithiocarbamate, such as a molybdenum dialkyldithiocarbamate, and/or may be substantially free from molybdenum dithiophosphates, in particular from molybdenum dialkyldithiophosphates. In certain other embodiments, any oil-soluble or oil-dispersible molybdenum compounds may consist of a molybdenum dithiocarbamate, such as a molybdenum dialkyldithiocarbamate, and/or a molybdenum dithiophosphate, such as a molybdenum dialkyldithiophosphate, as the sole source(s) of molybdenum atoms in the lubricant composition. In either set of embodiments, the oil-soluble or oil-dispersible molybdenum compound may consist essentially of a molybdenum dithiocarbamate, such as a molybdenum dialkyldithiocarbamate, as the sole source of molybdenum atoms in the lubricant composition.

The molybdenum compound may be mono-, di-, tri-, or tetra-nuclear, in particular comprising or being di-nuclear and/or tri-nuclear molybdenum compounds.

Suitable dinuclear or dimeric molybdenum dialkyldithiocarbamates, for example, can be represented by the following formula:

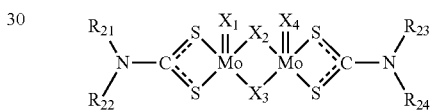

where $R_{21}$ through $R_{24}$ may each independently represent a straight chain, branched chain, or aromatic hydrocarbyl group having 1 to 24 carbon atoms, and where $X_1$ through $X_4$ may each independently represent an oxygen atom or a sulfur atom. The four hydrocarbyl groups, $R_{21}$ through $R_{24}$, may be identical to, or different from, each other.

Suitable tri-nuclear organo-molybdenum compounds may include those having the formula: $Mo_3S_kL_nQ_z$, and mixtures thereof. In such tri-nuclear formula, the three molybdenum atoms may be linked to multiple sulfur atoms (S), with k varying from 4 through 7. Additionally, each L may be an independently selected organic ligand having a sufficient number of carbon atoms to render the compound oil-soluble or oil-dispersible, with n being from 1 to 4. Further, when z is non-zero, Q may be selected from the group of neutral electron donating compounds such as water, amines, alcohols, phosphines, and/or ethers, with z ranging from 0 to 5 and including non-stoichiometric (non-integer) values.

In such tri-nuclear formula, at least 21 total carbon atoms (e.g., at least 25, at least 30, or at least 35) may typically be present among the combination of all ligands ($L_n$). Importantly, however, the organic groups of the ligands may advantageously collectively exhibit a sufficient number of carbon atoms to render the compound soluble or dispersible in the oil. For example, the number of carbon atoms within each ligand L may generally range from 1 to 100, e.g., from 1 to 30 or from 4 to 20.

Tri-nuclear molybdenum compounds having the formula $Mo_3S_kL_nQ_z$, may advantageously exhibit cationic cores surrounded by anionic ligands, such as represented by one or both of the following structures:

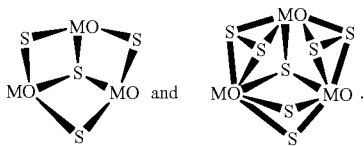

Such cationic cores may each have a net charge of +4 (e.g., due to the oxidation state of the Mo atoms each being +4). Consequently, in order to solubilize these cores, the total charge among all the ligands should correspond, in this case being −4. Four mono-anionic ligands may offer an advantageous core neutralization. Without wishing to be bound by any theory, it is believed that two or more tri-nuclear cores may be bound or interconnected by means of one or more ligands, and the ligands may be multidentate. This includes the case of a multidentate ligand having multiple connections to a single core. Oxygen and/or selenium may be substituted for some portion of the sulfur atoms in either of the cores.

As ligands for the tri-nuclear cores described above, non-limiting examples may include, but are not necessarily limited to, dithiophosphates such as dialkyldithiophosphate, xanthates such as alkylxanthate and/or alkylthioxanthate, dithiocarbamates such as dialkyldithiocarbamate, and combinations thereof, in particular each comprising or being dialkyldithiocarbamate. Additionally or alternatively, the ligands for the tri-nuclear molybdenum-containing cores may independently be one or more of the following:

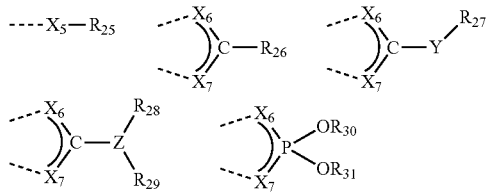

where $X_5$, $X_6$, $X_7$, and Y are each independently oxygen or sulfur, where Z is nitrogen or boron, and wherein $R_{25}$, $R_{26}$, $R_{27}$, $R_{28}$, $R_{29}$, $R_{30}$, and $R_{31}$ are each independently hydrogen or an organic (carbon-containing) moiety, such as a hydrocarbyl group, that may be the same or different from each other, in particular the same. Exemplary organic moieties may include or be alkyl (e.g., in which the carbon atom attached to the remainder of the ligand is primary or secondary), aryl, substituted aryl, alkaryl, substituted alkaryl, aralkyl, substituted aralkyl, an ether, a thioether, or a combination or reaction product thereof, in particular alkyl.

Oil-soluble or oil-dispersible tri-nuclear molybdenum compounds can be prepared by reacting in the appropriate liquid(s)/solvent(s) a molybdenum source such as $(NH_4)_2 Mo_3S_{13} \cdot n(H_2O)$, where n varies from 0 to 2 including non-stoichiometric (non-integer) values, with a suitable ligand source, such as a tetraalkylthiuram disulfide. Other oil-soluble or dispersible tri-nuclear molybdenum compounds can be formed during a reaction in the appropriate solvent(s) of a molybdenum source such as of $(NH_4)_2 Mo_3S_{13} \cdot n(H_2O)$, a ligand source, such as tetraalkylthiuram disulfide, a dialkyldithiocarbamate, or a dialkyldithiophosphate, and a sulfur abstracting agent, such as cyanide ions, sulfite ions, or substituted phosphines. Alternatively, a tri-nuclear molybdenum-sulfur halide salt such as $[M']_2 [Mo_3S_7A_6]$, where M' is a counter ion and A is a halogen such as Cl, Br, or I, may be reacted with a ligand source such as a dialkyldithiocarbamate or a dialkyldithiophosphate in an appropriate liquid/solvent (system) to form an oil-soluble or oil-dispersible trinuclear molybdenum compound. The appropriate liquid/solvent (system) may be, for example, aqueous or organic.

Other molybdenum precursors may include acidic molybdenum compounds. Such compounds may react with a basic nitrogen compound, as measured by ASTM D-664 or D-2896 titration procedure, and may typically be hexavalent. Examples may include, but are not necessarily limited to, molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide, or similar acidic molybdenum compounds, or combinations thereof. Thus, additionally or alternatively, the compositions of the present disclosure can be provided with molybdenum by molybdenum/sulfur complexes of basic nitrogen compounds as described, for example, in U.S. Pat. Nos. 4,263,152, 4,285,822, 4,283,295, 4,272,387, 4,265,773, 4,261,843, 4,259,195, and 4,259,194, and/or in PCT Publication No. WO 94/06897.

Other additives known in the art may optionally be added to the lubricant compositions, such as defoaming agents, seal-swelling control agents, extreme pressure additives, pour point depressants, other viscosity modifiers, optionally dyes and dye stabilizers, and the like. They are typically disclosed in, for example, "Lubricant Additives" by C. V. Smallheer and R. Kennedy Smith, 1967, pp 1-11.

By virtue of the comb copolymer viscosity modifier being combined with the lubricant composition (or component thereof), the resultant viscosity modified mixture may exhibit at least a 5% difference (e.g., at least a 10% difference, at least a 15% difference, or at least a 20% difference), relative to the lubricant composition component(s) without the comb copolymer viscosity modifier, with regard to dispersancy (e.g., soot dispersancy) and with regard to one or more (e.g., at least two, at least three, at least four, at least five, at least six, or all seven) of HTHS150, HTHS100, HTHS80, KV100, KV40, KV20, and VI.

Lubricant compositions containing the comb copolymer viscosity modifier, as well as both the additive(s) and the lubricating oil basestock, may exhibit advantageous viscometric and/or dispersancy characteristics, which can include, but may not necessarily be limited to, those described herein.

Lubricant compositions according to the present disclosure, particularly those formulated to meet 0W20 lubricant specifications, may exhibit a high-temperature high-shear viscosity at approximately 150° C. (HTHS150) of at least 2.50, e.g., at least 2.54, at least 2.55, at least 2.56, at least 2.57, at least 2.58, at least 2.59, at least 2.60, at least 2.61, at least 2.62, at least 2.63, at least 2.64, or at least 2.65 (in particular, at least 2.55 cPs). While there is not necessarily an upper limit for the specification, the lubricant compositions may optionally also exhibit a HTHS150 of at most 2.75, at most 2.80, or at most 2.90.

Additionally or alternatively, lubricant compositions according to the present disclosure, particularly those formulated to meet 0W20 lubricant specifications, may exhibit a high-temperature high-shear viscosity at approximately 100° C. (HTHS100) of at most 5.74 cPs, e.g., at most 5.69 cPs, at most 5.66 cPs, at most 5.64 cPs, at most 5.62 cPs, at most 5.60 cPs, at most 5.58 cPs, at most 5.54 cPs, or at most 5.44 cPs (in particular, at most 5.60 cPs or at most 5.58 cPs). While there is not necessarily a lower limit for the specification, the lubricant compositions may optionally also exhibit a HTHS100 of at least 5.15 cPs or at least 5.25 cPs.

Further additionally or alternatively, lubricant compositions according to the present disclosure, particularly those formulated to meet 0W20 lubricant specifications, may exhibit a high-temperature high-shear viscosity at approximately 80° C. (HTHS80) of at most 8.54 cPs, e.g., at most 8.45 cPs, at most 8.40 cPs, at most 8.35 cPs, at most 8.34 cPs, at most 8.33 cPs, at most 8.30 cPs, at most 8.25 cPs, or at most 8.20 cPs (in particular, at most 8.30 cPs, at most 8.25 cPs, or at most 8.20 cPs). While there is not necessarily a lower limit for the specification, the lubricant compositions may optionally also exhibit a HTHS80 of at least 7.65 cPs or at least 7.80 cPs.

Still further additionally or alternatively, lubricant compositions according to the present disclosure, particularly those formulated to meet 0W20 lubricant specifications, may exhibit a kinematic viscosity at approximately 100° C. (KV100) from 6.80 cSt to 9.50 cSt, e.g., from 6.80 cSt to 9.44 cSt, from 6.80 cSt to 9.42 cSt, from 6.80 cSt to 9.40 cSt, from 6.80 cSt to 9.38 cSt, from 6.80 cSt to 9.30 cSt, from 6.80 cSt to 9.20 cSt, from 6.80 cSt to 9.10 cSt, from 6.80 cSt to 9.00 cSt, from 6.80 cSt to 8.75 cSt, from 6.80 cSt to 8.50 cSt, from 6.80 cSt to 8.30 cSt, from 6.80 cSt to 8.10 cSt, from 6.80 cSt to 7.94 cSt, from 6.80 cSt to 7.84 cSt, from 6.80 cSt to 7.74 cSt, from 6.90 cSt to 9.50 cSt, from 6.90 cSt to 9.44 cSt, from 6.90 cSt to 9.42 cSt, from 6.90 cSt to 9.40 cSt, from 6.90 cSt to 9.38 cSt, from 6.90 cSt to 9.30 cSt, from 6.90 cSt to 9.20 cSt, from 6.90 cSt to 9.10 cSt, from 6.90 cSt to 9.00 cSt, from 6.90 cSt to 8.75 cSt, from 6.90 cSt to 8.50 cSt, from 6.90 cSt to 8.30 cSt, from 6.90 cSt to 8.10 cSt, from 6.90 cSt to 7.94 cSt, from 6.90 cSt to 7.84 cSt, from 6.90 cSt to 7.74 cSt, from 7.00 cSt to 9.50 cSt, from 7.00 cSt to 9.44 cSt, from 7.00 cSt to 9.42 cSt, from 7.00 cSt to 9.40 cSt, from 7.00 cSt to 9.38 cSt, from 7.00 cSt to 9.30 cSt, from 7.00 cSt to 9.20 cSt, from 7.00 cSt to 9.10 cSt, from 7.00 cSt to 9.00 cSt, from 7.00 cSt to 8.75 cSt, from 7.00 cSt to 8.50 cSt, from 7.00 cSt to 8.30 cSt, from 7.00 cSt to 8.10 cSt, from 7.00 cSt to 7.94 cSt, from 7.00 cSt to 7.84 cSt, from 7.00 cSt to 7.74 cSt, from 7.10 cSt to 9.50 cSt, from 7.10 cSt to 9.44 cSt, from 7.10 cSt to 9.42 cSt, from 7.10 cSt to 9.40 cSt, from 7.10 cSt to 9.38 cSt, from 7.10 cSt to 9.30 cSt, from 7.10 cSt to 9.20 cSt, from 7.10 cSt to 9.10 cSt, from 7.10 cSt to 9.00 cSt, from 7.10 cSt to 8.75 cSt, from 7.10 cSt to 8.50 cSt, from 7.10 cSt to 8.30 cSt, from 7.10 cSt to 8.10 cSt, from 7.10 cSt to 7.94 cSt, from 7.10 cSt to 7.84 cSt, from 7.10 cSt to 7.74 cSt, from 7.20 cSt to 9.50 cSt, from 7.20 cSt to 9.44 cSt, from 7.20 cSt to 9.42 cSt, from 7.20 cSt to 9.40 cSt, from 7.20 cSt to 9.38 cSt, from 7.20 cSt to 9.30 cSt, from 7.20 cSt to 9.20 cSt, from 7.20 cSt to 9.10 cSt, from 7.20 cSt to 9.00 cSt, from 7.20 cSt to 8.75 cSt, from 7.20 cSt to 8.50 cSt, from 7.20 cSt to 8.30 cSt, from 7.20 cSt to 8.10 cSt, from 7.20 cSt to 7.94 cSt, from 7.20 cSt to 7.84 cSt, from 7.20 cSt to 7.74 cSt, from 7.30 cSt to 9.50 cSt, from 7.30 cSt to 9.44 cSt, from 7.30 cSt to 9.42 cSt, from 7.30 cSt to 9.40 cSt, from 7.30 cSt to 9.38 cSt, from 7.30 cSt to 9.30 cSt, from 7.30 cSt to 9.20 cSt, from 7.30 cSt to 9.10 cSt, from 7.30 cSt to 9.00 cSt, from 7.30 cSt to 8.75 cSt, from 7.30 cSt to 8.50 cSt, from 7.30 cSt to 8.30 cSt, from 7.30 cSt to 8.10 cSt, from 7.30 cSt to 7.94 cSt, from 7.30 cSt to 7.84 cSt, from 7.30 cSt to 7.74 cSt, from 7.40 cSt to 9.50 cSt, from 7.40 cSt to 9.44 cSt, from 7.40 cSt to 9.42 cSt, from 7.40 cSt to 9.40 cSt, from 7.40 cSt to 9.38 cSt, from 7.40 cSt to 9.30 cSt, from 7.40 cSt to 9.20 cSt, from 7.40 cSt to 9.10 cSt, from 7.40 cSt to 9.00 cSt, from 7.40 cSt to 8.75 cSt, from 7.40 cSt to 8.50 cSt, from 7.40 cSt to 8.30 cSt, from 7.40 cSt to 8.10 cSt, from 7.40 cSt to 7.94 cSt, from 7.40 cSt to 7.84 cSt, from 7.40 cSt to 7.74 cSt, from 7.50 cSt to 9.50 cSt, from 7.50 cSt to 9.44 cSt, from 7.50 cSt to 9.42 cSt, from 7.50 cSt to 9.40 cSt, from 7.50 cSt to 9.38 cSt, from 7.50 cSt to 9.30 cSt, from 7.50 cSt to 9.20 cSt, from 7.50 cSt to 9.10 cSt, from 7.50 cSt to 9.00 cSt, from 7.50 cSt to 8.75 cSt, from 7.50 cSt to 8.50 cSt, from 7.50 cSt to 8.30 cSt, from 7.50 cSt to 8.10 cSt, from 7.50 cSt to 7.94 cSt, from 7.50 cSt to 7.84 cSt, or from 7.50 cSt to 7.74 cSt (in particular, from 6.80 cSt to 9.00 cSt, from 6.90 cSt to 8.50 cSt, or from 7.00 cSt to 8.30 cSt).

Even further additionally or alternatively, lubricant compositions according to the present disclosure, particularly those formulated to meet 0W20 lubricant specifications, may exhibit a kinematic viscosity at approximately 40° C. (KV40) of at most 36.0 cSt, e.g., at most 35.5 cSt, at most 35.0 cSt, at most 34.5 cSt, at most 34.3 cSt, at most 34.1 cSt, at most 33.9 cSt, or at most 33.7 cSt (in particular, at most 35.0 cSt, at most 34.5, or at most 33.9 cSt). While there is not necessarily a lower limit for the specification, the lubricant compositions may optionally also exhibit a KV40 of at least 32.0 cSt or at least 33.0 cSt.

Yet further additionally or alternatively, lubricant compositions according to the present disclosure, particularly those formulated to meet 0W20 lubricant specifications, may exhibit a kinematic viscosity at approximately 20° C. (KV20) of at most 81.0 cSt, e.g., at most 80.5 cSt, at most 80.0 cSt, at most 79.5 cSt, at most 79.0 cSt, at most 78.7 cSt, or at most 78.5 cSt (in particular, at most 79.5 cSt or at most 79.0 cSt). While there is not necessarily a lower limit for the specification, the lubricant compositions may optionally also exhibit a KV20 of at least 14.0 cSt or at least 15.0 cSt.

Yet still further additionally or alternatively, lubricant compositions according to the present disclosure, particularly those formulated to meet 0W20 lubricant specifications, may exhibit a viscosity index (VI) of at least 175, e.g., at least 180, at least 185, at least 190, at least 195, at least 200, or at least 205. While there is not necessarily an upper limit for the specification, the lubricant compositions may optionally also exhibit a VI of up to 300, up to 275, or up to 250.

Even still further additionally or alternatively, lubricant compositions according to the present disclosure, particularly those formulated to meet 0W20 lubricant specifications, may exhibit a soot dispersancy, as measured in the presence of an additional ~6 wt % carbon black in the lubricant composition, so as to achieve an apparent yield stress (APY non-linear rheological model) value of at most 0.38 Pa, e.g., at most 0.35 Pa, at most 0.32 Pa, at most 0.29 Pa, at most 0.26 Pa, at most 0.23 Pa, at most 0.22, at most 0.21 Pa, at most 0.20 Pa, at most 0.19 Pa, at most 0.18 Pa, at most 0.17 Pa, at most 0.16 Pa, or at most 0.15 Pa (in particular, at most 0.35 or at most 0.32). There is not necessarily a lower limit for soot dispersancy in APY terms, as a minimum measured APY value of 0.00 Pa reflects a very highly soot-dispersant composition. Although not required, soot dispersancy can additionally or alternatively be encapsulated by a soot rating using a linear model in the presence of an additional ~6 wt % carbon black in the lubricant composition, so as to achieve a soot rating (unitless) of at least 22, e.g., at least 25, at least 30, at least 35, at least 40, at least 45, at least 50, at least 55, at least 60, at least 65, at least 70, or at least 75. While there is not necessarily an upper limit for soot dispersancy in linear soot rating terms, the linear model soot rating may optionally be up to 110, up to 105, or up to 100.

Dispersancy, specifically soot dispersancy, can be tested by rheologically evaluating the effect(s) of carbon black on samples containing the comb copolymer viscosity modifiers described herein. For example, certain soot dispersancy experiments herein were reflective of measurements made using a RheoStress™ 600 rheometer (e.g., commercially available from Thermo Fisher Scientific), which can utilize a silicone oil bath to maintain a sample temperature at ~100° C. (±0.1° C.). Samples may be prepared by mixing a particular sample with an amount of carbon black. For samples in which the comb copolymer viscosity modifiers according to the present disclosure are simply diluted, e.g., with a lubricating oil basestock, the amount of carbon black added can be ~3 wt % (i.e., about 3 parts by weight of carbon black component to about 97 parts by weight of diluted comb copolymer); for samples in which the comb copolymer viscosity modifiers according to the present disclosure are combined with one or more other lubricant additives aside from or in addition to a simple (lubricating oil basestock) diluent, the amount of carbon black added can be ~6 wt % (i.e., about 6 parts by weight of carbon black component to about 94 parts by weight of the component containing the comb copolymer). A rheological experimental cycle may include or constitute symmetrically ramping up and down in shear rate from 0.1 s$^{-1}$ to 1000 s$^{-1}$ to 0.1 s$^{-1}$, a first time to erase any sample history and a second time to yield shear data (shear data is typically taken on the second ramp-up portion of the cycle), on which measurements the rheological analysis can be based. A shear stress, $\tau$, may be measured in response to a change in applied shear rate, $\dot{\gamma}$, and either or both of two semi-empirical models may be employed to qualitatively or quantitatively assess the dispersancy of the sample. A first model, termed the "Linear Model" herein, can be used to provide a 'Soot Handling' index and an intercept viscosity $\eta$ from the following relationship, on a log-log plot.

$$\tau = \eta \dot{\gamma}^{(Soot\ Handling/100)}$$

A least squares linear fitting procedure (e.g., when rheological was exported to a database, such as Microsoft Excel 2016) can be performed based on only a portion of the experimental shear rate range of 1 s$^{-1}$≤$\dot{\gamma}$≤10 s$^{-1}$ to enable statistically relevant fits. In the Linear Model, the Soot Handling index value is believed to increase (directionally toward ~100) with increasing capability to disperse the appropriate level of carbon black loading.

To assess the dispersancy over a wider range of shear rates, a second, non-linear model, termed the "Yield Stress Model" herein, can be used to allow for observed curvature in some datasets. This model also can provide a 'Soot Handling' index, but additionally involves a crossover shear rate, $\dot{\gamma}_c$, and an apparent yield stress, $\tau_y$, according to the following relationship.

$$\tau = \tau_y + \left(\frac{\dot{\gamma}}{\dot{\gamma}_c}\right)^{(Soot\ Handling/100)}$$

This model enabled non-linear log-log fitting to the rheological data over the entire experimental shear rate range of 1 s$^{-1}$≤$\dot{\gamma}$≤1000 s$^{-1}$. Non-linear fitting of the rheological data may be conducted using a Generalized Reduced Gradient procedure (e.g., when rheological was exported to a database, such as Microsoft Excel 2016, in which gradients of the object function can be iteratively adjusted by changing the input variables until the gradients reach approximately zero, or the default threshold, and an optimal solution is obtained). In the Yield Stress model, the Applied Yield Stress value is believed to decrease (directionally toward ~0) with increasing capability to disperse the appropriate level of carbon black loading.

Yet even still further additionally or alternatively, lubricant compositions according to the present disclosure may advantageously exhibit at least two, at least three, at least four, at least five, at least six, or all seven (in particular, at least three, at least four, at least five, or at least six) of the following characteristics: an HTHS150 of at least 2.55 cPs; an HTHS100 of at most 5.60 cPs; a HTHS80 of at most 8.30 cPs; a KV100 from 6.80 cSt to 9.00 cSt; a KV40 of at most 35.0 cSt; a KV20 of at most 79.5 cSt; and a viscosity index of at least 175. And still further additionally or alternatively, when the comb copolymer viscosity modifier at least 23.0 wt % of a sum of repeat units based on the $C_{12}$-$C_{24}$ alkyl (alk)acrylate ester monomer and of repeat units based on the $C_6$-$C_{20}$ aryl, aralkyl, or alkaryl (alk)acrylate ester monomer, lubricant compositions according to the present disclosure may advantageously exhibit, in particular, at least four, at least five, at least six, or all seven of the following characteristics: an HTHS150 of at least 2.55 cPs; an HTHS100 of at most 5.58 cPs; an HTHS80 of at most 8.25 cPs; a KV100 from 6.90 cSt to 8.50 cSt; a KV40 of at most 34.5 cSt; a KV20 of at most 79.0 cSt; and a viscosity index (VI) of at least 180.

Lubricant compositions according to the present disclosure, particularly those formulated to meet 0W16 lubricant specifications, may exhibit an HTHS150 of at least 2.20 cPs, e.g., at least 2.24 cPs, at least 2.25 cPs, at least 2.26 cPs, at least 2.27 cPs, at least 2.28 cPs, at least 2.29 cPs, at least 2.30 cPs, at least 2.31 cPs, at least 2.32 cPs, at least 2.33 cPs, at least 2.34 cPs, or at least 2.35 cPs (in particular, at least 2.25 cPs). While there is not necessarily an upper limit for the specification, the lubricant compositions may optionally also exhibit an HTHS150 of at most 2.45 cPs, at most 2.50 cPs, or at most 2.60 cPs.

Additionally or alternatively, lubricant compositions according to the present disclosure, particularly those formulated to meet 0W16 lubricant specifications, may exhibit an HTHS100 of at most 5.24 cPs, e.g., at most 5.19 cPs, at most 5.16 cPs, at most 5.14 cPs, at most 5.12 cPs, at most 5.10 cPs, at most 5.08 cPs, at most 5.06 cPs, at most 5.04 cPs, at most 5.02 cPs, at most 4.96 cPs, or at most 4.94 cPs (in particular, at most 5.16 cPs or at most 5.06 cPs). While there is not necessarily a lower limit for the specification, the lubricant compositions may optionally also exhibit an HTHS100 of at least 4.50 cPs or at least 4.60 cPs.

Further additionally or alternatively, lubricant compositions according to the present disclosure, particularly those formulated to meet 0W16 lubricant specifications, may exhibit an HTHS80 of at most 7.84 cPs, e.g., at most 7.75 cPs, at most 7.70 cPs, at most 7.65 cPs, at most 7.64 cPs, at most 7.63 cPs, at most 7.60 cPs, at most 7.55 cPs, or at most 7.50 cPs (in particular, at most 7.65 cPs, at most 7.60 cPs, or at most 7.50 cPs). While there is not necessarily a lower limit for the specification, the lubricant compositions may optionally also exhibit an HTHS80 of at least 6.70 cPs or at least 6.85 cPs.

Still further additionally or alternatively, lubricant compositions according to the present disclosure, particularly those formulated to meet 0W16 lubricant specifications, may exhibit a KV100 from 6.10 cSt to 8.30 cSt, e.g., from 6.10 cSt to 8.20 cSt, from 6.10 cSt to 8.10 cSt, from 6.10 cSt to 8.00 cSt, from 6.10 cSt to 7.90 cSt, from 6.10 cSt to 7.80 cSt, from 6.10 cSt to 7.70 cSt, from 6.10 cSt to 7.60 cSt, from 6.10 cSt to 7.50 cSt, from 6.10 cSt to 7.40 cSt, from 6.10 cSt to 7.30 cSt, from 6.10 cSt to 7.20 cSt, from 6.10 cSt to 7.10 cSt, from 6.10 cSt to 7.00 cSt, from 6.10 cSt to 6.90 cSt, from 6.10 cSt to 6.80 cSt, from 6.20 cSt to 8.30 cSt, from 6.20 cSt to 8.20 cSt, from 6.20 cSt to 8.10 cSt, from 6.20 cSt to 8.00 cSt, from 6.20 cSt to 7.90 cSt, from 6.20 cSt to 7.80 cSt, from 6.20 cSt to 7.70 cSt, from 6.20 cSt to 7.60 cSt, from 6.20 cSt to 7.50 cSt, from 6.20 cSt to 7.40 cSt, from 6.20 cSt to 7.30 cSt, from 6.20 cSt to 7.20 cSt, from 6.20 cSt to 7.10 cSt, from 6.20 cSt to 7.00 cSt, from 6.20 cSt to 6.90 cSt, from 6.20 cSt to 6.80 cSt, from 6.30 cSt to 8.30 cSt, from 6.30 cSt to 8.20 cSt, from 6.30 cSt to 8.10 cSt, from 6.30 cSt to 8.00 cSt, from 6.30 cSt to 7.90 cSt, from 6.30 cSt to 7.80 cSt, from 6.30 cSt to 7.70 cSt, from 6.30 cSt to 7.60 cSt, from 6.30 cSt to 7.50 cSt, from 6.30 cSt to 7.40 cSt, from 6.30 cSt to 7.30 cSt, from 6.30 cSt to 7.20 cSt, from 6.30 cSt to 7.10 cSt, from 6.30 cSt to 7.00 cSt, from 6.30 cSt to 6.90 cSt, from 6.30 cSt to 6.80 cSt, from 6.40 cSt to 8.30 cSt, from 6.40 cSt to 8.20 cSt, from 6.40 cSt to 8.10 cSt, from 6.40 cSt to 8.00 cSt, from 6.40 cSt to 7.90 cSt, from 6.40 cSt to 7.80 cSt, from 6.40 cSt to 7.70 cSt, from 6.40 cSt to 7.60 cSt, from 6.40 cSt to 7.50 cSt, from 6.40 cSt to 7.40 cSt, from 6.40 cSt to 7.30 cSt, from 6.40 cSt to 7.20 cSt, from 6.40 cSt to 7.10 cSt, from 6.30 cSt to 7.00 cSt, from 6.40 cSt to 6.90 cSt, from 6.40 cSt to 6.80 cSt, from 6.50 cSt to 8.30 cSt, from 6.50 cSt to 8.20 cSt, from 6.50 cSt to 8.10 cSt, from 6.50 cSt to 8.00 cSt, from 6.50 cSt to 7.90 cSt, from 6.50 cSt to 7.80 cSt, from 6.50 cSt to 7.70 cSt, from 6.50 cSt to 7.60 cSt, from 6.50 cSt to 7.50 cSt, from 6.50 cSt to 7.40 cSt, from 6.50 cSt to 7.30 cSt, from 6.50 cSt to 7.20 cSt, from 6.50 cSt to 7.10 cSt, from 6.50 cSt to 7.00 cSt, from 6.50 cSt to 6.90 cSt, from 6.60 cSt to 8.30 cSt, from 6.60 cSt to 8.20 cSt, from 6.60 cSt to 8.10 cSt, from 6.60 cSt to 8.00 cSt, from 6.60 cSt to 7.90 cSt, from 6.60 cSt to 7.80 cSt, from 6.60 cSt to 7.70 cSt, from 6.60 cSt to 7.60 cSt, from 6.60 cSt to 7.50 cSt, from 6.60 cSt to 7.40 cSt, from 6.60 cSt to 7.30 cSt, from 6.60 cSt to 7.20 cSt, from 6.60 cSt to 7.10 cSt, from 6.60 cSt to 7.00 cSt, from 6.60 cSt to 6.80 cSt, from 6.70 cSt to 8.30 cSt, from 6.70 cSt to 8.20 cSt, from 6.70 cSt to 8.10 cSt, from 6.70 cSt to 8.00 cSt, from 6.70 cSt to 7.90 cSt, from 6.70 cSt to 7.80 cSt, from 6.70 cSt to 7.70 cSt, from 6.70 cSt to 7.60 cSt, from 6.70 cSt to 7.50 cSt, from 6.70 cSt to 7.40 cSt, from 6.70 cSt to 7.30 cSt, from 6.70 cSt to 7.20 cSt, from 6.70 cSt to 7.10 cSt, from 6.80 cSt to 8.30 cSt, from 6.80 cSt to 8.20 cSt, from 6.80 cSt to 8.10 cSt, from 6.80 cSt to 8.00 cSt, from 6.80 cSt to 7.90 cSt, from 6.80 cSt to 7.80 cSt, from 6.80 cSt to 7.70 cSt, from 6.80 cSt to 7.60 cSt, from 6.80 cSt to 7.50 cSt, from 6.80 cSt to 7.40 cSt, from 6.80 cSt to 7.30 cSt, or from 6.80 cSt to 7.20 cSt (in particular, from 6.10 cSt to 8.20 cSt, from 6.30 cSt to 8.10 cSt, or from 6.50 cSt to 8.00 cSt).

Even further additionally or alternatively, lubricant compositions according to the present disclosure, particularly those formulated to meet 0W16 lubricant specifications, may exhibit a KV40 of at most 33.5 cSt, e.g., at most 33.0 cSt, at most 32.5 cSt, at most 32.0 cSt, at most 31.7 cSt, at most 31.4 cSt, at most 31.1 cSt, or at most 30.8 cSt (in particular, at most 32.5 cSt or at most 31.4 cSt). While there is not necessarily a lower limit for the specification, the lubricant compositions may optionally also exhibit a KV40 of at least 27.0 cSt or at least 28.0 cSt.

Yet further additionally or alternatively, lubricant compositions according to the present disclosure, particularly those formulated to meet 0W16 lubricant specifications, may exhibit a KV20 of at most 76.5 cSt, e.g., at most 76.0 cSt, at most 75.5 cSt, at most 75.0 cSt, at most 74.5 cSt, at most 74.0 cSt, at most 73.5 cSt, at most 73.0 cSt, at most 72.5 cSt, or at most 72.0 cSt (in particular, at most 75.0 cSt or at most 73.5 cSt). While there is not necessarily a lower limit for the specification, the lubricant compositions may optionally also exhibit a KV20 of at least 35.0 cSt or at least 40.0 cSt.

Yet still further additionally or alternatively, lubricant compositions according to the present disclosure, particularly those formulated to meet 0W16 lubricant specifications, may exhibit a viscosity index (VI) of at least 160, e.g., at least 165, at least 170, at least 175, at least 180, at least 185, at least 190, at least 195, or at least 200 (in particular, at least 160 or at least 165). While there is not necessarily an upper limit for the specification, the lubricant compositions may optionally also exhibit a VI of up to 280, up to 250, or up to 210.

Even still further additionally or alternatively, lubricant compositions according to the present disclosure, particularly those formulated to meet 0W16 lubricant specifications, may exhibit a soot dispersancy, as measured in the presence of an additional ~6 wt % carbon black in the lubricant composition, so as to achieve a non-linear APY value of at most 0.60 Pa, e.g., at most 0.55 Pa, at most 0.52 Pa, at most 0.49 Pa, at most 0.46 Pa, at most 0.43 Pa, at most 0.40 Pa, at most 0.37 Pa, at most 0.34 Pa, at most 0.31 Pa, at most 0.28 Pa, at most 0.25 Pa, at most 0.23 Pa, at most 0,22, at most 0.21 Pa, at most 0.20 Pa, at most 0.19 Pa, at most 0.18 Pa, at most 0.17 Pa, at most 0.16 Pa, or at most 0.15 Pa (in particular, at most 0.52 Pa, at most 0.40 Pa, or at most 0.34 Pa). There is not necessarily a lower limit for soot dispersancy in APY terms, as a minimum measured APY value of 0.00 Pa reflects a very highly soot-dispersant composition. Although not required, soot dispersancy can additionally or alternatively be encapsulated by a soot rating using a linear model in the presence of an additional ~6 wt % carbon black in the lubricant composition, so as to achieve a soot rating (unitless) of at least 13, e.g., at least 20, at least 25, at least 30, at least 35, at least 40, at least 45, at least 50, at least 55, at least 60, at least 65, at least 70, or at least 75 (in particular, at least 13, at least 20, or at least 25). While there is not necessarily an upper limit for soot dispersancy in linear soot rating terms, the linear model soot rating may optionally be up to 110, up to 105, or up to 100.

Lubricant compositions according to the present disclosure, particularly those formulated to meet 0W12 lubricant specifications, may exhibit an HTHS150 of at least 1.90 cPs, e.g., at least 1.94 cPs, at least 1.95 cPs, at least 1.96 cPs, at least 1.97 cPs, at least 1.98 cPs, at least 1.99 cPs, at least 2.00 cPs, at least 2.01 cPs, at least 2.02 cPs, at least 2.03 cPs, at least 2.04 cPs, or at least 2.05 cPs (in particular, at least 1.95 cPs). While there is not necessarily an upper limit for the specification, the lubricant compositions may optionally also exhibit an HTHS150 of at most 2.25 cPs, at most 2.30 cPs, or at most 2.40 cPs.

Additionally or alternatively, lubricant compositions according to the present disclosure, particularly those formulated to meet 0W12 lubricant specifications, may exhibit an HTHS100 of at most 4.74 cPs, e.g., at most 4.69 cPs, at most 4.66 cPs, at most 4.64 cPs, at most 4.62 cPs, at most 4.60 cPs, at most 4.58 cPs, at most 4.56 cPs, at most 4.54 cPs, at most 4.52 cPs, at most 4.46 cPs, or at most 4.44 cPs (in particular, at most 4.56 cPs or at most 4.52 cPs), While there is not necessarily a lower limit for the specification, the lubricant compositions may optionally also exhibit an HTHS100 of at least 3.90 cPs or at least 3.95 cPs.

Further additionally or alternatively, lubricant compositions according to the present disclosure, particularly those formulated to meet 0W12 lubricant specifications, may exhibit an HTHS80 of at most 7.04 cPs, e.g., at most 6.95 cPs, at most 6.90 cPs, at most 6.85 cPs, at most 6.84 cPs, at most 6.83 cPs, at most 6.80 cPs, at most 6.75 cPs, or at most 6.70 cPs (in particular, at most 6.83 cPs, at most 6.80 cPs, or at most 6.70 cPs). While there is not necessarily a lower limit for the specification, the lubricant compositions may optionally also exhibit an HTHS80 of at least 5.50 cPs or at least 5.60 cPs.

Still further additionally or alternatively, lubricant compositions according to the present disclosure, particularly those formulated to meet 0W12 lubricant specifications, may exhibit a kinematic viscosity at approximately 100° C. (KV100) from 5.00 cSt to 7.10 cSt, e.g., from 5.00 cSt to 7.05 cSt, from 5.00 cSt to 7.00 cSt, from 5.00 cSt to 6.95 cSt, from 5.00 cSt to 6.90 cSt, from 5.00 cSt to 6.85 cSt, from 5.00 cSt to 6.80 cSt, from 5.00 cSt to 6.75 cSt, from 5.00 cSt to 6.70 cSt, from 5.00 cSt to 6.65 cSt, from 5.00 cSt to 6.60 cSt, from 5.00 cSt to 6.50 cSt, from 5.00 cSt to 6.40 cSt, from 5.00 cSt to 6.30 cSt, from 5.00 cSt to 6.20 cSt, from 5.00 cSt to 6.10 cSt, from 5.00 cSt to 6.00 cSt, from 5.20 cSt to 7.10 cSt, from 5.20 cSt to 7.05 cSt, from 5.20 cSt to 7.00 cSt, from 5.20 cSt to 6.95 cSt, from 5.20 cSt to 6.90 cSt, from 5.20 cSt to 6.85 cSt, from 5.20 cSt to 6.80 cSt, from 5.20 cSt to 6.75 cSt, from 5.20 cSt to 6.70 cSt, from 5.20 cSt to 6.65 cSt, from 5.20 cSt to 6.60 cSt, from 5.20 cSt to 6.50 cSt, from 5.20 cSt to 6.40 cSt, from 5.20 cSt to 6.30 cSt, from 5.20 cSt to 6.20 cSt, from 5.20 cSt to 6.10 cSt, from 5.20 cSt to 6.00 cSt, from 5.40 cSt to 7.10 cSt, from 5.40 cSt to 7.05 cSt, from 5.40 cSt to 7.00 cSt, from 5.40 cSt to 6.95 cSt, from 5.40 cSt to 6.90 cSt, from 5.40 cSt to 6.85 cSt, from 5.40 cSt to 6.80 cSt, from 5.40 cSt to 6.75 cSt, from 5.40 cSt to 6.70 cSt, from 5.40 cSt to 6.65 cSt, from 5.40 cSt to 6.60 cSt, from 5.40 cSt to 6.50 cSt, from 5.40 cSt to 6.40 cSt, from 5.40 cSt to 6.30 cSt, from 5.40 cSt to 6.20 cSt, from 5.40 cSt to 6.10 cSt, from 5.40 cSt to 6.00 cSt, from 5.60 cSt to 7.10 cSt, from 5.60 cSt to 7.05 cSt, from 5.60 cSt to 7.00 cSt, from 5.60 cSt to 6.95 cSt, from 5.60 cSt to 6.90 cSt, from 5.60 cSt to 6.85 cSt, from 5.60 cSt to 6.80 cSt, from 5.60 cSt to 6.75 cSt, from 5.60 cSt to 6.70 cSt, from 5.60 cSt to 6.65 cSt, from 5.60 cSt to 6.60 cSt, from 5.60 cSt to 6.50 cSt, from 5.60 cSt to 6.40 cSt, from 5.60 cSt to 6.30 cSt, from 5.60 cSt to 6.20 cSt, from 5.60 cSt to 6.10 cSt, from 5.60 cSt to 6.00 cSt, from 5.80 cSt to 7.10 cSt, from 5.80 cSt to 7.05 cSt, from 5.80 cSt to 7.00 cSt, from 5.80 cSt to 6.95 cSt, from 5.80 cSt to 6.90 cSt, from 5.80 cSt to 6.85 cSt, from 5.80 cSt to 6.80 cSt, from 5.80 cSt to 6.75 cSt, from 5.80 cSt to 6.70 cSt, from 5.80 cSt to 6.65 cSt, from 5.80 cSt to 6.60 cSt, from 5.80 cSt to 6.50 cSt, from 5.80 cSt to 6.40 cSt, from 5.80 cSt to 6.30 cSt, from 5.80 cSt to 6.20 cSt, from 6.00 cSt to 7.10 cSt, from 6.00 cSt to 7.05 cSt, from 6.00 cSt to 7.00 cSt, from 6.00 cSt to 6.95 cSt, from 6.00 cSt to 6.90 cSt, from 6.00 cSt to 6.85 cSt, from 6.00 cSt to 6.80 cSt, from 6.00 cSt to 6.75 cSt, from 6.00 cSt to 6.70 cSt, from 6.00 cSt to 6.65 cSt, from 6.00 cSt to 6.60 cSt, from 6.00 cSt to 6.50 cSt, from 6.00 cSt to 6.40 cSt, from 6.20 cSt to 7.10 cSt, from 6.20 cSt to 7.05 cSt, from 6.20 cSt to 7.00 cSt, from 6.20 cSt to 6.95 cSt, from 6.20 cSt to 6.90 cSt, from 6.20 cSt to 6.85 cSt, from 6.20 cSt to 6.80 cSt, from 6.20 cSt to 6.75 cSt, from 6.20 cSt to 6.70 cSt, from 6.20 cSt to 6.65 cSt, or from 6.20 cSt to 6.60 cSt (in particular, from 5.00 cSt to 7.10 cSt, from 6.00 cSt to 6.85 cSt, or from 6.20 cSt to 6.75 cSt).

Even further additionally or alternatively, lubricant compositions according to the present disclosure, particularly those formulated to meet 0W12 lubricant specifications, may exhibit a kinematic viscosity at approximately 40° C. (KV40) of at most 30.0 cSt, e.g., at most 29.5 cSt, at most 29.0 cSt, at most 28.5 cSt, at most 28.3 cSt, at most 28.1 cSt, at most 27.9 cSt, at most 27.7 cSt, or at most 27.5 (in particular, at most 29.0 cSt, at most 28.5, or at most 27.9 cSt). While there is not necessarily a lower limit for the specification, the lubricant compositions may optionally also exhibit a KV40 of at least 22.5 cSt or at least 23.0 cSt.

Yet further additionally or alternatively, lubricant compositions according to the present disclosure, particularly those formulated to meet 0W12 lubricant specifications, may exhibit a kinematic viscosity at approximately 20° C. (KV20) of at most 68.0 cSt, e.g., at most 66.0 cSt, at most 65.5 cSt, at most 65.0 cSt, at most 64.5 cSt, at most 64.0 cSt, at most 63.7 cSt, or at most 63.5 cSt (in particular, at most 64.5 cSt or at most 64.0 cSt), While there is not necessarily a lower limit for the specification, the lubricant compositions may optionally also exhibit a KV20 of at least 30.0 cSt or at least 40.0 cSt.

Yet still further additionally or alternatively, lubricant compositions according to the present disclosure, particularly those formulated to meet 0W12 lubricant specifications, may exhibit a viscosity index (VI) of at least 150, e.g., at least 155, at least 160, at least 165, at least 170, at least 175, or at least 180 (in particular, at least 160 or at least 165). While there is not necessarily an upper limit for the specification, the lubricant compositions may optionally also exhibit a VI of up to 280, up to 240, or up to 210.

Even still further additionally or alternatively, lubricant compositions according to the present disclosure, particularly those formulated to meet 0W12 lubricant specifications, may exhibit a soot dispersancy, as measured in the presence of an additional ~6 wt % carbon black in the lubricant composition, so as to achieve a non-linear APY value of at most 0.60 Pa, e.g., at most 0.55 Pa, at most 0.52 Pa, at most 0.49 Pa, at most 0.46 Pa, at most 0.43 Pa, at most 0.40 Pa, at most 0.37 Pa, at most 0.34 Pa, at most 0.31 Pa, at most 0.28 Pa, at most 0.25 Pa, at most 0.23 Pa, at most 0.22, at most 0.21 Pa, at most 0.20 Pa, at most 0.19 Pa, at most 0.18 Pa, at most 0.17 Pa, at most 0.16 Pa, or at most 0.15 Pa (in particular, at most 0.52 Pa, at most 0.40 Pa, or at most 0.34 Pa). There is not necessarily a lower limit for soot dispersancy in APY terms, as a minimum measured APY value of 0.00 Pa reflects a very highly soot-dispersant composition. Although not required, soot dispersancy can additionally or alternatively be encapsulated by a soot rating using a linear model in the presence of an additional ~6 wt % carbon black in the lubricant composition, so as to achieve a soot rating (unitless) of at least 13, e.g., at least 20, at least 25, at least 30, at least 35, at least 40, at least 45, at least 50, at least 55, at least 60, at least 65, at least 70, or at least 75 (in particular, at least 13, at least 20, or at least 25), While there is not necessarily an upper limit for soot dispersancy in linear soot rating terms, the linear model soot rating may optionally be up to 110, up to 105, or up to 100.

Lubricant compositions according to the present disclosure, particularly those formulated to meet 0W8 lubricant specifications, may exhibit an HTHS150 of at least 1.60 cPs, e.g., at least 1.64 cPs, at least 1.65 cPs, at least 1.66 cPs, at least 1.67 cPs, at least 1.68 cPs, at least 1.69 cPs, at least 1.70 cPs, at least 1.71 cPs, at least 1.72 cPs, at least 1.73 cPs, at least 1.74 cPs, or at least 1.75 cPs (in particular, at least 1.65 cPs). While there is not necessarily an upper limit for the specification, the lubricant compositions may optionally also exhibit an HTHS150 of at most 1.95 cPs, at most 2.00 cPs, or at most 2.10 cPs.

Additionally or alternatively, lubricant compositions according to the present disclosure, particularly those formulated to meet 0W8 lubricant specifications, may exhibit an HTHS100 of at most 4.34 cPs, e.g., at most 4.29 cPs, at most 4.26 cPs, at most 4.24 cPs, at most 4.22 cPs, at most 4.20 cPs, at most 4.18 cPs, at most 4.16 cPs, at most 4.14 cPs, at most 4.12 cPs, at most 4.06 cPs, or at most 4.04 cPs (in particular, at most 4.26 cPs or at most 4.12 cPs). While there is not necessarily a lower limit for the specification, the lubricant compositions may optionally also exhibit an HTHS100 of at least 3.45 cPs or at least 3.60 cPs.

Further additionally or alternatively, lubricant compositions according to the present disclosure, particularly those formulated to meet 0W12 lubricant specifications, may exhibit an HTHS80 of at most 6.24 cPs, e.g., at most 6.15 cPs, at most 6.10 cPs, at most 6.05 cPs, at most 6.04 cPs, at most 6.03 cPs, at most 6.00 cPs, at most 5.95 cPs, or at most 5.90 cPs (in particular, at most 6.10 cPs, at most 6.00 cPs, or at most 5.90 cPs). While there is not necessarily a lower limit for the specification, the lubricant compositions may optionally also exhibit an HTHS80 of at least 4.90 cPs or at least 5.00 cPs.

Still further additionally or alternatively, lubricant compositions according to the present disclosure, particularly those formulated to meet 0W8 lubricant specifications, may exhibit a kinematic viscosity at approximately 100° C. (KV100) from 4.00 cSt to 6.10 cSt, e.g., from 4.00 cSt to 6.05 cSt, from 4.00 cSt to 6.00 cSt, from 4.00 cSt to 5.95 cSt, from 4.00 cSt to 5.90 cSt, from 4.00 cSt to 5.85 cSt, from 4.00 cSt to 5.80 cSt, from 4.00 cSt to 5.75 cSt, from 4.00 cSt to 5.70 cSt, from 4.00 cSt to 5.65 cSt, from 4.00 cSt to 5.60 cSt, from 4.00 cSt to 5.50 cSt, from 4.00 cSt to 5.40 cSt, from 4.00 cSt to 5.30 cSt, from 4.00 cSt to 5.20 cSt, from 4.00 cSt to 5.10 cSt, from 4.00 cSt to 5.00 cSt, from 4.20 cSt to 6.10 cSt, from 4.20 cSt to 6.05 cSt, from 4.20 cSt to 6.00 cSt, from 4.20 cSt to 5.95 cSt, from 4.20 cSt to 5.90 cSt, from 4.20 cSt to 5.85 cSt, from 4.20 cSt to 5.80 cSt, from 4.20 cSt to 5.75 cSt, from 4.20 cSt to 5.70 cSt, from 4.20 cSt to 5.65 cSt, from 4.20 cSt to 5.60 cSt, from 4.20 cSt to 5.50 cSt, from 4.20 cSt to 5.40 cSt, from 4.20 cSt to 5.30 cSt, from 4.20 cSt to 5.20 cSt, from 4.20 cSt to 5.10 cSt, from 4.20 cSt to 5.00 cSt, from 4.40 cSt to 6.10 cSt, from 4.40 cSt to 6.05 cSt, from 4.40 cSt to 6.00 cSt, from 4.40 cSt to 5.95 cSt, from 4.40 cSt to 5.90 cSt, from 4.40 cSt to 5.85 cSt, from 4.40 cSt to 5.80 cSt, from 4.40 cSt to 5.75 cSt, from 4.40 cSt to 5.70 cSt, from 4.40 cSt to 5.65 cSt, from 4.40 cSt to 5.60 cSt, from 4.40 cSt to 5.50 cSt, from 4.40 cSt to 5.40 cSt, from 4.40 cSt to 5.30 cSt, from 4.40 cSt to 5.20 cSt, from 4.40 cSt to 5.10 cSt, from 4.40 cSt to 5.00 cSt, from 4.60 cSt to 6.10 cSt, from 4.60 cSt to 6.05 cSt, from 4.60 cSt to 6.00 cSt, from 4.60 cSt to 5.95 cSt, from 4.60 cSt to 5.90 cSt, from 4.60 cSt to 5.85 cSt, from 4.60 cSt to 5.80 cSt, from 4.60 cSt to 5.75 cSt, from 4.60 cSt to 5.70 cSt, from 4.60 cSt to 5.65 cSt, from 4.60 cSt to 5.60 cSt, from 4.60 cSt to 5.50 cSt, from 4.60 cSt to 5.40 cSt, from 4.60 cSt to 5.30 cSt, from 4.60 cSt to 5.20 cSt, from 4.60 cSt to 5.10 cSt, from 4.60 cSt to 5.00 cSt, from 4.80 cSt to 6.10 cSt, from 4.80 cSt to 6.05 cSt, from 4.80 cSt to 6.00 cSt, from 4.80 cSt to 5.95 cSt, from 4.80 cSt to 5.90 cSt, from 4.80 cSt to 5.85 cSt, from 4.80 cSt to 5.80 cSt, from 4.80 cSt to 5.75 cSt, from 4.80 cSt to 5.70 cSt, from 4.80 cSt to 5.65 cSt, from 4.80 cSt to 5.60 cSt, from 4.80 cSt to 5.50 cSt, from 4.80 cSt to 5.40 cSt, from 4.80 cSt to 5.30 cSt, from 4.80 cSt to 5.20 cSt, from 5.00 cSt to 6.10 cSt, from 5.00 cSt to 6.05 cSt, from 5.00 cSt to 6.00 cSt, from 5.00 cSt to 5.95 cSt, from 5.00 cSt to 5.90 cSt, from 5.00 cSt to 5.85 cSt, from 5.00 cSt to 5.80 cSt, from 5.00 cSt to 5.75 cSt, from 5.00 cSt to 5.70 cSt, from 5.00 cSt to 5.65 cSt, from 5.00 cSt to 5.60 cSt, from 5.00 cSt to 5.50 cSt, from 5.00 cSt to 5.40 cSt, from 5.20 cSt to 6.10 cSt, from 5.20 cSt to 6.05 cSt, from 5.20 cSt to 6.00 cSt, from 5.20 cSt to 5.95 cSt, from 5.20 cSt to 5.90 cSt, from 5.20 cSt to 5.85 cSt, from 5.20 cSt to 5.80 cSt, from 5.20 cSt to 5.75 cSt, from 5.20 cSt to 5.70 cSt, from 5.20 cSt to 5.65 cSt, or from 5.20 cSt to 5.60 cSt (in particular, from 4.00 cSt to 6.10 cSt, from 5.00 cSt to 5.85 cSt, or from 5.20 cSt to 5.75 cSt).

Even further additionally or alternatively, lubricant compositions according to the present disclosure, particularly those formulated to meet 0W8 lubricant specifications, may exhibit a kinematic viscosity at approximately 40° C. (KV40) of at most 26.5 cSt, e.g., at most 26.0 cSt, at most 25.5 cSt, at most 25.3 cSt, at most 25.1 cSt, at most 24.9 cSt, at most 24.7 cSt, or at most 24.5 cSt (in particular, at most 26.0 cSt, at most 25.5 cSt, or at most 24.9 cSt). While there is not necessarily a lower limit for the specification, the lubricant compositions may optionally also exhibit a KV40 of at least 20.0 cSt or at least 20.5 cSt.

Yet further additionally or alternatively, lubricant compositions according to the present disclosure, particularly those formulated to meet 0W8 lubricant specifications, may exhibit a kinematic viscosity at approximately 20° C. (KV20) of at most 60.0 cSt, e.g., at most 59.0 cSt, at most 58.5 cSt, at most 58.0 cSt, at most 57.5 cSt, at most 57.0 cSt, at most 56.5 cSt, at most 56.0 cSt, at most 55.5 cSt, at most 55.0 cSt, or at most 54.5 cSt (in particular, at most 58.5 cSt or at most 56.0 cSt). While there is not necessarily a lower limit for the specification, the lubricant compositions may optionally also exhibit a KV20 of at least 28.0 cSt or at least 32.0 cSt.

Yet still further additionally or alternatively, lubricant compositions according to the present disclosure, particularly those formulated to meet 0W8 lubricant specifications, may exhibit a viscosity index (VI) of at least 140, e.g., at least 145, at least 150, at least 155, at least 160, at least 165, at least 170, at least 175, or at least 180 (in particular, at least 140 or at least 150). While there is not necessarily an upper limit for the specification, the lubricant compositions may optionally also exhibit a VI of up to 270, up to 230, or up to 200.

Even still further additionally or alternatively, lubricant compositions according to the present disclosure, particularly those formulated to meet 0W8 lubricant specifications, may exhibit a soot dispersancy, as measured in the presence of an additional ~6 wt % carbon black in the lubricant composition, so as to achieve a non-linear APY value of at most 0.60 Pa, e.g., at most 0.55 Pa, at most 0.52 Pa, at most 0.49 Pa, at most 0.46 Pa, at most 0.43 Pa, at most 0.40 Pa, at most 0.37 Pa, at most 0.34 Pa, at most 0.31 Pa, at most 0.28 Pa, at most 0.25 Pa, at most 0.23 Pa, at most 0.22, at most 0.21 Pa, at most 0.20 Pa, at most 0.19 Pa, at most 0.18 Pa, at most 0.17 Pa, at most 0.16 Pa, or at most 0.15 Pa (in particular, at most 0.52 Pa, at most 0.40 Pa, or at most 0.34 Pa). There is not necessarily a lower limit for soot dispersancy in APY terms, as a minimum measured APY value of 0.00 Pa reflects a very highly soot-dispersant composition. Although not required, soot dispersancy can additionally or alternatively be encapsulated by a soot rating using a linear model in the presence of an additional ~6 wt % carbon black in the lubricant composition, so as to achieve a soot rating (unitless) of at least 13, e.g., at least 20, at least 25, at least 30, at least 35, at least 40, at least 45, at least 50, at least 55, at least 60, at least 65, at least 70, or at least 75 (in particular, at least 13, at least 20, or at least 25), While there is not necessarily an upper limit for soot dispersancy in linear soot rating terms, the linear model soot rating may optionally be up to 110, up to 105, or up to 100.

Lubricant compositions according to the present disclosure, particularly those formulated to meet 5W30 lubricant specifications, may exhibit an HTHS150 of at least 2.80 cPs, e.g., at least 2.84 cPs, at least 2.85 cPs, at least 2.86 cPs, at least 2.87 cPs, at least 2.88 cPs, at least 2.89 cPs, at least 2.90 cPs, at least 2.91 cPs, at least 2.92 cPs, at least 2.93 cPs, at least 2.94 cPs, or at least 2.95 cPs (in particular, at least 2.85 cPs). While there is not necessarily an upper limit for the specification, the lubricant compositions may optionally also exhibit an HTHS150 of at most 3.55 cPs, at most 3.75 cPs, or at most 3.90 cPs.

Additionally or alternatively, lubricant compositions according to the present disclosure, particularly those formulated to meet 5W30 lubricant specifications, may exhibit an HTHS100 of at most 7.74 cPs, e.g., at most 7.69 cPs, at most 7.66 cPs, at most 7.64 cPs, at most 7.62 cPs, at most 7.60 cPs, at most 7.58 cPs, at most 7.56 cPs, at most 7.54 cPs, at most 7.52 cPs, at most 7.46 cPs, or at most 7.44 cPs (in particular, at most 7.64 cPs or at most 7.52 cPs). While there is not necessarily a lower limit for the specification, the lubricant compositions may optionally also exhibit an HTHS100 of at least 6.90 cPs or at least 7.05 cPs.

Further additionally or alternatively, lubricant compositions according to the present disclosure, particularly those formulated to meet 5W30 lubricant specifications, may exhibit an HTHS80 of at most 12.5 cPs, e.g., at most 12.3 cPs, at most 12.1 cPs, at most 11.9 cPs, at most 11.7 cPs, at most 11.6 cPs, at most 11.5 cPs, at most 11.4 cPs, at most 11.3 cPs, at most 11.2 cPs, at most 11.1 cPs, or at most 11.0 cPs (in particular, at most 12.1 cPs or at most 11.6 cPs). While there is not necessarily a lower limit for the specification, the lubricant compositions may optionally also exhibit an HTHS80 of at least 8.50 cPs or at least 9.00 cPs.

Still further additionally or alternatively, lubricant compositions according to the present disclosure, particularly those formulated to meet 5W30 lubricant specifications, may exhibit a KV100 from 9.30 cSt to 13.0 cSt, e.g., from 9.30 cSt to 12.5 cSt, from 9.30 cSt to 12.2 cSt, from 9.30 cSt to 11.9 cSt, from 9.30 cSt to 11.6 cSt, from 9.30 cSt to 11.3 cSt, from 9.30 cSt to 11.0 cSt, from 9.30 cSt to 10.7 cSt, from 9.30 cSt to 10.5 cSt, from 9.30 cSt to 10.3 cSt, from 9.30 cSt to 10.1 cSt, from 9.30 cSt to 9.90 cSt, from 9.45 cSt to 13.0 cSt, from 9.45 cSt to 12.5 cSt, from 9.45 cSt to 12.2 cSt, from 9.45 cSt to 11.9 cSt, from 9.45 cSt to 11.6 cSt, from 9.45 cSt to 11.3 cSt, from 9.45 cSt to 11.0 cSt, from 9.45 cSt to 10.7 cSt, from 9.45 cSt to 10.5 cSt, from 9.45 cSt to 10.3 cSt, from 9.45 cSt to 10.1 cSt, from 9.45 cSt to 9.90 cSt, from 9.60 cSt to 13.0 cSt, from 9.60 cSt to 12.5 cSt, from 9.60 cSt to 12.2 cSt, from 9.60 cSt to 11.9 cSt, from 9.60 cSt to 11.6 cSt, from 9.60 cSt to 11.3 cSt, from 9.60 cSt to 11.0 cSt, from 9.60 cSt to 10.7 cSt, from 9.60 cSt to 10.5 cSt, from 9.60 cSt to 10.3 cSt, from 9.60 cSt to 10.1 cSt, from 9.75 cSt to 13.0 cSt, from 9.75 cSt to 12.5 cSt, from 9.75 cSt to 12.2 cSt, from 9.75 cSt to 11.9 cSt, from 9.75 cSt to 11.6 cSt, from 9.75 cSt to 11.3 cSt, from 9.75 cSt to 11.0 cSt, from 9.75 cSt to 10.7 cSt, from 9.75 cSt to 10.5 cSt, from 9.75 cSt to 10.3 cSt, from 9.75 cSt to 10.1 cSt, from 9.90 cSt to 13.0 cSt, from 9.90 cSt to 12.5 cSt, from 9.90 cSt to 12.2 cSt, from 9.90 cSt to 11.9 cSt, from 9.90 cSt to 11.6 cSt, from 9.90 cSt to 11.3 cSt, from 9.90 cSt to 11.0 cSt, from 9.90 cSt to 10.7 cSt, from 9.90 cSt to 10.5 cSt, from 9.90 cSt to 10.3 cSt, from 10.0 cSt to 13.0 cSt, from 10.0 cSt to 12.5 cSt, from 10.0 cSt to 12.2 cSt, from 10.0 cSt to 11.9 cSt, from 10.0 cSt to 11.6 cSt, from 10.0 cSt to 11.3 cSt, from 10.0 cSt to 11.0 cSt, from 10.0 cSt to 10.7 cSt, from 10.0 cSt to 10.5 cSt (in particular, from 9.30 cSt to 12.5 cSt, from 9.45 cSt to 12.2 cSt, or from 9.60 cSt to 11.6 cSt).

Even further additionally or alternatively, lubricant compositions according to the present disclosure, particularly those formulated to meet 5W30 lubricant specifications, may exhibit a KV40 of at most 60.0 cSt, e.g., at most 59.0 cSt, at most 58.0 cSt, at most 57.0 cSt, at most 56.0 cSt, at most 55.0 cSt, at most 54.0 cSt, at most 53.0 cSt, at most 52.0 cSt, at most 51.0 cSt, or at most 50.0 cSt (in particular, at most 58.0 cSt or at most 56.0 cSt). While there is not necessarily a lower limit for the specification, the lubricant compositions may optionally also exhibit a KV40 of at least 40.0 cSt or at least 45.0 cSt.

Yet further additionally or alternatively, lubricant compositions according to the present disclosure, particularly those formulated to meet 5W30 lubricant specifications, may exhibit a KV20 of at most 150 cSt, e.g., at most 146 cSt, at most 142 cSt, at most 138 cSt, at most 134 cSt, at most 130 cSt, at most 126 cSt, at most 122 cSt, at most 118 cSt, or at most 115 cSt (in particular, at most 142 cSt or at most 130 cSt). While there is not necessarily a lower limit for the specification, the lubricant compositions may optionally also exhibit a KV20 of at least 80.0 cSt or at least 84.0 cSt.

Yet still further additionally or alternatively, lubricant compositions according to the present disclosure, particularly those formulated to meet 5W30 lubricant specifications, may exhibit a viscosity index (VI) of at least 175, e.g., at least 180, at least 185, at least 190, at least 195, at least 200, or at least 205 (in particular, at least 175 or at least 185). While there is not necessarily an upper limit for the specification, the lubricant compositions may optionally also exhibit a VI of up to 270, up to 240, or up to 220.

Even still further additionally or alternatively, lubricant compositions according to the present disclosure, particularly those formulated to meet 5W30 lubricant specifications, may exhibit a soot dispersancy, as measured in the presence of an additional ~6 wt % carbon black in the lubricant composition, so as to achieve a non-linear APY value of at most 0.60 Pa, e.g., at most 0.55 Pa, at most 0.52 Pa, at most 0.49 Pa, at most 0.46 Pa, at most 0.43 Pa, at most 0.40 Pa, at most 0.37 Pa, at most 0.34 Pa, at most 0.31 Pa, at most 0.28 Pa, at most 0.25 Pa, at most 0.23 Pa, at most 0.22, at most 0.21 Pa, at most 0.20 Pa, at most 0.19 Pa, at most 0.18 Pa, at most 0.17 Pa, at most 0.16 Pa, or at most 0.15 Pa (in particular, at most 0.52 Pa, at most 0.40 Pa, or at most 0.34 Pa). There is not necessarily a lower limit for soot dispersancy in APY terms, as a minimum measured APY value of 0.00 Pa reflects a very highly soot-dispersant composition. Although not required, soot dispersancy can additionally or alternatively be encapsulated by a soot rating using a linear model in the presence of an additional ~6 wt % carbon black in the lubricant composition, so as to achieve a soot rating (unitless) of at least 13, e.g., at least 20, at least 25, at least 30, at least 35, at least 40, at least 45, at least 50, at least 55, at least 60, at least 65, at least 70, or at least 75 (in particular, at least 13, at least 20, or at least 25). While there is not necessarily an upper limit for soot dispersancy in linear soot rating terms, the linear model soot rating may optionally be up to 110, up to 105, or up to 100.

Additional Embodiments

Additionally or alternatively, the present disclosure may include one or more of the following embodiments.

Embodiment 1

A lubricant composition comprising: a lubricating oil basestock; at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and a comb copolymer viscosity modifier made by polymerization comprising at least the following monomers: (a) a hydrogenated polybutadiene-based (alk)acrylate ester macromonomer; (b) a $C_3$-$C_8$ alkyl (alk)acrylate ester monomer; (c) a $C_{12}$-$C_{24}$ alkyl (alk)acrylate ester monomer; and (d) a $C_6$-$C_{20}$ aryl, aralkyl, or alkaryl (alk)acrylate ester monomer, wherein a sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 21.0 wt % of repeat units of the comb copolymer viscosity modifier.

Embodiment 2

The lubricant composition of embodiment 1, wherein the comb copolymer viscosity modifier comprises substantially no repeat units based on styrene monomer, and wherein repeat units based on the $C_{12}$-$C_{24}$ alkyl (alk)acrylate ester monomer comprise from 5.0 wt % to 35.0 wt % of repeat units of the comb copolymer viscosity modifier.

Embodiment 3

The lubricant composition of embodiment 1 or embodiment 2, wherein repeat units based on the $C_{12}$-$C_{24}$ alkyl (alk)acrylate ester monomer comprise at least 10.0 wt % of the repeat units of the comb copolymer viscosity modifier, and wherein repeat units based on the $C_6$-$C_{20}$ aryl, aralkyl, or alkaryl (alk)acrylate ester monomer comprise at least 11.0 wt % of repeat units of the comb copolymer viscosity modifier.

Embodiment 4

The lubricant composition of any one of the previous embodiments, wherein: (i) repeat units based on the hydrogenated polybutadiene-based (alk)acrylate ester macromonomer comprise from 7.0 wt % to 18 wt % of the repeat units of the comb copolymer viscosity modifier; (ii) repeat units based on the $C_3$-$C_8$ alkyl (alk)acrylate ester monomer comprise from 33 wt % to 64 wt % of the repeat units of the comb copolymer viscosity modifier; or (iii) both (i) and (ii).

Embodiment 5

The lubricant composition of any one of the previous embodiments, wherein repeat units based on the $C_6$-$C_{20}$ aryl, aralkyl, or alkaryl (alk)acrylate ester monomer comprise from 3.0 wt % to 27 wt % of the repeat units of the comb copolymer viscosity modifier.

Embodiment 6

The lubricant composition of any one of the previous embodiments, wherein: (i) the $C_3$-$C_8$ alkyl (alk)acrylate ester monomer is a butyl acrylate and/or a butyl methacrylate; (ii) the $C_{12}$-$C_{24}$ alkyl (alk)acrylate ester monomer comprises a lauryl acrylate, a lauryl methacrylate, a myristyl acrylate, a myristyl methacrylate, a palmityl acrylate, a palmityl methacrylate, a heptadecanoyl acrylate, a heptadecanoyl methacrylate, or a combination thereof; or (iii) both (i) and (ii).

Embodiment 7

The lubricant composition of any one of the previous embodiments, wherein the $C_6$-$C_{20}$ aryl, aralkyl, or alkaryl (alk)acrylate ester monomer comprises a benzyl acrylate, a benzyl methacrylate, a naphthyl acrylate, a naphthyl methacrylate, a phenyl acrylate, a phenyl methacrylate, a toluyl acrylate, a toluyl methacrylate, a phenylethyl acrylate, a phenylethyl methacrylate, a nonylnaphthyl acrylate, a nonylnaphthyl methacrylate, an anthracenyl acrylate, an anthracenyl methacrylate, a phenanthrenyl acrylate, a phenanthrenyl methacrylate, a fluorenyl acrylate, a fluorenyl methacrylate, an ethylfluorenyl acrylate, an ethylfluorenyl methacrylate, or a combination thereof.

Embodiment 8

The lubricant composition of any one of the previous embodiments, comprising from 0.8 mass % to 8.0 mass % of the comb copolymer viscosity modifier, based on the total mass of the lubricant composition.

Embodiment 9

The lubricant composition of any one of the previous embodiments, comprising from 75 mass % to 95 mass % of the lubricating oil basestock, based on the total mass of the lubricant composition, and wherein the lubricating oil basestock comprises a Group I basestock, a Group II basestock, a Group III basestock, or a mixture thereof.

Embodiment 10

The lubricant composition of any one of the previous embodiments, which exhibits: a non-linear model applied yield stress (APY) value of at most 0.35 Pa and/or a linear model soot rating of at least 25; and at least three of the following characteristics: a high-temperature high-shear viscosity at approximately 150° C. (HTHS150) of at least 2.55 cPs; a high-temperature high-shear viscosity at approximately 100° C. (HTHS100) of at most 5.60 cPs; a high-temperature high-shear viscosity at approximately 80° C. (HTHS80) of at most 8.30 cPs; a KV100 from 6.80 cSt to 9.00 cSt; a kinematic viscosity at approximately 40° C. (KV40) of at most 35.0 cSt; a kinematic viscosity at approximately 20° C. (KV20) of at most 79.5 cSt; and a viscosity index of at least 175.

Embodiment 11

The lubricant composition of any one of the previous embodiments, wherein the comb copolymer viscosity modifier comprises at least 23.0 wt % of a sum of repeat units based on the $C_{12}$-$C_{24}$ alkyl (alk)acrylate ester monomer and of repeat units based on the $C_6$-$C_{20}$ aryl, aralkyl, or alkaryl (alk)acrylate ester monomer, wherein the comb copolymer viscosity modifier exhibits a weight average molecular weight of less than or equal to 625,000 g/mol (or less than or equal to 600,000 g/mol, or from 100,000 g/mol to 625,000 g/mol, or from 200,000 g/mol to 610,000 g/mol, or from 250,000 g/mol to 600,000 g/mol), as measured by gel permeation chromatography (GPC) at about 35° C. in tetrahydrofuran (THF) using polystyrene standards, and wherein the lubricant composition exhibits: a non-linear model applied yield stress (APY) value of at most 0.35 Pa and/or a linear model soot rating of at least 25; and at least four of the following characteristics: a high-temperature high-shear viscosity at approximately 150° C. (HTHS150) of at least 2.55 cPs; a high-temperature high-shear viscosity at approximately 100° C. (HTHS100) of at most 5.58 cPs; a high-temperature high-shear viscosity at approximately 80°

Embodiment 12

The lubricant composition of any one of the previous embodiments, wherein the comb copolymer viscosity modifier is made by polymerization of monomers consisting essentially of: (a) the hydrogenated polybutadiene-based (alk)acrylate ester macromonomer; (b) the $C_3$-$C_8$ alkyl (alk)acrylate ester monomer; (c) the $C_{12}$-$C_{24}$ alkyl (alk)acrylate ester monomer; and (d) the $C_6$-$C_{20}$ aryl, aralkyl, or alkaryl (alk)acrylate ester monomer.

Embodiment 13

The lubricant composition of any one of the previous embodiments, wherein the comb copolymer viscosity modifier: (i) is made by polymerization of monomers that comprise substantially no styrene nor styrenic monomers; and (ii) comprises substantially no styrene-based nor styrenic-based repeat units.

Embodiment 14

The lubricant composition of any one of embodiments 1-11 and 13, wherein the comb copolymer viscosity modifier is made by polymerization comprising monomers (a), (b), (c), (d), and (e) at least one additional olefinic monomer, different from monomers (a), (b), (c), and (d) and which is not a $C_1$-$C_{18}$ alkyl-endcapped or $C_6$-$C_{20}$ aryl-, aralkyl-, or alkaryl-endcapped $C_2$-$C_6$ oxyalkyl or $C_2$-$C_6$ oligo(alkylene glycol)-based (alk)acrylate ester monomer nor a hydroxyalkyl or H-endcapped oligo(alkylene glycol)-based (alk)acrylate monomer.

Embodiment 15

A method of modifying a viscosity and a dispersancy of a lubricant composition comprising: forming a viscosity and dispersancy modified mixture by combining a viscosity and dispersancy modifying amount of a comb copolymer viscosity modifier with one of the following lubricant composition components: (1) a lubricating oil basestock comprising at least 75% by weight of one or more basestocks; (2) at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; or (3) a lubricant composition comprising both (1) and (2), the comb copolymer viscosity modifier being made by polymerization comprising at least the following monomers: (a) a hydrogenated polybutadiene-based (alk)acrylate ester macromonomer; (b) a $C_3$-$C_8$ alkyl (alk)acrylate ester monomer; (c) a $C_{12}$-$C_{24}$ alkyl (alk)acrylate ester monomer; and (d) a $C_6$-$C_{20}$ aryl, aralkyl, or alkaryl (alk)acrylate ester monomer, wherein a sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 21.0 wt % of repeat units of the comb copolymer viscosity modifier, and wherein the viscosity and dispersancy modified mixture exhibits: (i) at least a 25% improvement, relative to the lubricant composition components (1), (2), or (3) without the comb copolymer viscosity modifier, with regard to soot dispersancy; and (ii) at least a 5% difference, relative to the lubricant composition components (1), (2), or (3) without the comb copolymer viscosity modifier, with regard to one or more (or two or more or three or more or four or more or five or more or six or more or all seven) of HTHS150, HTHS100, HTHS80, KV100, KV40, KV20, and VI, and optionally wherein the comb copolymer viscosity modifier exhibits a weight average molecular weight of less than or equal to 625,000 g/mol (or less than or equal to 600,000 g/mol, or from 100,000 g/mol to 625,000 g/mol, or from 200,000 g/mol to 610,000 g/mol, or from 250,000 g/mol to 600,000 g/mol), as measured by gel permeation chromatography (GPC) at about 35° C. in tetrahydrofuran (THF) using polystyrene standards.

Embodiment 16

The method of embodiment 15, wherein the viscosity and dispersancy modifying amount of the comb copolymer viscosity modifier is from 1.0 mass % to 7.0 mass %, based on the total mass of the viscosity modified mixture, and wherein the one or more basestocks comprises a Group I, Group II, and/or Group III basestock.

Embodiment 17

The method of embodiment 15 or embodiment 16, wherein the comb copolymer viscosity modifier is combined with (1) the lubricating oil basestock, or (3) the lubricant composition comprising (1) and (2) the at least one lubricant additive, and wherein the 25% improvement and 5% difference are thus relative to lubricant composition components (1) or (3).

Embodiment 18

The method of any one of embodiments 15-17, wherein the viscosity and dispersancy modified mixture exhibits at least a 33% improvement with regard to a non-linear model applied yield stress measurement of soot dispersancy and at least a 5% difference with regard to four or more (or five or more or six or more or all seven) of the enumerated viscometric characteristics.

Embodiment 19

The method of any one of embodiments 15-18, wherein the viscosity modified mixture exhibits at least a 33% improvement with regard to a non-linear model applied yield stress measurement of soot dispersancy and at least a 10% difference with regard to three or more (or four or more or five or more or six or more or all seven) of the enumerated viscometric characteristics.

Embodiment 20

Use of a comb copolymer viscosity modifier to modify a viscosity and a dispersancy of a lubricant composition, wherein the comb copolymer viscosity modifier is made by polymerization comprising at least the following monomers: (a) a hydrogenated polybutadiene-based (alk)acrylate ester macromonomer; (b) a $C_3$-$C_8$ alkyl (alk)acrylate ester monomer; (c) a $C_{12}$-$C_{24}$ alkyl (alk)acrylate ester monomer; and (d) a $C_6$-$C_{20}$ aryl, aralkyl, or alkaryl (alk)acrylate ester monomer, wherein a sum of repeat units based on the $C_{12}$-$C_{24}$ alkyl (alk)acrylate ester monomer plus the $C_6$-$C_{20}$ (continues: C. (HTHS80) of at most 8.25 cPs; a KV100 from 6.90 cSt to 8.50 cSt; a kinematic viscosity at approximately 40° C. (KV40) of at most 34.5 cSt; a kinematic viscosity at approximately 20° C. (KV20) of at most 79.0 cSt; and a viscosity index (VI) of at least 180.)

aryl, aralkyl, or alkaryl (alk)acrylate ester monomer collectively comprise at least 21.0 wt % of repeat units of the comb copolymer viscosity modifier, and wherein the comb copolymer viscosity modifier is combined with one of the following lubricant composition components: (1) a lubricating oil basestock comprising at least 75% by weight of one or more basestocks; (2) at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; or (3) a lubricant composition comprising both (1) and (2), to form a viscosity and dispersancy modified mixture, which exhibits: (i) at least a 25% improvement, relative to the lubricant composition components (1), (2), or (3) without the comb copolymer viscosity modifier, with regard to soot dispersancy; and (ii) at least a 5% difference, relative to the lubricant composition components (1), (2), or (3) without the comb copolymer viscosity modifier, with regard to one or more (or two or more or three or more or four or more or five or more or six or more or all seven) of HTHS150, HTHS100, HTHS80, KV100, KV40, KV20, and VI, and optionally wherein the comb copolymer viscosity modifier exhibits a weight average molecular weight of less than or equal to 625,000 g/mol (or less than or equal to 600,000 g/mol, or from 100,000 g/mol to 625,000 g/mol, or from 200,000 g/mol to 610,000 g/mol, or from 250,000 g/mol to 600,000 g/mol), as measured by gel permeation chromatography (GPC) at about 35° C. in tetrahydrofuran (THF) using polystyrene standards.

Embodiment 21

The method or use according to any one of embodiments 15-20, wherein the comb copolymer viscosity modifier and the lubricant composition, if applicable, are as described in any one of embodiments 1-14.

The invention will now be described by way of non-limiting example only.

EXAMPLES

The invention will be illustrated in detail hereinafter with reference to examples, without any intention that this should impose a restriction.
Synthesis of Monomers Certain monomers, such as n-butyl methacrylate, mixed $C_{12}/C_{14}$ methacrylate (under the tradename LMA 1214F, from BASF), benzyl methacrylate, and naphthyl methacrylate, were obtained commercially.

Other acrylate monomers and macromonomers can either be commercially obtained or synthesized in whole or in part, e.g., (meth)acrylic acid (or a soluble salt thereof) and terminal mono-alcohol (such as Krasol™ HLBH5000m from Total Cray Valley of Exton, Pa.) reactants may be obtained commercially and subject to (condensation) reaction conditions to generate the (macro)monomer(s), which could then be sufficiently isolated/purified for subsequent polymerization, if necessary/desired.
Copolymer Syntheses Comparative Examples 1-2 and Examples 3-22

Regarding Comparative Examples 1-2 and Examples 12, 14, 18-20, to a 4-necked round bottom flask (~250 mL) equipped with an overhead stirrer, a nitrogen sparge tube, a thermocouple, a thermowell, and a Friedrich water condenser were added the monomer mixture (~30 grams scale) and diluent/basestock (~45 grams scale, ~1.5× total monomer content). The diluent/basestock was either all Nexbase™ 3030 (~45 grams) or a 4:1 w/w mixture of Nexbase™ 3030 and Amexom100 (~36 grams and ~9 grams, respectively). The monomer mixture contained hydrogenated polybutadiene methacrylate macromonomer (h-PBDMA), butyl methacrylate, and LMA 1214F from BASF (a commercially available mixture of dodecyl, tetradecyl, and hexadecyl methacrylate), and optionally also benzyl methacrylate (BzMA), at specified compositional ratios, e.g., 15/75/10/0 wt % or 15/59/21/5 wt %. The reaction mixture was sparged with nitrogen for ~20.30 minutes, followed by heating to ~115° C. under positive nitrogen pressure. In a separate flask, the initiator solution (~6 grams) was prepared by diluting 2,2-bis(t-butylperoxy)butane (~50% in mineral spirit) (~0.12 grams) in diluent/basestock (e.g., Nexbase™ 3030) (~6 grams). The final molar ratio of monomers to initiator was ~666/1. At ~115° C., a first ~⅓ of the initiator solution was added to start the polymerization. The reaction was then held at 115° C. for about 3 hours, after which a second dose of initiator (a second ~⅓ of the initiator solution) was added. After another ~3 hours, the final initiator dose (a third ~⅓ of the initiator solution) was added. The polymerization was held at ~115° C. for a total of ~8-9 hours (e.g., to attain at least 95% conversion of the monomer mixture, as indicated by residual olefinic hydrogens versus ester hydrogens from $^1$H NMR). After copolymerization reaction "completion," additional diluent (e.g., Nexbase™ 3030 basestock) was added, if necessary, at ~115° C. under nitrogen to achieve a targeted comb copolymer concentrate content (~25-40% by weight).

Regarding Examples 3-4, 7-9, 13, and 16-17, polyalkyl (alk)acrylate comb copolymers were formed using the following copolymerization procedure. To a 4-necked round bottom flask (~500 mL) equipped with an overhead stirrer, a nitrogen sparge tube, a thermocouple, a thermowell, and a Friedrich water condenser were added the monomer mixture (~60 grams scale) and diluent/basestock (~90 grams scale, ~1.5× total monomer content). The diluent/basestock was either all Nexbase™ 3030 (~90 grams) or a ~2:1 w/w mixture of Nexbase™ 3030 and IsoparM (~60 grams and ~30 grams, respectively). The monomer mixture contained hydrogenated polybutadiene methacrylate macromonomer (h-PBDMA), butyl methacrylate (BMA), LMA 1214F from BASF (a commercially available mixture of dodecyl, tetradecyl, and hexadecyl methacrylate), and optionally also benzyl methacrylate(BzMA), at specified compositional ratios, e.g., 15/48/25/12 wt % or 15/60/25/0 wt %. The reaction mixture was sparged with nitrogen for ~20-30 minutes, followed by heating to ~115° C. under positive nitrogen pressure. In a separate flask, the initiator solution (~6 grams) was prepared by diluting 2,2-bis(t-butylperoxy)butane (~50% in mineral spirit) (~0.22 grams) in diluent/basestock (e.g., Nexbase™ 3030) (~6 grams). The final molar ratio of monomers to initiator was ~666/1. At ~115° C., a first ~⅓ of the initiator solution was added to start the polymerization. The reaction was then held at ~115° C. for about 3 hours, after which a second dose of initiator (a second ~⅓ of the initiator solution) was added. After another ~3 hours, the final initiator dose (a third ~⅓ of the initiator solution) was added. The polymerization was held at ~115° C. for a total of ~8-9 hours (e.g., to attain at least 95% conversion of the monomer mixture, as indicated by residual olefinic hydrogens versus ester hydrogens from NMR).

After copolymerization reaction "completion," additional diluent (e.g., Nexbase™ 3030 basestock) was added, as necessary, at ~115° C. under nitrogen to achieve a targeted comb copolymer concentrate content (~25-40% by weight).

Regarding Examples 5-6 and 10, every aspect of the comb copolymer synthesis was identical to that described above for Examples 3-4, 7-9, 13, and 16-17, except that the copolymer synthesis batches were further scaled up to ~2 L flasks, including ~360 grams total monomer mixture, ~540 grams diluent/basestock (still ~1.5× total monomer content; also still ~2:1 w/w mixture of Nexbase™ 3030 and IsoparM), and a proportional amount (~12 grams) of initiator (~1.3 grams) in Nexbase™ 3030 (~10.7 grams) (to attain a similar ~666/1 molar ratio of monomer to initiator). The same monomers (either including BzMA or not), initiator, and diluent/basestock(s) were used, and the same copolymerization scheme (all monomers added up front; initiator solution added in thirds) and reaction times were used. Similarly, after scaled-up copolymerization reaction "completion," additional diluent (e.g., Nexbase™ 3030 basestock) was added, if necessary, at ~115°T under nitrogen to achieve a targeted comb copolymer concentrate content (~25-40% by weight).

Regarding Examples 11 and 15, every aspect of the comb copolymer synthesis was identical to that described above for Example 10, except that the copolymer synthesis batch was even further scaled up to ~5 L flask, including ~720 grams total monomer mixture, ~1080 grams diluent/basestock (still ~1.5× total monomer content; ~2:1 w/w mixture of Nexbase™ 3030 and IsoparM), and a proportional amount (~12 grams) of initiator (~2.5 grams) in Nexbase™ 3030 (~9.5 grams) (to attain a similar ~666/1 molar ratio of monomer to initiator). The same monomers, initiator, and diluent/basestock(s) were used, and the same copolymerization scheme (all monomers added up front; initiator solution added in thirds) and reaction times were used. Similarly, after further scaled-up copolymerization reaction "completion," additional diluent (e.g., Nexbase™ 3030 basestock) was added, if necessary, at ~115° C. under nitrogen to achieve a targeted comb copolymer concentrate content (~25-40% by weight).

Regarding Example 21, to a 4-necked round bottom flask (~5 L equipped with an overhead stirrer, a nitrogen sparge tube, a thermocouple, a thermowell, and a Friedrich water condenser were added the monomer mixture (~700 grams scale) and Yubase™ 3 diluent/basestock (~1050 grams scale, ~1.5× total monomer content). The monomer mixture contained h-PBDMA macromonomer, butyl methacrylate, lauryl methacrylate from Miwon Specialty Chemicals of South Korea, and benzyl methacrylate (BzMA), at compositional ratios of approximately 13/52/25/10 wt %. The reaction mixture was sparged with nitrogen for ~20-30 minutes, followed by heating to ~90° C. under positive nitrogen pressure. In a separate flask, the initiator solution (~6 grams) was prepared by diluting t-butylperoxy-2-ethyl-hexanoate (~3.3 grams) in Yubase™ 3 diluent/basestock (~6 grams). The final molar ratio of monomers to initiator was ~240/1. At a ~90° C., a first ~⅓ of the initiator solution was added to start the polymerization. The reaction was then held at ~90° C. for about 1.5 hours, after which a second dose of initiator (a second ~⅓ of the initiator solution) was added. After another ~2 hours, the final initiator dose (a third ~⅓ of the initiator solution) was added. Over the following ~2 hours, additional Yubase™ 3 diluent/basestock (~578 grams) was added stepwise to the polymerization. The polymerization was held at ~90° C. for a total of ~8-9 hours (e.g., to attain at least 95% conversion of the monomer mixture, as indicated by residual olefinic hydrogens versus ester hydrogens from $^1$H NMR). A comb copolymer concentrate content of ~25-40% by weight was targeted.

Regarding Example 22, every aspect of the comb copolymer synthesis was identical to that described above for Example 21, except that the copolymer synthesis batch was even further scaled up to a ~10 L vessel, and Nexbase™ 3030 was used in place of Yubase™ 3 diluent/basestock. Also, the monomer mixture contained h-PBDMA macromonomer, butyl methacrylate, lauryl methacrylate from Miwon Specialty Chemicals of South Korea, and benzyl methacrylate (BzMA), at compositional ratios of approximately 15/48/25/12 wt %.

TABLE 1

| Example | Monomer Content [Macro/BMA/L1214/BzMA] | GPC Mn | GPC Mw | % Conv | AI (actual) |
|---|---|---|---|---|---|
| Comp. Ex. 1 | 15/75/10/0 | 74300 | 271700 | 97.8 | 29.4 |
| Comp. Ex. 2 | 15/75/10/0 | 111600 | 317600 | 99.5 | 36.2 |
| Ex. 3 | 15/60/25/0 | 105600 | 336900 | 96.8 | 28.8 |
| Ex. 4 | 15/60/25$^1$/0 | 143100 | 353000 | 96.5 | 29.0 |
| Ex. 5 | 15/60/25/0 | 185600 | 689700 | 96.9 | 29.1 |
| Ex. 6 | 15/60/25/0 | 128700 | 537700 | 98.1 | 29.4 |
| Ex. 7 | 15/56/25/4 | 122400 | 327700 | 97.5 | 29.3 |
| Ex. 8 | 15/52/25/8 | 121600 | 357700 | 97.7 | 29.2 |
| Ex. 9 | 15/48/25/12 | 135600 | 433600 | 97.9 | 29.4 |
| Ex. 10 | 15/48/25/12 | 150200 | 650800 | 96.8 | 29.0 |
| Ex. 11 | 15/48/25/12 | 158600 | 573600 | 95.7 | 28.7 |
| Ex. 12 | 15/45/25/15 | 97500 | 291200 | 97.2 | 36.1 |
| Ex. 13 | 15/40/25/20 | 143100 | 485600 | 95.5 | 35.3 |
| Ex. 14 | 15/38/23/24 | 107600 | 323600 | 95.5 | 35.3 |
| Ex. 15 | 15/36/25/24 | 151700 | 605100 | 95.2 | 28.6 |
| Ex. 16 | 15/70/10/5 | 114200 | 287500 | 98.1 | 29.4 |
| Ex. 17 | 15/65/10/10 | 105300 | 268400 | 98.1 | 29.4 |
| Ex. 18 | 15/64/21/0 | 134100 | 497100 | 96.2 | 36.4 |
| Ex. 19 | 15/59/21/5 | 110600 | 296200 | 97.4 | 36.4 |
| Ex. 20 | 15/52/21/12 | 127100 | 418000 | 95.1 | 35.4 |
| Ex. 21 | 13/52/25$^1$/10 | 158200 | 481700 | 98.0 | 29.3 |
| Ex. 22 | 15/48/25$^1$/12 | 120600 | 512500 | 96.8 | 29.0 |

[1] 25 wt % refers to purely lauryl methacrylate ($C_{12}$ only, not mix of $C_{12}/C_{14}$)

Table 1 shows the relative weight percentages of the various monomers added to the reaction mixture, the Mn and Mw values measured by GPC, the percent conversion (calculated from $^1$H NMR), and the actual comb copolymer content (wt %) of the concentrates for Comparative Examples 1-2 and Examples 3-22. The instrument specification and analysis conditions were as follows: Waters Acquity APC with Waters RID and UV215 nm; software: Empower 3; columns (in series 3×4.6×150 mm): APC-XT 450 (~2.5μ), APC-XT200 (~2.5μ), and APC-XT45 (~1.7 μm); mobile phase and flow: >99.9% Fisher optima gold label HPLC grade uninhibited THF; flow rate: ~0.25 mL/min with =35 min retention time; oven temperature: ~35° C.; sample concentration: ~1 mg (solid polymer)/mL; sample preparation: complete dissolution overnight, followed by filtration through ~0.45 μm PTFE filter; injection volume: ~10 μL; polystyrene calibration curve.

For copolymers of Comparative Example 1 and Examples 3-4, 7-9, 12, 14, and 16-20, a portion of each synthesized concentrate was initially set aside and diluted (with Yubase 4) to a target KV100 of approximately 8 cSt. For these additionally diluted samples, compositional KV100 was adjusted to ~8 cSt to measure viscosity index (VI) as a comparative performance indicator. These data plus KV40 are shown in Table 2.

TABLE 2

| Sample | Monomer Content [Macro/BMA/ L1214/BzMA] | KV100 [cSt] | KV40 [cSt] | VI @ KV100 ~8 cSt |
|---|---|---|---|---|
| Ex. 3 | 15/60/25/0 | 7.87 | 26.6 | 295 |
| Ex. 4 | 15/60/25[1]/0 | 7.94 | 25.2 | 320 |
| Ex. 7 | 15/56/25/4 | 7.99 | 27.2 | 293 |
| Ex. 8 | 15/52/25/8 | 7.95 | 26.8 | 296 |
| Ex. 9 | 15/48/25/12 | 8.01 | 26.5 | 304 |
| Ex. 12 | 15/45/25/15 | 7.91 | 27.7 | 282 |
| Ex. 14 | 15/38/23/24 | 8.00* | 28.5* | 271* |
| Comp. Ex. 1 | 15/75/10/0 | 8.01 | 25.8 | 315 |
| Ex. 16 | 15/70/10/5 | 7.84 | 27.0 | 287 |
| Ex. 17 | 15/65/10/10 | 7.78 | 25.3 | 309 |
| Ex. 18 | 15/64/21/0 | 8.05 | 26.4 | 308 |
| Ex. 19 | 15/59/21/5 | 8.03 | 26.4 | 306 |
| Ex. 20 | 15/52/21/12 | 7.96 | 25.7 | 312 |

[1] 25 wt % refers to purely lauryl methacrylate ($C_{12}$ only, not mix of $C_{12}/C_{14}$)
*represents extrapolated calculation from least squares fit ($R^2 \approx 0.9992$) from measured samples having KV100 values of 6.01, 6.55, and 8.79, as adjusted to 8.00

Copolymer Syntheses

Examples 23-27

Regarding Examples 23-25, every aspect of the comb copolymer synthesis was identical to that described above for Examples 18-20, except that naphthyl methacrylate (NMA) was substituted for benzyl methacrylate (BzMA) and the monomer mixture was divided into two portions. A first monomer portion contained a homogenized combination of all the h-PBDMA, all the LMA 1214F, and approximately one-third (~⅓) of the BMA. A second monomer portion contained a homogenized combination of all the NMA and the remaining approximately two-thirds (~⅔) of the BMA. In some cases, the second portion may need to be homogenized at ~115° C. The first and second separately-homogenized monomer portions can then be added together to the reaction mixture, before sparging with nitrogen for ~20-30 minutes. Otherwise, the same initiator and diluent/basestock(s) were used, and the same copolymerization scheme (all monomers added up front; initiator solution added in thirds; monomer to initiator ratio similar) and reaction times/temperatures were used.

Regarding Examples 26-27, every aspect of the comb copolymer synthesis was identical to that described above for Examples 7-9, except that benzyl methacrylate (BzMA) was used. Otherwise, the same initiator and diluent(s)/basestock(s) were used, and the same copolymerization scheme (all monomers added up front; initiator solution added in thirds; monomer to initiator ratio similar) and reaction times/temperatures were used.

Table 3 shows the relative weight percentages of the various monomers added to the reaction mixture, the Mn and Mw values measured by GPC, the percent conversion (calculated from $^1$H NMR), and the actual comb copolymer content (in wt %) of the concentrates for Examples 8 and 23-27. The instrument specification and analysis conditions were the same as specified for Comparative Examples 1-2 and Examples 3-22.

TABLE 3

| Example | Monomer Content [Macro/BMA/ L1214/Aryl[2]] | GPC | | % Conv | AI (actual) |
|---|---|---|---|---|---|
| | | Mn | Mw | | |
| Ex. 23 | 15/50/25/10 | 62500 | 122300 | 96.1 | 35.6 |
| Ex. 24 | 12/53/25/10 | 64100 | 137800 | 97.5 | 36.1 |
| Ex. 25 | 18/47/25/10 | 64400 | 138300 | 92.5 | 34.2 |

TABLE 3-continued

| Example | Monomer Content [Macro/BMA/ L1214/Aryl[2]] | GPC | | % Conv | AI (actual) |
|---|---|---|---|---|---|
| | | Mn | Mw | | |
| Ex. 8 | 15/52/25/8 | 121600 | 357700 | 97.7 | 29.2 |
| Ex. 26 | 15.7/50.3/26.2/7.9 | 89400 | 221200 | 96.6 | 28.1 |
| Ex. 27 | 13.6/52.4/26.2/7.9 | 101500 | 302700 | 96.4 | 28.5 |

[2] NMA for Examples 23-25, and BzMA for Examples 8 and 26-27

For copolymers of Examples 8 and 23-27, a portion of each synthesized concentrate was initially set aside and diluted (with Yubase 4) to a target KV100 of approximately 8 cSt. For these additionally diluted samples, compositional KV100 was adjusted to ~8 cSt to measure viscosity index (VI) as a comparative performance indicator. These data plus KV40 are shown in Table 4.

TABLE 4

| Example | Monomer Content [Macro/BMA/ L1214/Aryl[2]] | KV100 [cSt] | KV40 [cSt] | VI @ KV100 ~8 cSt |
|---|---|---|---|---|
| Ex. 23 | 15/50/25/10 | 7.71 | 29.2 | 253 |
| Ex. 24 | 12/53/25/10 | 7.88 | 29.0 | 264 |
| Ex. 25 | 18/47/25/10 | 7.84 | 28.5 | 268 |
| Ex. 8 | 15/52/25/8 | 7.95 | 26.8 | 296 |
| Ex. 26 | 15.7/50.3/26.2/7.9 | 8.20 | 29.4 | 276 |
| Ex. 27 | 13.6/52.4/26.2/7.9 | 7.96 | 27.6 | 285 |

[2] NMA for Examples 23-25, and BzMA for Examples 8 and 26-27

Copolymer Syntheses

Examples 28-32

Regarding Examples 28-32, every aspect of the comb copolymer synthesis was identical to that described above for Examples 23-25, which again deviated from Examples 18-20 in that naphthyl methacrylate (NMA) was substituted for benzyl methacrylate (BzMA) and the monomer mixture was divided into two portions. A first monomer portion contained a homogenized combination of all the h-PBDMA, all the LMA 1214F, and approximately one-third (~⅓) of the BMA. A second monomer portion contained a homogenized combination of all the NMA and the remaining approximately two-thirds (~⅔) of the BMA. In some cases, the second portion may need to be homogenized at ~115° C. The first and second separately-homogenized monomer portions can then be added together to the reaction mixture, before sparging with nitrogen for ~20-30 minutes. Otherwise, the same initiator and diluent/basestock(s) were used, and the same copolymerization scheme (all monomers added up front; initiator solution added in thirds; monomer to initiator ratio similar) and reaction times/temperatures were used.

Table 5 shows the relative weight percentages of the various monomers added to the reaction mixture, the Mn and Mw values measured by GPC, the percent conversion (calculated from $^1$H NMR), and the actual comb copolymer content of the concentrates for Comparative Example 1 and Examples 3 and 28-32. The instrument specification and analysis conditions were the same as specified for Comparative Examples 1-2 and Examples 3-22.

For copolymers of Comparative Example 1 and Examples 3, 28-30, and 32, a portion of each synthesized concentrate was initially set aside and diluted (with Yubase 4) to a target KV100 of approximately 8 cSt. For these additionally diluted samples, compositional KV100 was adjusted to ~8 cSt to measure viscosity index (VI) as a comparative performance indicator. These data plus KV40 are shown in Table 6.

TABLE 5

| Example | Monomer Content [Macro/BMA/L1214/NMA] | GPC Mn | GPC Mw | % Conv | AI (actual) |
|---|---|---|---|---|---|
| Comp. Ex. 1 | 15/75/10/0 | 74300 | 271700 | 97.8 | 29.4 |
| Ex. 28 | 15/70/10/5 | 96100 | 283700 | 99.0 | 36.6 |
| Ex. 29 | 15/65/10/10 | 77900 | 202600 | 99.0 | 36.6 |
| Ex. 30 | 15/60/10/15 | 57900 | 115300 | 96.3 | 35.6 |
| Ex. 3 | 15/60/25/0 | 105600 | 336900 | 96.8 | 28.8 |
| Ex. 32 | 15/50/25/10 | 62500 | 122300 | 95.0 | 37.0 |

TABLE 6

| Example | Monomer Content [Macro/BMA/L1214/NMA] | KV100 [cSt] | KV40 [cSt] | VI @ KV100 ~8 cSt |
|---|---|---|---|---|
| Comp. Ex. 1 | 15/75/10/0 | 8.01 | 25.8 | 315 |
| Ex. 28 | 15/70/10/5 | 7.87 | 25.5 | 311 |
| Ex. 29 | 15/65/10/10 | 8.33 | 28.5 | 293 |
| Ex. 30 | 15/60/10/15 | 8.06 | 29.9 | 263 |
| Ex. 31 | 15/55/10/20 | — | — | — |
| Ex. 3 | 15/60/25/0 | 7.87 | 26.6 | 295 |
| Ex. 32 | 15/50/25/10 | 7.71 | 29.2 | 253 |

Lubricant Formulations

Comparative Examples 33-34 and Examples 35-52

The polyalkyl(alk)acrylate comb copolymer concentrates of Comparative Examples 1-2 and Examples 3-9, 10 (twice), 12-15, 21-22, 26-27, and 32 were added in various proportions to finished lubricant compositions of Comparative Examples 33-34 and Examples 35-52, which lubricant compositions also contained at least an additive package concentrate (comprising one or more dispersants, one or more detergents, one or more antiwear components, one or more friction modifiers, one or more antioxidants, a diluent/basestock, and optionally one or more other components), a pour point depressant/flow improver, and a diluent/basestock. In Comparative Examples 33-34 and Examples 35-42 and 44-52, the components and proportions of the additive package concentrate and pour point depressant/flow improver remained constant (at ~13.5 wt % and ~0.2 wt %, respectively), while the chemistry and proportions of the polyalkyl(alk)acrylate comb copolymer viscosity modifiers were varied (while keeping each sum of the viscosity modifier concentration and the diluent/basestock concentration constant at ~86.3 wt %). In Example 43, the additive package content of the formulation was reduced to ~12.8 wt %, while the pour point depressant/flow improver content remained at ~0.2 wt %, and the remainder (aside from copolymer content, which was enumerated in the table) was diluent/basestock. Table 7 shows these chemistries and proportions, as well as various relevant viscometric characteristics of each finished lubricant composition, such as HTHS150 (in cPs), HTHS100 (in cPs), HTHS80 (in cPs), KV100 (in cSt), KV40 (in cSt), KV20 (in cSt), and VI (dimensionless), and various relevant dispersancy characterizations of each finished lubricant composition, such as non-linear model apparent yield stress (APY) and linear model soot rating.

TABLE 7

| Sample | VM Conc. [Wt %/Type] | Wt % VM Actual | HTHS 150/100/80 | KV100/40/20 | VI | APY/Soot Rating |
|---|---|---|---|---|---|---|
| Comp 33 | 3.85/CE1 | 1.39 | 2.64/5.30/8.20 | 7.13/33.2/78.5 | 186 | —/— |
| Comp 34 | 4.75/CE2 | 1.40 | 2.63/5.36/8.01 | 7.20/33.4/77.7 | 188 | —/— |
| Ex. 35 | 4.60/E3 | 1.32 | 2.65/5.61/8.24 | 7.80/34.0/78.6 | 211 | 0.90/7.6 |
| Ex. 36 | 4.60/E4 | 1.34 | 2.65/5.61/8.23 | 7.74/33.9/78.5 | 209 | —/— |
| Ex. 37 | 4.60/E5 | 1.34 | 2.71/5.58/8.23 | 8.33/34.2/78.2 | 234 | 0.57/12.6 |
| Ex. 38 | 4.60/E6 | 1.35 | 2.66/5.51/— | 8.10/33.7/77.5 | 227 | —/— |
| Ex. 39 | 4.60/E7 | 1.35 | 2.65/5.53/8.15 | 7.58/33.6/78.1 | 204 | 0.98/5.1 |
| Ex. 40 | 4.65/E8 | 1.36 | 2.62/5.47/8.14 | 7.55/33.4/77.7 | 205 | 0.52/13.1 |
| Ex. 41 | 4.65/E9 | 1.37 | 2.59/5.36/8.03 | 7.25/33.0/77.1 | 193 | 0.33/27.2 |
| Ex. 42 | 4.70/E10 | 1.36 | 2.61/5.26/— | 7.31/32.7/76.1 | 199 | —/— |
| Ex. 43 | 5.50/E10 | 1.60 | 2.62/5.23/7.68 | 7.45/32.2/74.5 | 210 | —/— |
| Ex. 44 | 4.38/E12 | 1.58 | 2.63/5.47/— | 7.24/33.8/79.5 | 186 | 0.40/16.3 |
| Ex. 45 | 6.70/E13 | 1.88 | 2.60/5.34/— | 7.26/33.5/78.4 | 186 | 0.00/99.4 |
| Ex. 46 | 4.76/E14 | 1.68 | 2.45/5.33/— | 7.00/33.6/79.0 | 177 | 0.00/104 |
| Ex. 47 | 7.67/E15 | 2.19 | 2.63/5.36/8.07 | 7.41/33.7/78.7 | 195 | —/— |
| Ex. 48 | 4.65/E24 | 1.31 | 2.59/5.57/8.20 | 7.36/33.4/77.9 | 195 | —/— |
| Ex. 49 | 4.65/E25 | 1.33 | 2.60/5.50/8.10 | 7.36/33.5/77.9 | 195 | —/— |
| Ex. 50 | 4.76/E30 | 1.76 | 2.57/5.57/— | 7.17/33.9/79.3 | 182 | 0.00/97.9 |
| Ex. 51 | 4.10/E21 | 1.20 | 2.61/5.29/— | 7.21/33.3/76.9 | 189 | 0.80/10.6 |
| Ex. 52 | 4.65/E22 | 1.35 | 2.60/5.37/— | 7.37/33.6/78.2 | 194 | 0.66/14.1 |

Lubricant Formulations

Examples 53-56

The polyalkyl(alk)acrylate comb copolymer concentrates of Examples 6, 10, and 11 (twice) were added in various proportions to finished lubricant compositions of Examples 53-56, which lubricant compositions also contained at least an additive package concentrate (comprising one or more dispersants, one or more detergents, one or more antiwear components, one or more friction modifiers, one or more antioxidants, a diluent/basestock, and optionally one or more other components), a pour point depressant/flow improver, and a diluent/basestock. Although not critical to the analysis, these formulations were targeted with 0W-12 PCMO specifications in mind. In Examples 53-54, the components and proportions of the additive package concentrate and pour point depressant/flow improver remained constant (at ~12.3 wt % and ~0.1 wt %, respectively), while the chemistry and proportions of the polyalkyl(alk)acrylate comb copolymer viscosity modifiers were varied (while keeping each sum of the viscosity modifier concentration and the diluent/basestock concentration constant at ~87.6 wt %). In Example 55, the additive package content of the formulation was increased to ~12.8 wt %, while the pour point depressant/flow improver content remained at ~0.1 wt % and the sum of the viscosity modifier concentration and the diluent/basestock concentration was ~87.1 wt %. In Example 56, the additive package content of the formulation was further increased to ~14.0 wt %, and no pour point depressant/flow improver was included, such that the sum of the viscosity modifier concentration and the diluent/basestock concentration was ~86.0 wt %. Table 8 shows these chemistries and proportions, as well as various relevant viscometric characteristics of each finished lubricant composition, such as HTHS150 (in cPs), HTHS100 (in cPs), HTHS80 (in cPs), KV100 (in cSt), KV40 (in cSt), KV20 (in cSt), and VI (dimensionless).

TABLE 8

| Sample | VM Conc. [Wt %/ VM Type] | Wt % VM Actual | HTHS 150/100/80 | KV100/40/20 | VI |
|---|---|---|---|---|---|
| Ex. 53 | 1.72/E6 | 0.51 | 2.04/4.43/6.53 | 6.00/27.0/62.7 | 178 |
| Ex. 54 | 1.75/E10 | 0.51 | 1.99/4.41/6.52 | 5.78/26.9/62.5 | 165 |
| Ex. 55 | 1.75/E11 | 0.50 | 2.05/4.33/6.65 | 5.82/27.2/63.0 | 166 |
| Ex. 56 | 3.15/E11 | 0.90 | 1.99/4.09/6.07 | 5.62/24.2/55.2 | 185 |

Lubricant Formulation

Example 57

The polyalkyl(alk)acrylate comb copolymer concentrate of Example 15 was added in proportion to a finished lubricant composition of Example 57, which lubricant composition also contained at least an additive package concentrate (comprising one or more dispersants, one or more detergents, one or more antiwear components, one or more friction modifiers, one or more antioxidants, a diluent/basestock, and optionally one or more other components), a pour point depressant/flow improver, and a diluent/basestock. Although not critical to the analysis, these formulations were targeted with 5W-30 PCMO specifications in mind. In Example 57, the additive package concentrate, pour point depressant/flow improver, polyalkyl(alk)acrylate comb copolymer viscosity modifier, and diluent(s)/basestock(s) in relative proportions of ~14.7 wt %, ~0.2 wt %, ~11.3 wt %, and ~73.8 wt %, respectively). Table 9 shows these chemistry and proportions, as well as various relevant viscometric characteristics of the finished lubricant composition, such as HTHS150 (in cPs), HTHS100 (in cPs), HTHS80 (in cPs), KV100 (in cSt), KV40 (in cSt), KV20 (in cSt), and VI (dimensionless).

TABLE 9

| Sample | VM Conc. [Wt %/ VM Type] | Wt % VM Actual | HTHS 150/100/80 | KV100/40/20 | VI |
|---|---|---|---|---|---|
| Ex. 57 | 11.3/E15 | 3.23 | 3.53/7.34/11.5 | 11.0/55.6/141 | 193 |

The disclosures of all patents, articles and other materials described herein are hereby incorporated, in their entirety, into this specification by reference. A description of a composition comprising, consisting of, or consisting essentially of multiple specified components, as presented herein and in the appended claims, should be construed to also encompass compositions made by admixing said multiple specified components. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A lubricant composition comprising:
   a lubricating oil basestock;
   at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and
   a comb copolymer viscosity modifier made by polymerization comprising at least the following monomers:
   (a) a hydrogenated polybutadiene-based (alk)acrylate ester macromonomer;
   (b) a $C_3$-$C_8$ alkyl (alk)acrylate ester monomer;
   (c) a $C_{12}$-$C_{24}$ alkyl (alk)acrylate ester monomer; and
   (d) a $C_6$-$C_{20}$ aryl, aralkyl, or alkaryl (alk)acrylate ester monomer, but substantially no styrene nor styrenic monomers,
   wherein the comb copolymer also comprises substantially no styrene-based nor styrenic-based repeat units,
   wherein from 3.0 wt % to 27 wt % of the repeat units of the comb copolymer viscosity modifier are based on the $C_6$-$C_{20}$ aryl, aralkyl, or alkaryl (alk)acrylate ester monomer, and
   wherein a sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 21.0 wt % of repeat units of the comb copolymer viscosity modifier.

2. The lubricant composition of claim 1, wherein the comb copolymer viscosity modifier comprises substantially no repeat units based on styrene monomer, and wherein repeat units based on the $C_{12}$-$C_{24}$ alkyl (alk)acrylate ester monomer comprise from 5.0 wt % to 35.0 wt % of repeat units of the comb copolymer viscosity modifier.

3. The lubricant composition of claim 1, wherein repeat units based on the $C_{12}$-$C_{24}$ alkyl (alk)acrylate ester monomer comprise at least 10.0 wt % of the repeat units of the comb copolymer viscosity modifier, and wherein repeat units based on the $C_6$-$C_{20}$ aryl, aralkyl, or alkaryl (alk)acrylate ester monomer comprise at least 11.0 wt % of repeat units of the comb copolymer viscosity modifier.

4. The lubricant composition of claim 1, wherein:
   (i) repeat units based on the hydrogenated polybutadiene-based (alk)acrylate ester macromonomer comprise from 7.0 wt % to 18 wt % of the repeat units of the comb copolymer viscosity modifier;
   (ii) repeat units based on the $C_3$-$C_8$ alkyl (alk)acrylate ester monomer comprise from 33 wt % to 64 wt % of the repeat units of the comb copolymer viscosity modifier; or (iii) both (i) and (ii).

5. The lubricant composition of claim 1, wherein:
(i) the $C_3$-$C_8$ alkyl (alk)acrylate ester monomer is a butyl acrylate and/or a butyl methacrylate;
(ii) the $C_{12}$-$C_{24}$ alkyl (alk)acrylate ester monomer comprises a lauryl acrylate, a lauryl methacrylate, a myristyl acrylate, a myristyl methacrylate, a palmityl acrylate, a palmityl methacrylate, a heptadecanoyl acrylate, a heptadecanoyl methacrylate, or a combination thereof; or
(iii) both (i) and (ii).

6. The lubricant composition of claim 1, wherein the $C_6$-$C_{20}$ aryl, aralkyl, or alkaryl (alk)acrylate ester monomer comprises a benzyl acrylate, a benzyl methacrylate, a naphthyl acrylate, a naphthyl methacrylate, a phenyl acrylate, a phenyl methacrylate, a toluyl acrylate, a toluyl methacrylate, a phenylethyl acrylate, a phenylethyl methacrylate, a nonylnaphthyl acrylate, a nonylnaphthyl methacrylate, an anthracenyl acrylate, an anthracenyl methacrylate, a phenanthrenyl acrylate, a phenanthrenyl methacrylate, a fluorenyl acrylate, a fluorenyl methacrylate, an ethylfluorenyl acrylate, an ethylfluorenyl methacrylate, or a combination thereof.

7. The lubricant composition of claim 1, comprising from 0.5 mass % to 8.0 mass % of the comb copolymer viscosity modifier, based on the total mass of the lubricant composition.

8. The lubricant composition of claim 1, comprising from 75 mass % to 95 mass % of the lubricating oil basestock, based on the total mass of the lubricant composition, and wherein the lubricating oil basestock comprises a Group I basestock, a Group II basestock, a Group III basestock, or a mixture thereof.

9. The lubricant composition of claim 1, which exhibits:
a non-linear model applied yield stress (APY) value of at most 0.35 Pa and/or a linear model soot rating of at least 25; and
at least three of the following characteristics:
a high-temperature high-shear viscosity at approximately 150° C. (HTHS150) of at least 2.55 cPs;
a high-temperature high-shear viscosity at approximately 100° C. (HTHS100) of at most 5.60 cPs;
a high-temperature high-shear viscosity at approximately 80° C. (HTHS80) of at most 8.30 cPs;
a KV100 from 6.80 cSt to 9.00 cSt;
a kinematic viscosity at approximately 40° C. (KV40) of at most 35.0 cSt;
a kinematic viscosity at approximately 20° C. (KV20) of at most 79.5 cSt; and
a viscosity index of at least 175.

10. The lubricant composition of claim 1, wherein the comb copolymer viscosity modifier comprises at least 23.0 wt % of a sum of repeat units based on the $C_{12}$-$C_{24}$ alkyl (alk)acrylate ester monomer and of repeat units based on the $C_6$-$C_{20}$ aryl, aralkyl, or alkaryl (alk)acrylate ester monomer, wherein the comb copolymer viscosity modifier exhibits a weight average molecular weight of less than or equal to 625,000 g/mol, as measured by gel permeation chromatography (GPC) at about 35° C. in tetrahydrofuran (THF) using polystyrene standards, and wherein the lubricant composition exhibits:
a non-linear model applied yield stress (APY) value of at most 0.35 Pa and/or a linear model soot rating of at least 25; and
at least four of the following characteristics:
a high-temperature high-shear viscosity at approximately 150° C. (HTHS150) of at least 2.55 cPs;
a high-temperature high-shear viscosity at approximately 100° C. (HTHS100) of at most 5.58 cPs;
a high-temperature high-shear viscosity at approximately 80° C. (HTHS80) of at most 8.25 cPs;
a KV100 from 6.90 cSt to 8.50 cSt;
a kinematic viscosity at approximately 40° C. (KV40) of at most 34.5 cSt;
a kinematic viscosity at approximately 20° C. (KV20) of at most 79.0 cSt; and
a viscosity index (VI) of at least 180.

11. The lubricant composition of claim 1, wherein the comb copolymer viscosity modifier is made by polymerization of monomers consisting essentially of:
(a) the hydrogenated polybutadiene-based (alk)acrylate ester macromonomer;
(b) the $C_3$-$C_8$ alkyl (alk)acrylate ester monomer;
(c) the $C_{12}$-$C_{24}$ alkyl (alk)acrylate ester monomer; and
(d) the $C_6$-$C_{20}$ aryl, aralkyl, or alkaryl (alk)acrylate ester monomer.

12. The lubricant composition of claim 1, wherein the comb copolymer viscosity modifier is made by polymerization comprising monomers (a), (b), (c), (d), and (e) at least one additional olefinic monomer, different from monomers (a), (b), (c), and (d) and which is not a $C_1$-$C_{18}$ alkyl-endcapped or $C_6$-$C_{20}$ aryl-, aralkyl-, or alkaryl-endcapped $C_2$-$C_6$ oxyalkyl or $C_2$-$C_6$ oligo(alkylene glycol)-based (alk) acrylate ester monomer nor a hydroxyalkyl or H-endcapped oligo(alkylene glycol)-based (alk)acrylate monomer.

13. A method of modifying a viscosity and a dispersancy of a lubricant composition comprising:
forming a viscosity and dispersancy modified mixture by combining a viscosity and dispersancy modifying amount of a comb copolymer viscosity modifier with one of the following lubricant composition components:
(1) a lubricating oil basestock comprising at least 75% by weight of one or more basestocks;
(2) at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, and a combination thereof; or
(3) a lubricant composition comprising both (1) and (2),
the comb copolymer viscosity modifier being made by polymerization comprising at least the following monomers:
(a) a hydrogenated polybutadiene-based (alk)acrylate ester macromonomer;
(b) a $C_3$-$C_8$ alkyl (alk)acrylate ester monomer;
(c) a $C_{12}$-$C_{24}$ alkyl (alk)acrylate ester monomer; and
(d) a $C_6$-$C_{20}$ aryl, aralkyl, or alkaryl (alk)acrylate ester monomer, but substantially no styrene nor styrenic monomers,
wherein the comb copolymer also comprises substantially no styrene-based nor styrenic-based repeat units,
wherein from 3.0 wt % to 27 wt % of the repeat units of the comb copolymer viscosity modifier are based on the $C_6$-$C_{20}$ aryl, aralkyl, or alkaryl (alk)acrylate ester monomer,
wherein a sum of repeat units based on the $C_{12}$-$C_{24}$ alkyl (alk)acrylate ester monomer plus the $C_6$-$C_{20}$ aryl, aralkyl, or alkaryl (alk)acrylate ester monomer collectively comprise at least 21.0 wt % of repeat units of the comb copolymer viscosity modifier, and
wherein the viscosity and dispersancy modified mixture exhibits:

(i) at least a 25% improvement, relative to the lubricant composition components (1), (2), or (3) without the comb copolymer viscosity modifier, with regard to soot dispersancy; and
(ii) at least a 5% difference, relative to the lubricant composition components (1), (2), or (3) without the comb copolymer viscosity modifier, with regard to one or more of HTHS150, HTHS100, HTHS80, KV100, KV40, KV20, and VI.

14. The method of claim 13, wherein the viscosity and dispersancy modifying amount of the comb copolymer viscosity modifier is from 1.0 mass % to 7.0 mass %, based on the total mass of the viscosity modified mixture, and wherein the one or more basestocks comprises a Group I basestock, a Group II basestock, a Group III basestock, or a mixture thereof.

15. The method of claim 13, wherein the comb copolymer viscosity modifier is combined with (1) the lubricating oil basestock, or (3) the lubricant composition comprising (1) and (2) the at least one lubricant additive, and wherein the 25% improvement and 5% difference are thus relative to lubricant composition components (1) or (3).

16. The method of claim 13, wherein the viscosity and dispersancy modified mixture exhibits at least a 33% improvement with regard to a non-linear model applied yield stress measurement of soot dispersancy and at least a 5% difference with regard to four or more of the enumerated viscometric characteristics.

17. The method of claim 13, wherein the viscosity and dispersancy modified mixture exhibits at least a 33% improvement with regard to a linear model soot rating measurement of soot dispersancy and at least a 10% difference with regard to three or more of the enumerated viscometric characteristics.

* * * * *